United States Patent
Shahmohammadian et al.

(10) Patent No.: US 12,301,400 B2
(45) Date of Patent: *May 13, 2025

(54) ENHANCEMENTS TO SUPPORT HST-SFN DEPLOYMENT SCENARIO

(71) Applicant: Samsung Electronics Co., Ltd., Suwon-si (KR)

(72) Inventors: Hoda Shahmohammadian, San Diego, CA (US); Hamid Saber, San Jose, CA (US); Jung Hyun Bae, San Diego, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/222,421

(22) Filed: Jul. 14, 2023

(65) Prior Publication Data

US 2023/0362047 A1    Nov. 9, 2023

Related U.S. Application Data

(63) Continuation of application No. 17/469,837, filed on Sep. 8, 2021, now Pat. No. 11,722,353.

(Continued)

(51) Int. Cl.
*H04L 27/26* (2006.01)
*H04L 5/00* (2006.01)
(Continued)

(52) U.S. Cl.
CPC ........ *H04L 27/2675* (2013.01); *H04L 5/0048* (2013.01); *H04W 4/027* (2013.01); *H04W 72/23* (2023.01)

(58) Field of Classification Search
CPC .. H04W 72/23; H04W 4/027; H04L 27/2675; H04L 5/0048
See application file for complete search history.

(56) References Cited

U.S. PATENT DOCUMENTS

2019/0273637 A1    9/2019    Zhang et al.
2019/0281587 A1    9/2019    Zhang et al.
(Continued)

OTHER PUBLICATIONS

Vivo: Evaluation and discussion on HST-SFN schemes, SGPP Draft; R1-2005367, 3rd Generation Partnership Project (3GPP), Mobile Competence Centre ; 650, Route Des Lucioles ; F-06921 Sophia-Antipolis Cedex ; France, vol. RAN WG1, No. e-Meeting; Aug. 17, 2020-Aug. 28, 2020 Aug. 8, 2020 (Aug. 8, 2020), XP05191 7392.*

(Continued)

*Primary Examiner* — Ronald B Abelson
(74) *Attorney, Agent, or Firm* — Renaissance IP Law Group LLP

(57) ABSTRACT

A device, such as a UE, and a Transmit and Receive Point (TRP) in a High-Speed Train-Single Frequency Network (HST-SFN) are disclosed that provide network-assisted frequency-offset compensation for the device. The device includes a receiver that receives a first reference signal and a second reference signal sent over a wireless network from a first TRP. The first reference signal corresponds to a QCL RS of the second reference signal. The device receiver determines delay-spread and average-delay information for a path between the first TRP to the device based on the first reference signal. The device receiver further receives a third reference signal from a second TRP that includes Doppler-shift and Doppler-spread information, and corresponds to a QCL RS of a fourth reference signal transmitted from the second TRP or corresponds to the second reference signal transmitted in a SFN manner from the first TRP.

20 Claims, 29 Drawing Sheets

Related U.S. Application Data

(60) Provisional application No. 63/164,807, filed on Mar. 23, 2021, provisional application No. 63/159,443, filed on Mar. 10, 2021, provisional application No. 63/130,405, filed on Dec. 23, 2020, provisional application No. 63/090,175, filed on Oct. 9, 2020.

(51) Int. Cl.
   *H04W 4/02* (2018.01)
   *H04W 72/23* (2023.01)

(56) References Cited

U.S. PATENT DOCUMENTS

| | | | |
|---|---|---|---|
| 2020/0107352 A1 | 4/2020 | Tsai et al. | |
| 2020/0229161 A1 | 7/2020 | Raghavan et al. | |
| 2020/0351055 A1 | 11/2020 | Manolakos et al. | |
| 2021/0014931 A1 | 1/2021 | Noh et al. | |

OTHER PUBLICATIONS

European Extended Search Report for Application No. 21199344.9, mailed Jun. 13, 2022.
European Office Action for Application No. 21199344.9, mailed Jul. 3, 2024.
European Partial Search Report for Application No. 21199344.9, mailed Mar. 11, 2022.
Futurewei, "Enhancement to Support HST-SFN Deployment Scenario", 3GPP Draft; RI-2005592, 3rd Generation Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020, Aug. 2020, 5 pages.
Notice of Allowance for U.S. Appl. No. 17/469,837, mailed Mar. 7, 2023.
Office Action for U.S. Appl. No. 17/469,837, mailed Nov. 28, 2022.
Qualcomm Incorporated, "Multi-TRP Enhancements", 3GPP Draft; RI-1911126 Multi-TRP Enhancements, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 2019, 26 pages.
Vivo, "Evaluation and Discussion on HST-SFN Schemes", 3GPP Draft; RI-2005367, 3rd Generation. Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020 Aug. 8, 2020, 10. Pages.
Notice of Allowance for U.S. Appl. No. 17/955,492, mailed Feb. 7, 2025.

\* cited by examiner

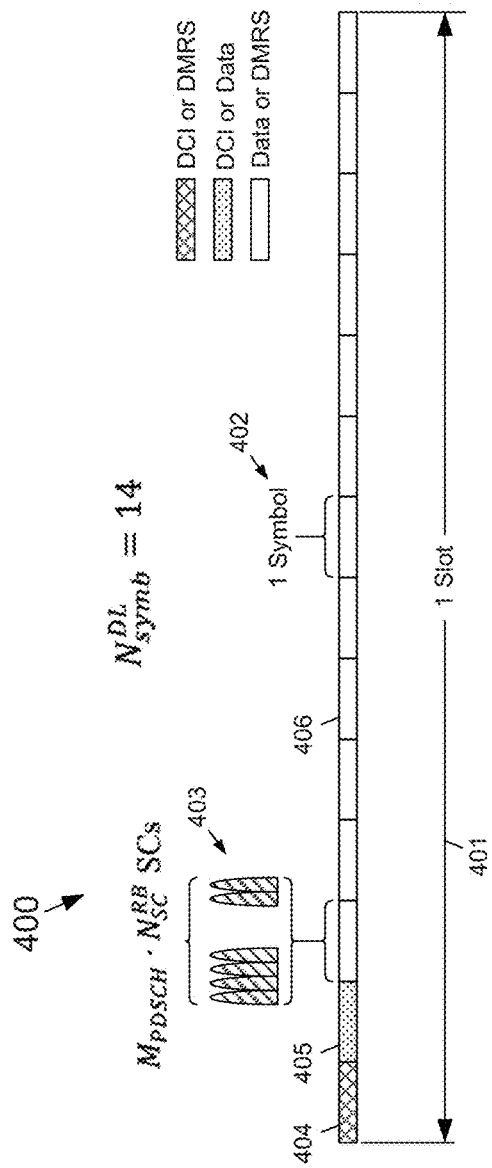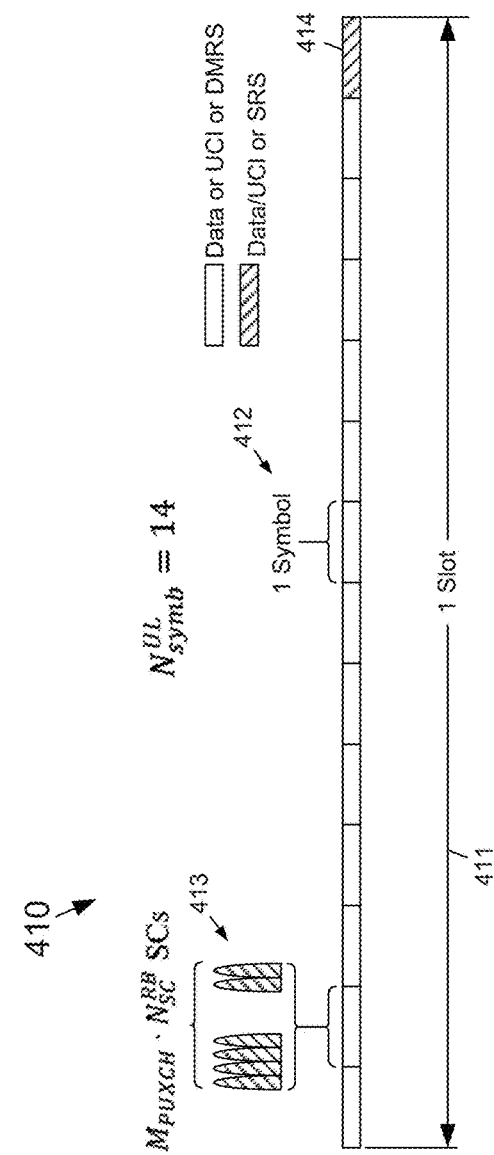
FIG. 4A
FIG. 4B

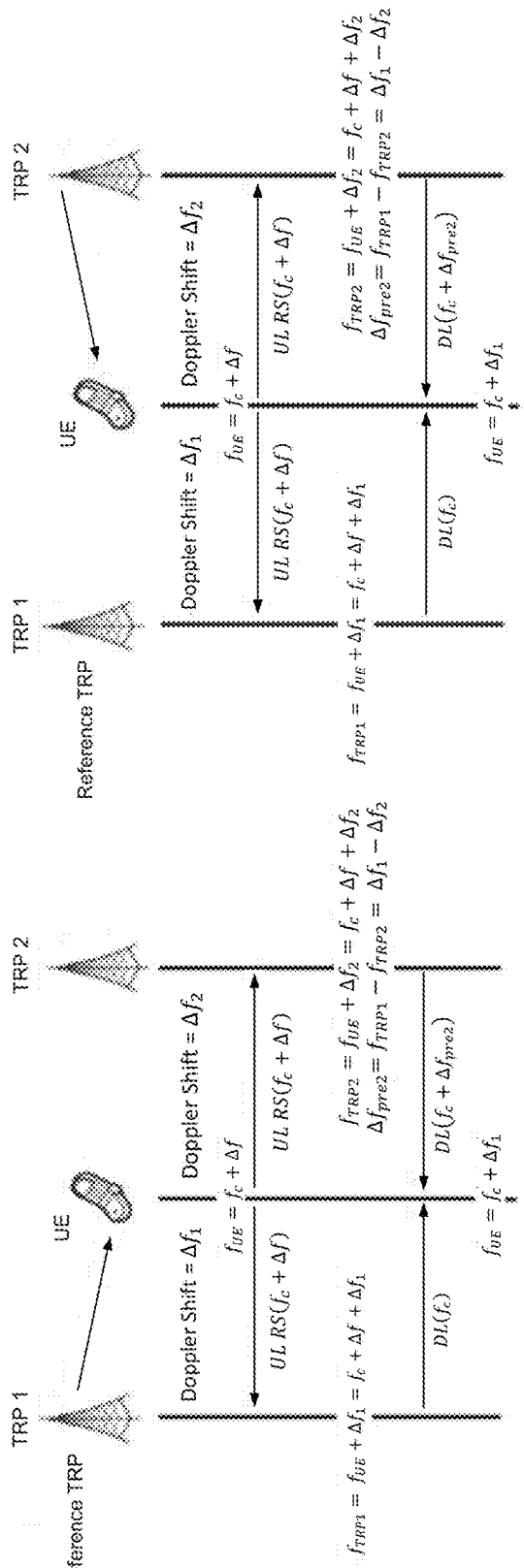
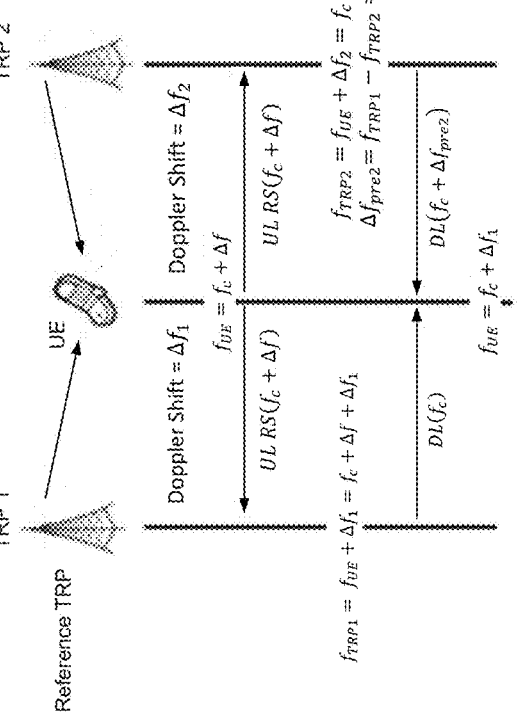
FIG. 10A
FIG. 10B
FIG. 10C

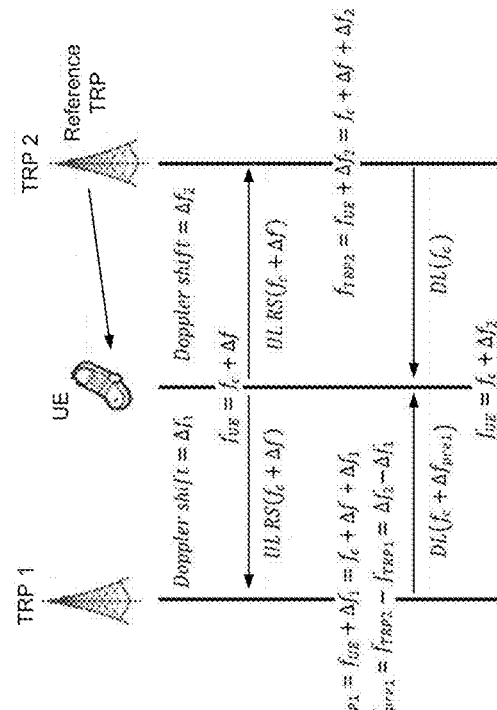
FIG. 11A
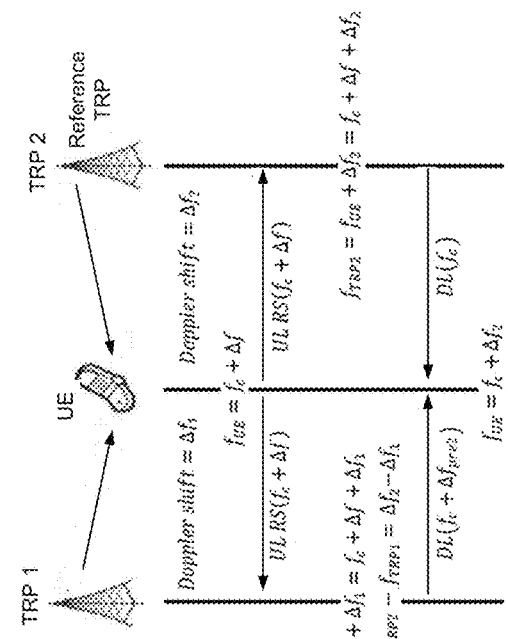
FIG. 11B
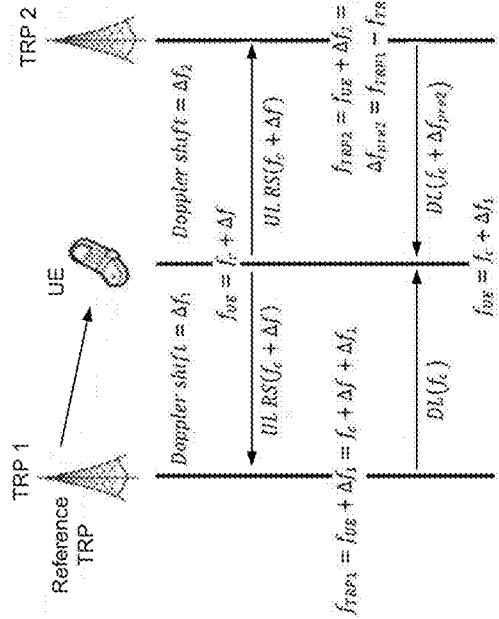
FIG. 11C(1)
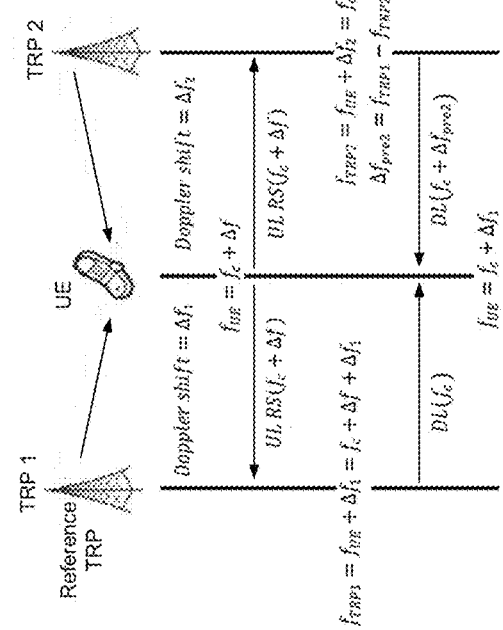
FIG. 11C(2)

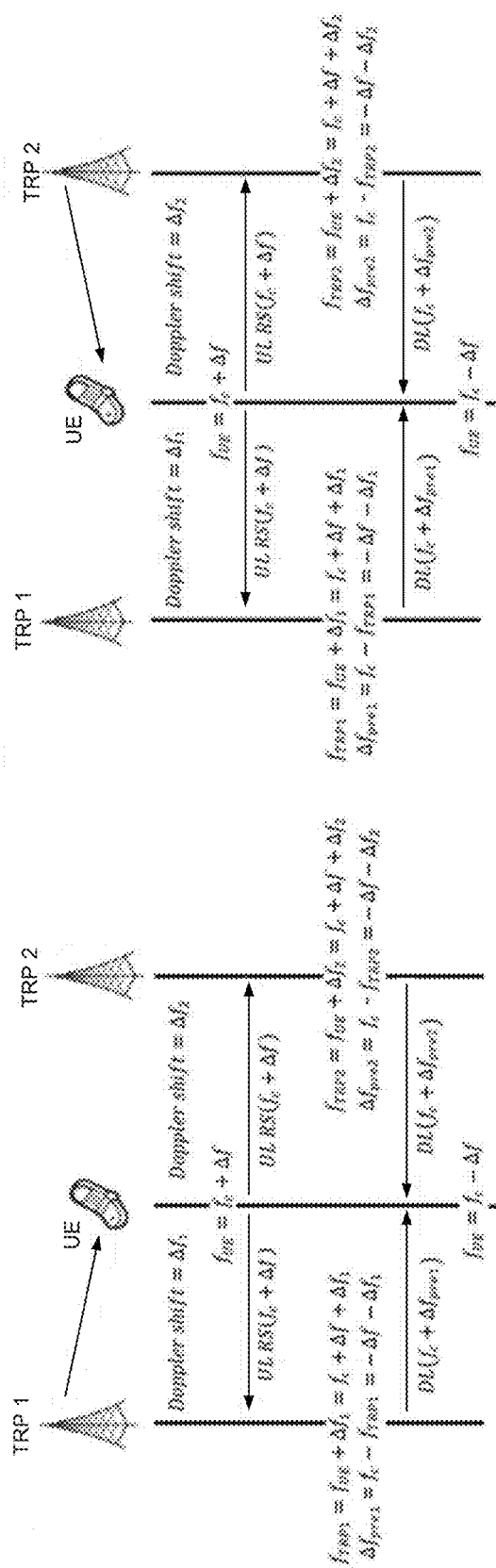
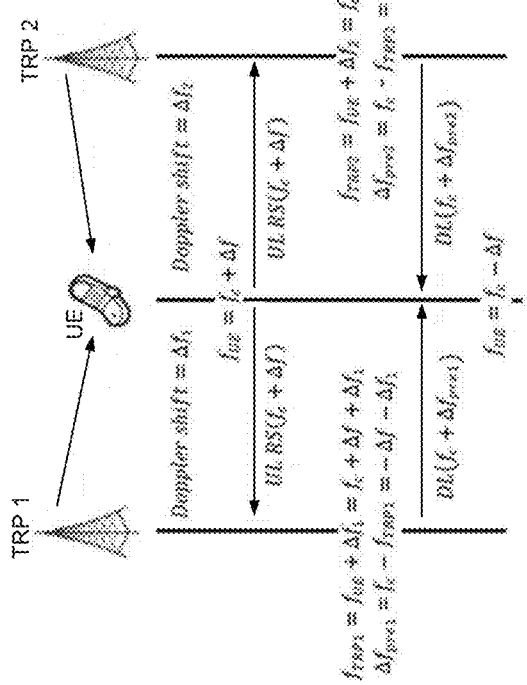
FIG. 12A
FIG. 12B
FIG. 12C

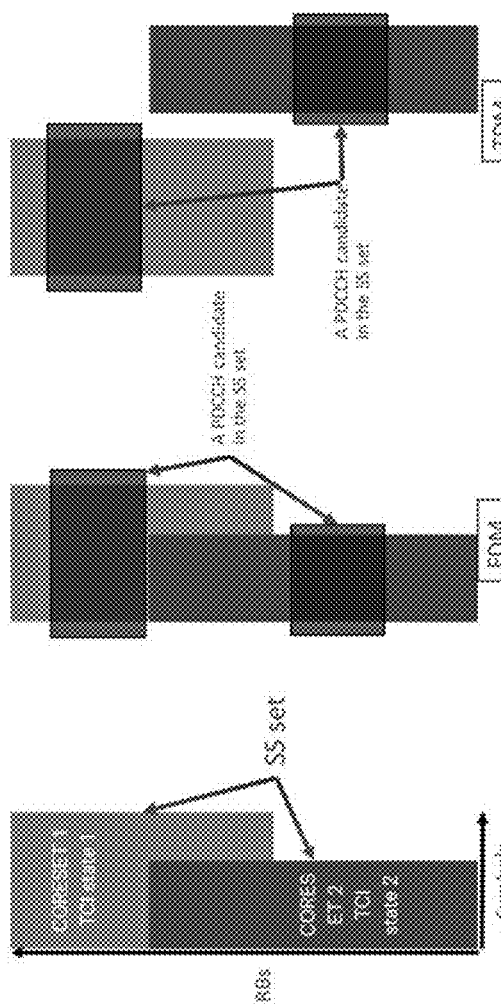
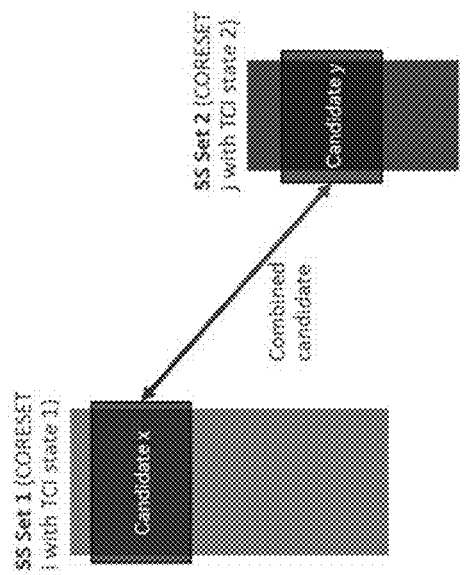
FIG. 28A  FIG. 28B  FIG. 28C  FIG. 28D

ENHANCEMENTS TO SUPPORT HST-SFN DEPLOYMENT SCENARIO

CROSS-REFERENCE TO RELATED APPLICATION

This application is a continuation of U.S. patent application Ser. No. 17/469,837, filed on Sep. 8, 2021, which claims the priority benefit under 35 U.S.C. § 119(e) of U.S. Provisional Patent Application Ser. No. 63/090,175, filed on Oct. 9, 2020, U.S. Provisional Patent Application Ser. No. 63/130,405, filed on Dec. 23, 2020, U.S. Provisional Patent Application Ser. No. 63/159,443, filed on Mar. 10, 2021, and U.S. Provisional Patent Application Ser. No. 63/164,807, filed on Mar. 23, 2021, the disclosures of which are incorporated herein by reference in their entirety.

TECHNICAL FIELD

The subject matter disclosed herein generally relates to wireless communication systems. More particularly, the subject matter relates to a system and a method for high-speed trains single-frequency network (HST-SFN) transmission.

BACKGROUND

In current High-Speed Train (HST) scenarios with Single-Frequency Network (SFN) transmission, dynamic switching among Transmit and Receive Points (TRPs) requires additional Tracking Reference Signal (TRS) and Channel State Information-Reference Signal (CSI-RS) resources dedicated for SFN transmission to derive Quasi Co-Located (QCL) properties, which uses a large overhead of resource configuration. Additionally, in current HST scenarios with SFN transmission, TRS and the corresponding Demodulation Reference Signal (DMRS) ports may experience a composite channel for a major path from each TRP, which may necessitate a very high User Equipment (UE) complexity. Further still, a high mobility of a UE in an HST environment may result in a negative Doppler offset moving away from one TRP and a positive Doppler offset moving towards another TRP and each TRP uses independent local oscillators so the Doppler offsets may be based on different base frequencies. Thus, in a HST-SFN scenario, a UE may require a very high complexity to be able to accurately estimate different Doppler shifts that are significantly different based on a composited TRS and, as a result, may use a Wiener filter on the estimated Doppler shifts in order to improve channel estimation performance.

SUMMARY

An example embodiment provides a device that may include a receiver configured to receive a first reference signal and a second reference signal sent over a wireless network from a first TRP in which the first reference signal corresponds to a quasi-colocation reference signal (QCL RS) of the second reference signal, and the receiver may be further configured to determine delay-spread and average-delay information for a path between the first TRP to the device based on the first reference signal. In one embodiment, the first reference signal may be a TRS, and the second reference signal may be a Physical Download Shared Channel (PDSCH) DMRS. In another embodiment, the first reference signal may be one of a TRS and a Synchronization Signal Block (SSB), and the second reference signal may be a TRS. In yet another embodiment, the receiver may be further configured to receive a third reference signal from a second TRP in which the third reference signal may include Doppler-shift and Doppler-spread information, and may correspond to a QCL RS of a fourth reference signal transmitted from the second TRP or may correspond to the second reference signal transmitted in a SFN manner from the first TRP. In still another embodiment, the second TRP may be a reference TRP, the first TRP may be a non-reference TRP, and the first reference signal may pre-compensate Doppler shift at the device with respect to the second TRP in a HST scenario. In one embodiment, the second reference signal may be associated with two Transmission Configuration Indicator (TCI) states corresponding to the first reference signal and the third reference signal. In another embodiment, the receiver may be further configured to receive a Physical Download Control Channel (PDCCH) DMRS associated with two TCI states from the first TRP and the second TRP, and in which the receiver may determine a TCI state of a PDSCH DMRS scheduled by the PDCCH as one of the two TCI states. In one embodiment, the receiver may be further configured to receive a fifth reference signal sent over the wireless network from the first TRP and the second TRP in which the fifth reference signal may include a two-port Phase Tracking Reference Signal (PTRS) in which a first port of the two-port PTRS may convey phase tracking information for the first TRP and a second port of the two port PTRS may convey phase-tracking information for the second TRP. In still another embodiment, the receiver may be further configured to receive a control message sent over the wireless network from the first TRP to dynamically update a configuration of one of the first reference signal and the second reference signal, and the receiver may determine information based on the control message for at least a periodicity of one of the first reference signal and the second reference signal based on a change of movement of the device with respect to the first TRP. In yet another embodiment, the receiver may be further configured to receive a control message sent over the wireless network from the first TRP in which the control message may dynamically update quasi-colocation information of one of the first reference signal and the second reference signal, and the receiver may determine information based on the control message for at least one of Doppler shift, Doppler spread, average delay, delay spread, and spatial receiver parameters based on a change of movement of the device with respect to the first TRP.

An example embodiment provides a wireless network that may include a first TRP that may include a first transmitter configured to transmit a first reference signal and a second reference signal over the wireless network to a device, the first reference signal corresponding to a QCL RS of the second reference signal and may be used by the device to determine delay-spread and average-delay information for a path between the first TRP to the device. In one embodiment, the first reference signal may be a TRS, and the second reference signal may be a PDSCH DMRS. In another embodiment, the first reference signal may be of a TRS and a SSB, and the second reference signal may be a TRS. In still another embodiment, the wireless network may further include a second TRP that may include a second transmitter configured to transmit a third reference signal and a fourth reference signal in which the third reference signal may include Doppler-shift and Doppler-spread information, and may correspond to a QCL RS of the fourth reference signal transmitted from the second transmitter or may correspond to the second reference signal transmitted in a SFN manner from the first TRP. In yet another embodiment, the second TRP may be a reference TRP, the first TRP may be a non-reference TRP, and the first reference signal may precompensates Doppler shift at the device with respect to the second TRP in a HST scenario. In one embodiment, the second reference signal may be associated with two TCI states corresponding to the first reference signal and the third reference signal. In another embodiment, the first TRP and the second TRP may each send a PDCCH DMRS associated with two TCI states to the device from which the device may determine a TCI state of a PDSCH DMRS scheduled by the PDCCH as one of the two TCI states. In one embodiment, the first TRP and the second TRP may be configured to send a fifth reference signal sent over the wireless network to the device in which the fifth reference signal may include a two-port PTRS in which a first port of the two-port PTRS may convey phase-tracking information for the first TRP and a second port of the two port PTRS may convey phase-tracking information for the second TRP. In still another embodiment, the first TRP may be configured to send a control message sent over the wireless network to the device to dynamically update a configuration of one of the first reference signal and the second reference signal, and from which the device may determine information for at least a periodicity of one of the first reference signal and the second reference signal based on a change of movement of the device with respect to the first TRP. In one embodiment, the first TRP may be further configured to send a control message sent over the wireless network to the device that may dynamically update quasi-colocation information of one of the first reference signal and the second reference signal and may include at least one of Doppler shift, Doppler spread, average delay, delay spread, and spatial receiver parameters based on a change of movement of the device with respect to the first TRP.

BRIEF DESCRIPTION OF THE DRAWING

In the following section, the aspects of the subject matter disclosed herein will be described with reference to exemplary embodiments illustrated in the figures, in which:

FIG. 4A depicts an example embodiment of a downlink slot structure;

FIG. 4B depicts an example embodiment of an uplink slot structure for physical uplink shared channel transmission or physical uplink control channel transmission;

FIGS. 10A-10C depict a first aspect of a first embodiment in which a predetermined TRP that is known to a UE is always the reference for frequency-offset precompensation on the gNB side for all dynamic-switching transmission cases according to the subject matter disclosed herein;

FIGS. 11A-11C(2) depict a second aspect of the embodiment in which a predetermined TRP that is known to a UE is always the reference for frequency-offset precompensation on the gNB side for all dynamic-switching transmission cases according to the subject matter disclosed herein;

FIGS. 12A-12C respectively show frequency-offset-compensation schemes for the three dynamic-switching cases in which each TRP is responsible for its own corresponding frequency-offset precompensation according to the subject matter disclosed herein;

FIG. 20 shows a QCL relationship of a TRS reference signal for semi-persistent resources that may be configured through a Medium Access Control (MAC) Control Element (CE) triggering process according to the subject matter disclosed herein;

FIG. 21 shows reuse of a Rel-17 enhanced TCI states activation/deactivation MAC CE structure;

FIGS. 28A-28D depict examples of repetition schemes disclosed herein;

DETAILED DESCRIPTION

Figure 1:
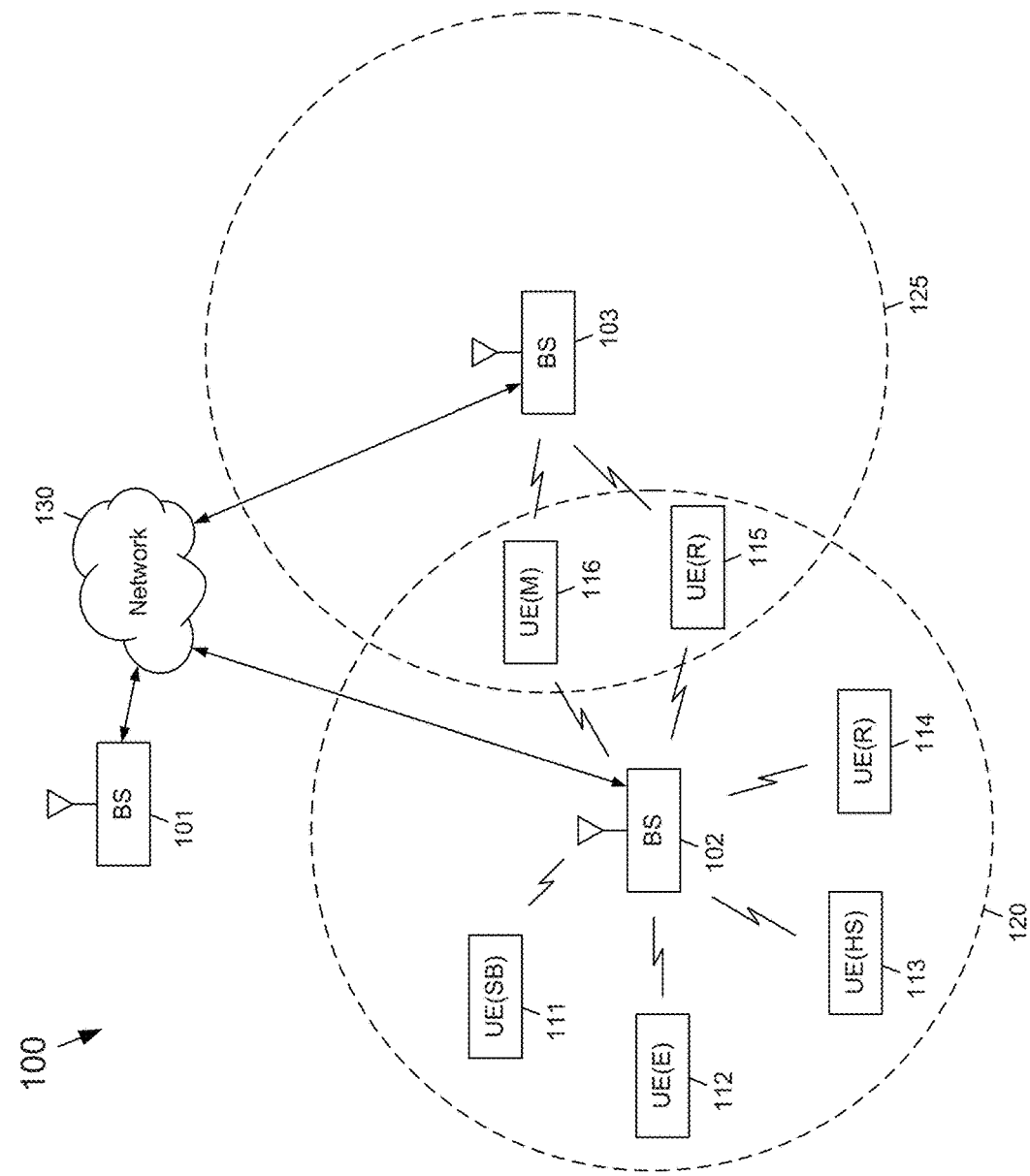
FIG. 1 depicts an example embodiment of a wireless communication network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-36, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

FIGS. 1-5 depict various example embodiments implemented in wireless communications systems and use of orthogonal frequency division multiplexing (OFDM) or orthogonal frequency division multiple access (OFDMA) communication techniques. The descriptions of FIGS. 1-5 are not meant to imply physical or architectural limitations to the manner in which different embodiments may be implemented. Different embodiments of the subject matter disclosed herein may be implemented in any suitably-arranged communications system.

FIG. 1 depicts an example embodiment of a wireless communication network 100 according to the subject matter disclosed herein. The example embodiment of the wireless network depicted in FIG. 1 is for illustration only. Other embodiments of the wireless network 100 may be used without departing from the principles of the subject matter disclosed herein.

As depicted in FIG. 1, the wireless network 100 includes a gNB 101 (e.g., base station, BS), a gNB 102, and a gNB 103. The gNB 101 may communicate with the gNB 102 and the gNB 103. The gNB 101 may also communicate with at least one network 130, such as the internet, a proprietary Internet Protocol (IP) network, or other data network.

The gNB 102 may provide wireless broadband access to the network 130 for a first plurality of UEs within a coverage area 120 of the gNB 102. The first plurality of UEs may include a UE 111 that may be located in a small business (SB); a UE 112 that may be located in an enterprise E; a UE 113 that may be located in a WiFi hotspot (HS); a UE 114 that may be located in a first residence R; a UE 115 that may be located in a second residence R; and a UE 116 that may be a mobile device (M), such as, but not limited to, a cell phone, a wireless laptop, a wireless PDA, or the like. The gNB 103 may provide wireless broadband access to the network 130 for a second plurality of UEs within a coverage area 125 of the gNB 103. The second plurality of UEs may include the UE 115 and the UE 116. In some embodiments, one or more of the gNBs 101-103 may communicate with each other and with the UEs 111-116 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a microcell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 120 and 125, which are depicted as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 may include circuitry, programming, or a combination thereof, for efficient control signaling designed for improved resource utilization. In certain embodiments, and one or more of the gNBs 101-103 may include circuitry, programming, or a combination thereof, for efficient control signaling designed for improved resource utilization.

Although FIG. 1 depicts one example of a wireless network, various changes may be made to FIG. 1. For example, the wireless network 100 could include any number of gNB s and any number of UEs in any suitable arrangement. Also, the gNB 101 may communicate directly with any number of UEs and provide those UEs with wireless broadband access to the network 130. Similarly, each gNB 102-103 may communicate directly with the network 130 and provide UEs with direct wireless broadband access to the network 130. Further, the gNBs 101, 102, and/or 103 may provide access to other or additional external networks, such as, but not limited to, external telephone networks or other types of data networks.

Figure 2:
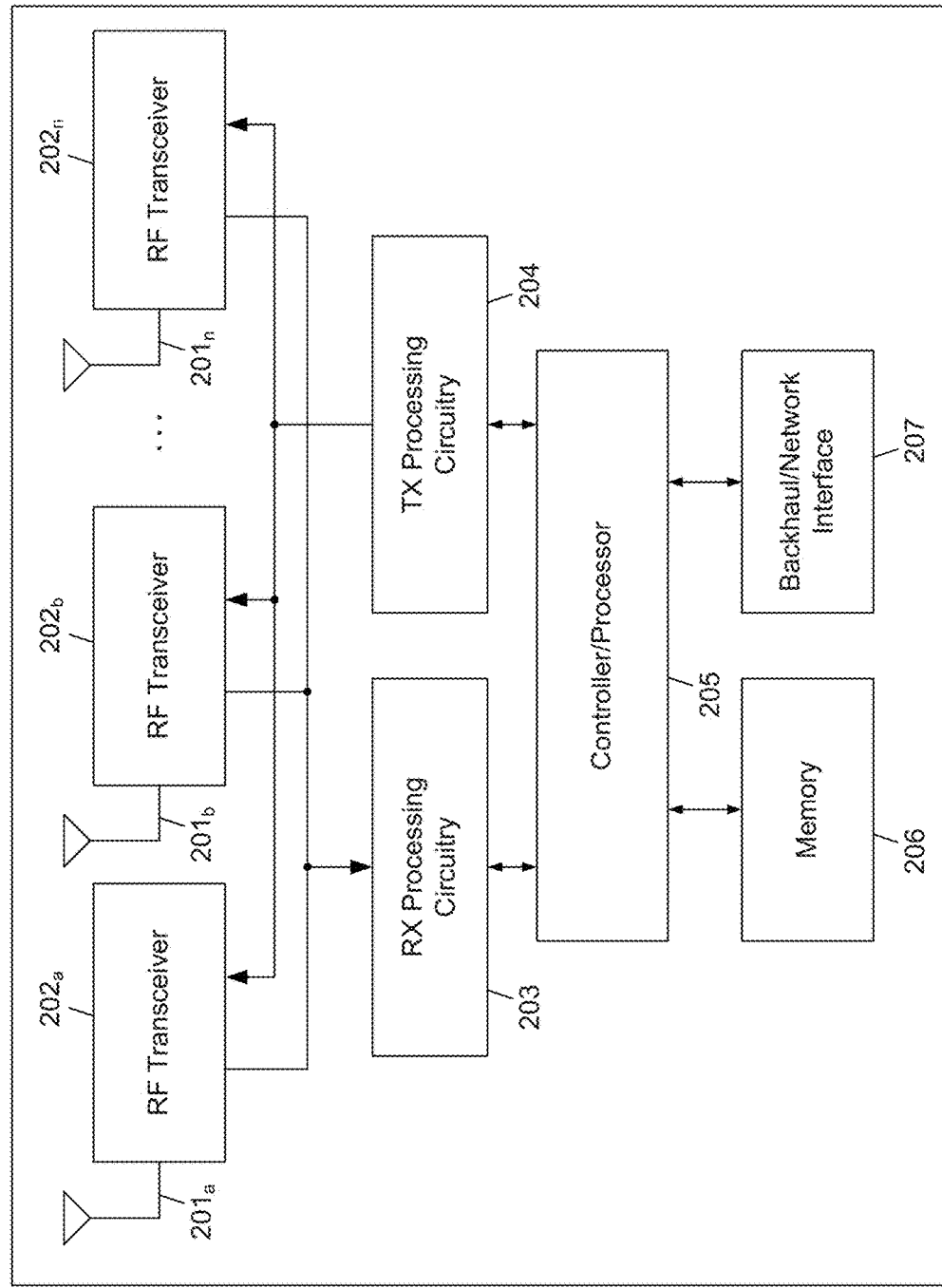
FIG. 2 depicts an example embodiment of a base station device according to the subject matter disclosed herein.

FIG. 2 depicts an example embodiment of the gNB 102 according to the subject matter disclosed herein. The embodiment of the gNB 102 depicted in FIG. 2 is for illustration only, and the gNBs 101 and 103 of FIG. 1 may have the same or a similar configuration. However, gNBs come in a wide variety of configurations, and it should be understood that FIG. 2 does not limit the scope of the subject matter disclosed herein to any particular implementation of a gNB.

As depicted in FIG. 2, the gNB 102 may include multiple antennas 201a-201n, multiple radio frequency (RF) transceivers 202a-202n, receive (RX) processing circuitry 203, and transmit (TX) processing circuitry 204. The gNB 102 may also include a controller/processor 205, a memory 206, and/or a backhaul or network interface 207. The TX processing circuitry 204 may include a controller/processor that is not shown and that controls the TX processing circuitry 204 to perform transmission-related functionality as disclosed herein. Alternatively, the controller/processor 205 may be configured to control the TX processing circuitry 204 to perform transmission-related functionality as disclosed herein.

The RF transceivers 202a-202n may receive incoming RF signals from the antennas 201a-201n. The received RF signals may be signals transmitted by UEs in the network 100. The RF transceivers 202a-202n may down-convert the incoming RF signals to generate IF or baseband signals. The IF or baseband signals may be sent to the RX processing circuitry 203, which generates processed baseband signals by filtering, decoding, and/or digitizing the baseband or IF signals. The RX processing circuitry 203 may transmit the processed baseband signals to the controller/processor 205 for further processing.

The TX processing circuitry 204 may receive analog or digital data (such as, but not limited to, voice data, web data, e-mail, or interactive video game data) from the controller/processor 205. The TX processing circuitry 204 may encode, multiplex, and/or digitize the outgoing baseband data to generate processed baseband or IF signals. The RF transceivers 202a-202n may receive the outgoing processed baseband or IF signals from the TX processing circuitry 204 and may up-convert the baseband or IF signals to RF signals that are transmitted via the antennas 201a-201n. The TX processing circuitry 204 may be configured so that one or more beams are transmitted via the antennas 201a-201n

The controller/processor 205 may include one or more processors or other processing devices that may control the overall operation of the gNB 102. For example, the controller/processor 205 may control the reception of forward channel signals and the transmission of reverse channel signals by the RF transceivers 202a-202n, the RX processing circuitry 203, and the TX processing circuitry 204 in accordance with well-known principles. The controller/processor 205 may support additional functions as well, such as more advanced wireless communication functions. For instance, the controller/processor 205 may support beamforming or directional-routing operations in which outgoing/incoming signals from/to multiple antennas 201a-201n may be weighted differently to effectively steer the outgoing signals in a desired direction. Any of a wide variety of other functions may be supported in the gNB 102 by the controller/processor 205.

The controller/processor 205 may also be capable of executing programs and other processes resident in the memory 206, such as an operating system (OS). The controller/processor 205 may move data into or out of the memory 206, which may be coupled to the controller/processor 205, as required by an executing process. Part of the memory 206 may include a random-access memory (RAM), and another part of the memory 206 may include a flash memory or other read-only memory (ROM).

The controller/processor 205 may also be coupled to the backhaul or network interface 207. The backhaul or network interface 207 may allow the gNB 102 to communicate with other devices or systems over a backhaul connection or over a network. The interface 207 may support communications over any suitable wired or wireless connection(s). For example, when the gNB 102 is implemented as part of a cellular communication system (such as a gNB supporting 5G/NR, LTE, or LTE-A), the interface 207 may allow the gNB 102 to communicate with other gNBs over a wired or wireless backhaul connection. When the gNB 102 is implemented as an access point, the interface 207 may allow the gNB 102 to communicate over a wired or wireless local area network or over a wired or wireless connection to a larger network (such as the internet). The interface 207 may include any suitable structure supporting communications over a wired or wireless connection, such as an Ethernet or an RF transceiver.

Although FIG. 2 depicts one example of gNB 102, various changes may be made to FIG. 2. For example, the gNB 102 may include any number of each component shown in FIG. 2. As a particular example, an access point may include a number of interfaces 207, and the controller/processor 205 may support routing functions to route data between different network addresses. As another particular example, while shown as including a single instance of TX processing circuitry 204 and a single instance of RX processing circuitry 203, the gNB 102 may include multiple instances of each (such as one per RF transceiver). Also, various components in FIG. 2 may be combined, further subdivided, or omitted and additional components may be added according to particular needs. It should be understood that the example gNB 102 depicted in FIG. 2 may be configured to provide any and all of the functionality of a base station device and/or a gNB described herein.

Figure 3:
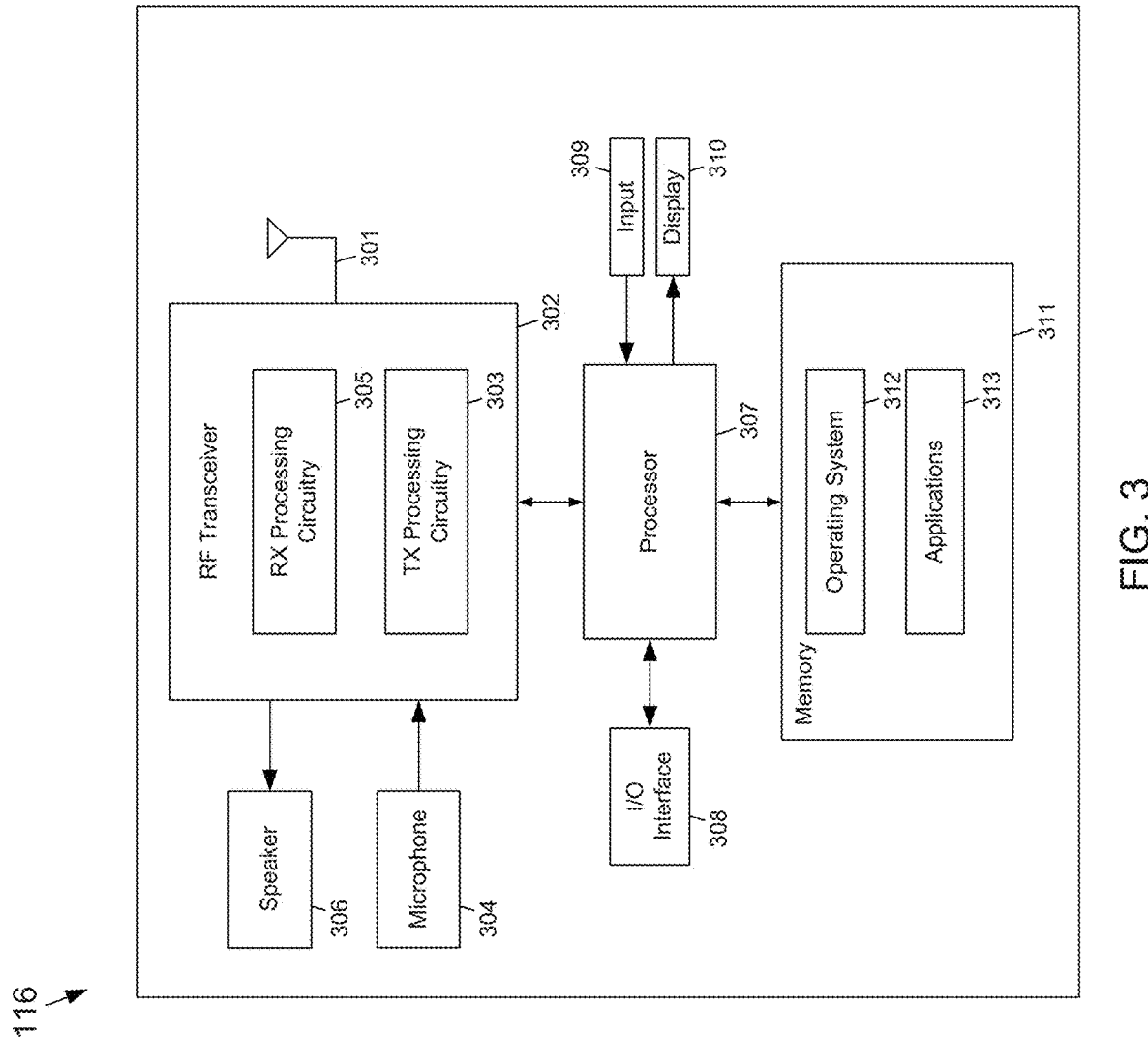
FIG. 3 depicts an example embodiment of a user equipment according to the subject matter disclosed herein.

FIG. 3 depicts an example embodiment of UE 116 according to the subject matter disclosed herein. The embodiment of the UE 116 depicted in FIG. 3 is for illustration only, and the UEs 111-115 of FIG. 1 could have the same or similar configuration. UEs, however, may come in a wide variety of configurations, and FIG. 3 does not limit a UE to be any particular implementation of a UE.

As depicted in FIG. 3, the UE 116 may include one or more antennas 301, an RF transceiver 302, TX processing circuitry 303, a microphone 304, and RX processing circuitry 305. The UE 116 may also include a speaker 306, a processor 307, an input/output (I/O) interface (IF) 308, a touchscreen 309 (or other input device), a display 310, and a memory 311. The memory 311 may include an OS 312 and one or more applications 313. The TX processing circuitry 303 may include a controller/processor that is not shown and that may be configured to control the TX processing circuitry 303 to perform transmission-related functionality as disclosed herein. Alternatively, the processor 307 may be configured to control the TX processing circuitry 303 to perform transmission-related functionality as disclosed herein.

The RF transceiver 302 may receive an incoming RF signal, from the antenna 301 that has been transmitted by a gNB of the network 100. The RF transceiver 302 may down-convert the incoming RF signal to generate an intermediate frequency (IF) or baseband signal. The IF or baseband signal may be sent to the RX processing circuitry 305, which generates a processed baseband signal by filtering, decoding, and/or digitizing the baseband or IF signal. The RX processing circuitry 305 may transmit the processed baseband signal to the speaker 306 (such as for voice data) or to the processor 307 for further processing (such as for web browsing data).

The TX processing circuitry 303 may receive analog or digital voice data from the microphone 304 or other outgoing baseband data (such as web data, e-mail, or interactive video game data) from the processor 307. The TX processing circuitry 303 may encode, multiplex, and/or digitize the outgoing baseband data to generate a processed baseband or IF signal. The RF transceiver 302 may receive the outgoing processed baseband or IF signal from the TX processing circuitry 303 and up-convert the baseband or IF signal to an RF signal that is transmitted via the one or more antennas 301. The TX processing circuitry 303 may be configured to transmit one or more beams from the one or more antennas 301.

The processor 307 may include one or more processors or other processing devices and may execute the OS 312 stored in the memory 311 in order to control the overall operation of the UE 116. For example, the processor 307 may control the reception of forward channel signals and the transmission of reverse channel signals by the RF transceiver 302, the TX processing circuitry 303, and the RX processing circuitry 305 in accordance with well-known principles. In some embodiments, the processor 307 may be at least one microprocessor or microcontroller.

The processor 307 may also be capable of executing other processes and programs resident in the memory 311, such as processes for beam management. The processor 307 may move data into or out of the memory 311 as required by an executing process. In some embodiments, the processor 307 may be configured to execute the applications 313 based on the OS 312 or in response to signals received from gNBs or from an operator. The processor 307 may also be coupled to the I/O interface 308, which may provide the UE 116 with the ability to connect to other devices, such as, but not limited to, laptop computers and handheld computers. The I/O interface 308 is the communication path between these accessories and the processor 307.

The processor 307 may also be coupled to the touchscreen 309 and the display 310. An operator of the UE 116 may use the touchscreen 309 to enter data into the UE 116. The display 310 may be a liquid crystal display, light emitting diode display, or other display capable of rendering text and/or at least limited graphics, such as from web sites.

The memory 311 may be coupled to the processor 307. Part of the memory 311 may include RAM and another part of the memory 311 may include a flash memory or other ROM.

Although FIG. 3 depicts one example embodiment of the UE 116, various changes may be made to FIG. 3. For example, various components in FIG. 3 may be combined, further subdivided, or omitted and additional components may be added according to particular needs. As a particular example, the processor 307 may be divided into multiple processors, such as one or more central processing units (CPUs) and one or more graphics processing units (GPUs). Also, while FIG. 3 depicts the UE 116 configured as a mobile telephone or smartphone, UEs may be configured to operate as other types of mobile or stationary devices. It should be understood that the example UE 116 depicted in FIG. 3 may be configured to provide any and all of the functionality of a UE described herein.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mmWave) bands, e.g., 28 GHz or 60 GHz bands or, in general, above 6 GHz bands, to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have a duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

FIG. 4A depicts an example embodiment of a DL slot structure 400 according to the subject matter disclosed herein. The example embodiment of the DL slot structure 400 depicted in FIG. 4A is for illustration only. FIG. 4A does not limit the scope of the subject matter disclosed herein to any particular implementation. It should be noted that in the DL slot structure 400 described as follows, the DCI information need not be located as depicted in FIG. 4A and may be located elsewhere as appropriate.

As depicted in FIG. 4A, a DL slot 401 may include $N_{symb}^{DL}$ symbols 402 in which a gNB may transmit, for example, data information, DCI, or DM-RS. A DL system BW may include $N_{RB}^{DL}$ RBs. Each RB may include $N_{SC}^{RB}$ SCs. A UE may be assigned $M_{PDSCH}$ RBs for a total of $M_{SC}^{PDSCH}=M_{PDSCH} \cdot N_{SC}^{RB}$ SCs 403 for a PDSCH transmission BW. A PDCCH conveying DCI may be transmitted over control channel elements (CCEs) that are substantially spread across the DL system BW. A first slot symbol 404 may be used by the gNB to transmit PDCCH. A second slot symbol 405 may be used by the gNB to transmit PDCCH or PDSCH. Remaining slot symbols 406 may be used by the gNB to transmit PDSCH and CSI-RS. In some slots, the gNB may also transmit synchronization signals and channels that convey system information, such as synchronization signals and primary broadcast channel (SS/PBCH) blocks.

UL signals may also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE may transmit data information or UCI through a respective physical UL shared channel (PUSCH) or a physical UL control channel (PUCCH). A PUSCH or a PUCCH may be transmitted over a variable number of symbols in a slot including one symbol. When a UE simultaneously transmits data information and UCI, the UE may multiplex both in a PUSCH.

A UCI may include hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in the buffer to the UE, and CSI reports enabling a gNB to select appropriate parameters for PDSCH or PDCCH transmissions to a UE.

A CSI report from a UE may include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

A UL RS may include DM-RS and SRS. A DM-RS may typically be transmitted only within a BW of a respective PUSCH or PUCCH transmission. A gNB may use a DM-RS to demodulate information in a respective PUSCH or PUCCH. A SRS may transmitted by a UE to provide a gNB with an UL CSI and, for a TDD system, an SRS transmission can also provide a PMI for DL transmission. Additionally, in order to establish synchronization or an initial higher-layer connection with a gNB, a UE may transmit a physical random access channel (PRACH).

FIG. 4B depicts an example embodiment of a UL slot structure 410 for PUSCH transmission or PUCCH transmission according to the subject matter disclosed herein. The embodiment of the UL slot structure 410 depicted in FIG. 4B is for illustration only. FIG. 4B does not limit the scope of the subject matter disclosed herein to any particular implementation. It should be noted that in the UL slot structure 410 described as follows, the UCI information need not be located as depicted in FIG. 4B and may be located elsewhere as appropriate.

As depicted in FIG. 4B, a slot 411 may include $N_{symb}^{UL}$ symbols 412 in which a UE transmits, for example, data information, UCI, or DM-RS. An UL system BW may include N RBs. Each RB may include N. A UE may be assigned $M_{PUXCH}$ RBs for a total of $M_{SC}^{PUXCH}=M_{PUXCH} \cdot N_{SC}^{RB}$ SCs 413 for a PUSCH transmission BW ("X"="S") or for a PUCCH transmission BW ("X"="C"). The last one or more symbols of a slot may be used, for example, to multiplex SRS transmissions 414 or short PUCCH transmissions from one or more UEs.

Figure 5A:
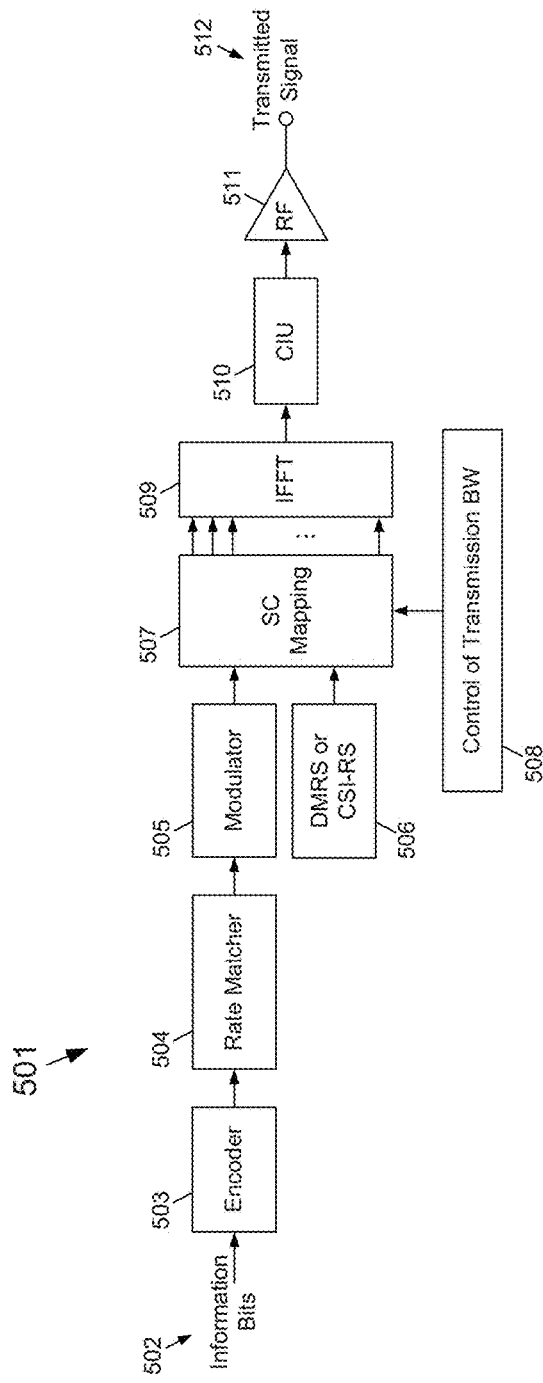
FIG. 5A depicts a block diagram of an example embodiment of a transmitter structure using OFDM according to the subject matter disclosed herein.

FIG. 5A depicts a block diagram of an example embodiment of a transmitter structure 501 using OFDM according to the subject matter disclosed herein. The embodiment of the transmitter structure 501 depicted in FIG. 5A is for illustration only and an actual implementation may have the same or a similar configuration. FIG. 5A does not limit the scope of the subject matter disclosed herein to any particular implementation.

As depicted in FIG. 5A, information bits, such as DCI bits or data information bits 502, may be encoded by an encoder module 503, rate matched to assigned time/frequency resources by a rate matcher module 504 and modulated by a modulator module 505. Subsequently, modulated encoded symbols and DM-RS or CSI-RS module 506 may be mapped to SCs by an SC mapping module 507 controlled by a transmission bandwidth module 508. An inverse fast Fourier transform (IFFT) may be performed by a filter module 509. A cyclic prefix (CP) may be added to the output of the filter module 509. The resulting signal may be filtered by common interface unit (CIU) filter module 510 and transmitted by an RF module 511 as a transmitted signal 512.

Figure 5B:
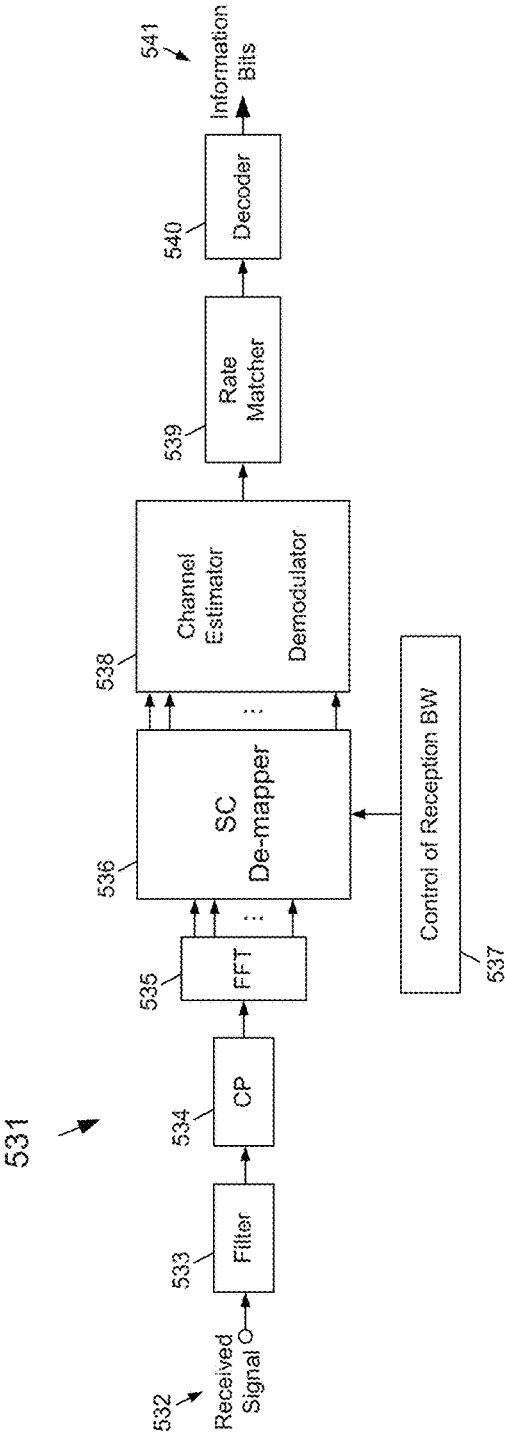
FIG. 5B depicts a block diagram of an example embodiment of an OFDM receiver structure according to the subject matter disclosed herein.

FIG. 5B depicts a block diagram of an example embodiment of an OFDM receiver structure 531 according to the subject matter disclosed herein. The embodiment of the receiver structure 531 depicted in FIG. 5B is for illustration only and an actual implementation may have the same or a similar configuration. FIG. 5B does not limit the scope of the subject matter disclosed herein to any particular implementation. As depicted in FIG. 5B, a received signal 532 may be filtered by a filter module 533. A CP removal module 534 may remove a cyclic prefix. A filter module 535 may apply a fast Fourier transform (FFT). An SC de-mapping module 536 may de-map SCs selected by BW selector module 537. Received symbols may be demodulated by a channel estimator and a demodulator module 538. A rate de-matcher module 539 may restore a rate matching, and a decoder module 540 may decode the resulting bits to provide data information bits 541. DL transmissions and UL transmissions may be based on an orthogonal frequency division multiplexing (OFDM) waveform that includes a variant using a DFT preceding that is known as DFT-spread-OFDM.

As previously mentioned, an objective in the 3GPP Rel-17 SID on RedCap NR devices is to support the same set of use cases in FR2 as in case of FR1. Beam refinement may be a key feature for FR2 operation in NR. An important issue relates to enabling a beam refinement procedure for RedCap UEs that are in a RRC_INACTIVE state (also referred to herein as a RRC Inactive state or an inactive mode). Accordingly, the subject matter disclosed herein provides a set of beam refinement procedures to enable RedCap in an inactive mode transmission in FR2.

Figure 6:
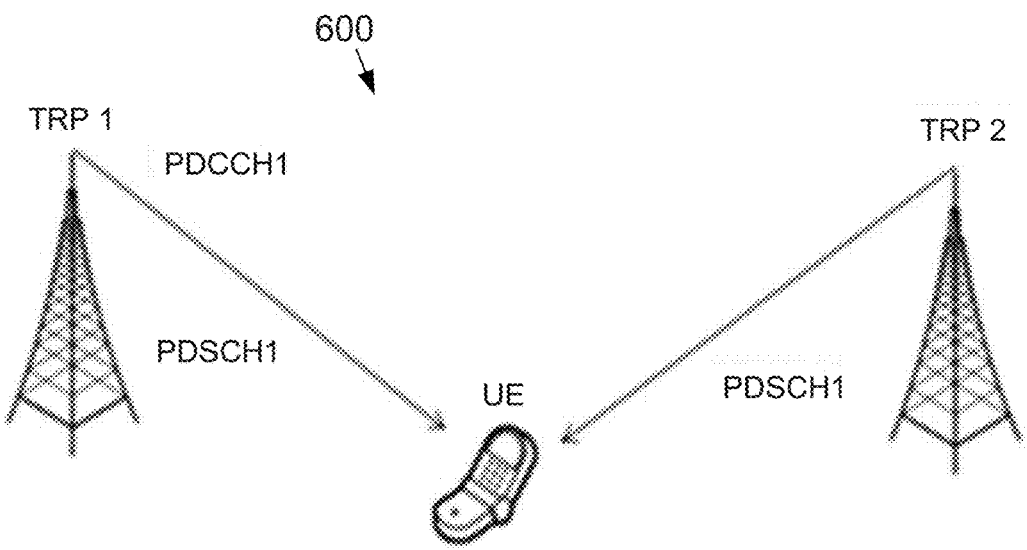
FIG. 6 depicts an example HST-SFN environment in which a coherent joint transmission may occur.

HST-SFN transmission is a coherent joint transmission that employs only one Physical Downlink Control Channel (PDCCH) to allocate one set of Physical Downlink Shared Channel (PDSCH) resources. The same PDSCH is transmitted from multiple TRPs simultaneously. FIG. 6 depicts an example HST-SFN environment 600 in which a coherent joint transmission may occur. In FIG. 6, a UE, which may be traveling on a high-speed train, may receive a first PDSCH1 from a first TRP 1 and a second PDCCH1 from a second TRP 2.

From the UE perspective, the additional downlink transmission from TRP 2 may be interpreted as an additional downlink delay-spread component that originated from a single TRP. Due to the fact that each TRP may use independent local oscillators and the UE mobility with respect to each TRP may be different than the mobility of another UE, there may be differences in the frequency offset at the UE. That is, a UE moving away from the first TRP 1 and towards the second TRP 2 may experience a negative Doppler offset moving away from the first TRP 1 and a positive Doppler offset moving towards the second TRP 2. In a SFN-manner transmission, both TRPs transmit the same TRS and DMRS, and as a result the UE may perform an estimate on a composite propagation channel. Generally, a coherent joint transmission may be viewed as less practical because it involves an ideal transport connection and thorough synchronization, as well as accurate channel state information in order to ensure that the downlink transmissions sum constructively at the UE.

TRP-Specific TRS Transmission

Figure 7:
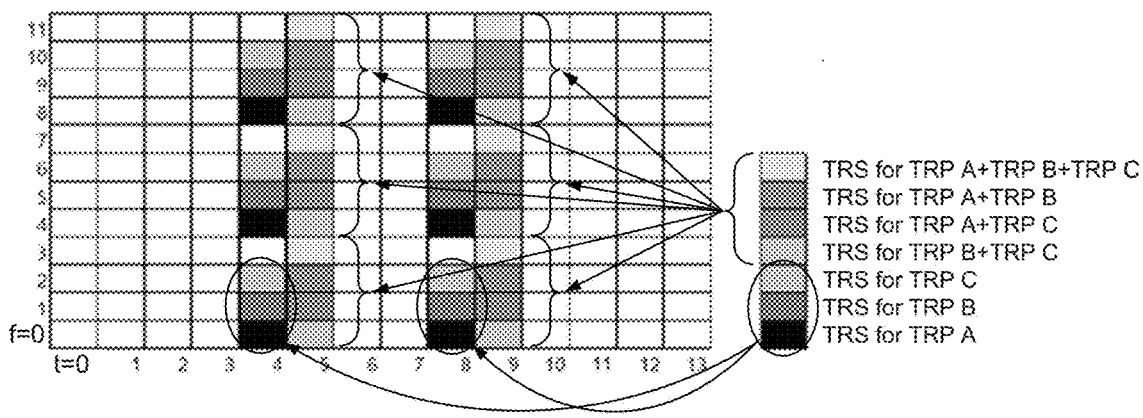
FIG. 7 shows an example RS overhead over an example bandwidth for a configuration of QCL reference RS in SFN transmission for three TRPs.

In a SFN transmission, an important factor to consider is the ability of dynamic switching among TRPs. In a SFN-manner transmission, this may involve additional SFN TRS/CSI-RS resources dedicated for SFN transmission to derive QCL properties. As used herein, quasi co-location means that two antenna ports are said to be quasi co-located if properties of the channel over which a symbol on one antenna port is conveyed can be inferred from the channel over which a symbol on the other antenna port is conveyed. FIG. 7 shows an example RS overhead over an example bandwidth for a configuration of QCL reference RS in SFN transmission for three TRPs. The abscissa in FIG. 7 is time t, and the ordinate is frequency band f. A total of seven TRSs are used in FIG. 7 in which three TRSs are used for TRP A, TRP B, TRP C and additional four TRSs are used for scenarios that include TRP A+TRP B, TRP B+TRP C, TRP A+TRP C and TRP A+TRP B+TRP C.

With multiple QCL reference RSs for the same DMRS port(s) in which each QCL reference RS corresponds to a particular TRP (TRP-specific), additional TRS/CSI-RS resources dedicated for SFN transmission do not need to be configured to the UE. This may reduce RS overhead for configuration of QCL reference RS.

Figure 8:
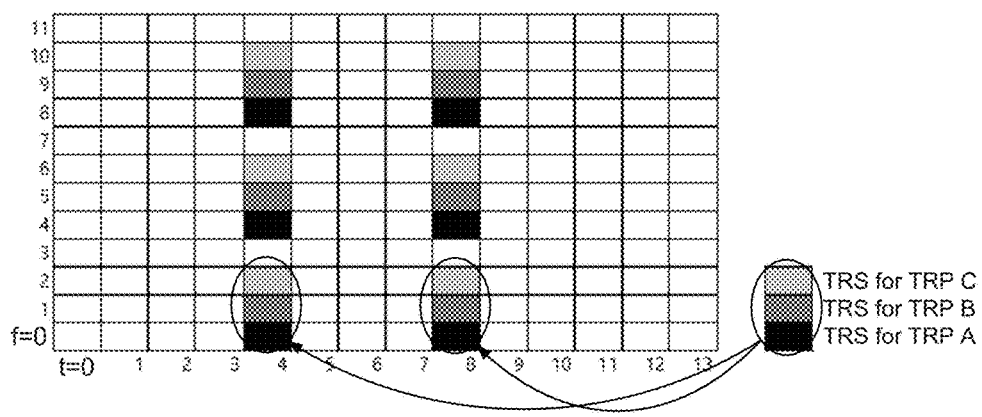
FIG. 8 shows separate QCL RSs for three TRPs that are sufficient for dynamic switching among the three TRPs.

FIG. 8 shows separate QCL RSs for three TRPs (i.e. TRP A, TRP B and TRP C) that are sufficient for dynamic switching among TRP A, TRP B, TRP C. The abscissa in FIG. 8 is time t, and the ordinate is frequency band f. Each TRP has an independent QCL reference RS that is frequency-division modulated (FDMed) to the RSs of the other TRPs. Based on this, the three TRSs shown in FIG. 8 not only may be used for dynamic switching cases of TRP A, TRP B, TRP C, but also may be used for cases of TRP A+TRP B, TRP B+TRP C, TRP A+TRP C and TRP A+TRP B+TRP C because each TRS has an independent QCL assumption. For example, if TRP A is used for PDSCH, then PDSCH DMRS may be dynamically indicated to be QCLed with the TRS from TRP A. If TRP A+TRP B are used for PDSCH, then PDSCH DMRS may be dynamically indicated to be QCLed with both TRS from TRP A and TRS from TRP B.

Additionally, TRS and the corresponding DMRS port(s) in a SFN transmission may experience a composite channel representing a major path for each TRP. In order to perform DMRS channel estimation, a UE first estimates large-scale profiles, such as Doppler shift, Doppler spread, average delay and delay spread. With a single QCL reference RS, i.e., if TRS and DMRS are QCLed with a single Transmission Configuration Indicator (TCI) state containing a composite channel of TRPs, a UE may likely need to be of a very high complexity to be able to accurately estimate significantly different Doppler shifts based on a composited TRS. Such a complex UE then may employs a Wiener filter on the estimated Doppler shifts to improve channel-estimation performance. With multiple QCL reference RSs for the same DMRS port(s) while each QCL reference RS corresponds to a particular TRP (TRP-specific), a UE does not need to estimate and track multiple Doppler shifts from a single composited TRS. As a result, UE complexity may be significantly decreased.

Figure 9A:
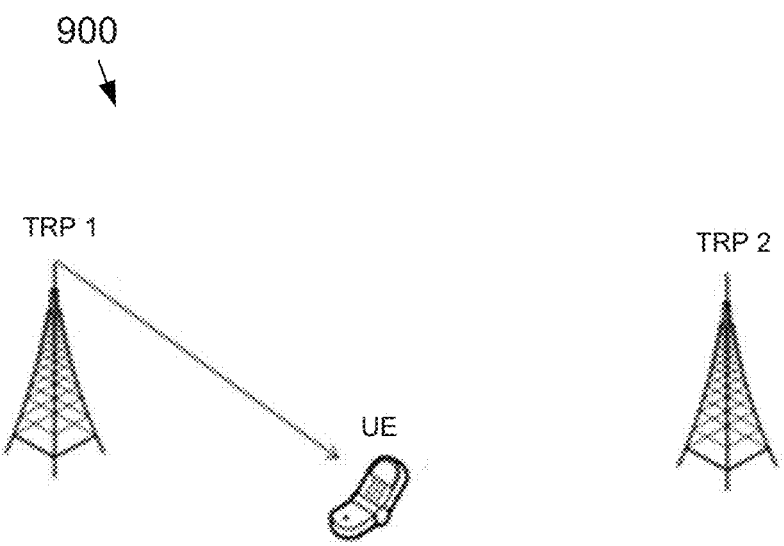
FIGS. 9A-9C respectively depict three dynamic switching scenarios in an example HST-SFN environment that includes a first TRP, a second TRP, and a UE.
Figure 9B:
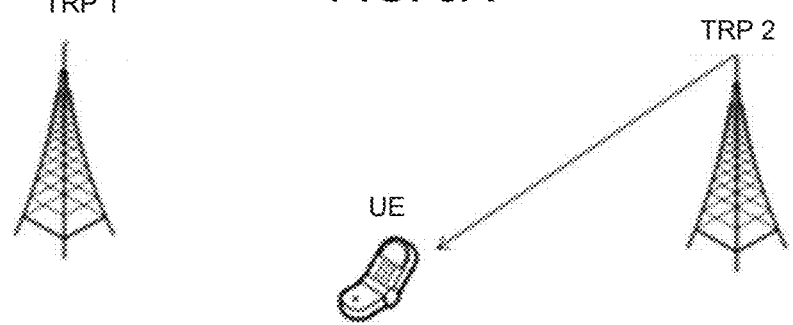
Figure 9C:
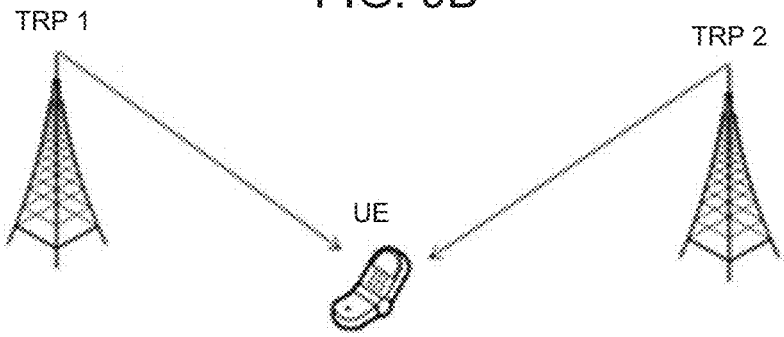

FIGS. 9A-9C respectively depict three dynamic switching scenarios in an example HST-SFN environment 900 that includes a first TRP 1, a second TRP 2, and a UE. FIG. 9A depicts a dynamic-switching scenario when PDSCH is transmitted from the TRP 1. FIG. 9B depicts a dynamic-switching scenario when PDSCH is transmitter from the TRP 2. FIG. 9C depicts a dynamic-switching scenario when PDSCH is transmitted from both the TRP 1 and the TRP 2. Using TRP-specific (i.e., multiple QCL assumption) TRS transmission, a total of two TRS resources, each having a separate QCL assumption, are sufficient for dynamic switching for the three scenarios depicted in FIGS. 9A-9B.

With TRP-specific TRS transmissions, a low-complexity UE may accurately estimate two different Doppler shifts based on two received TRS having separate QCL assumptions. To improve throughput, a UE may still perform per-tap Doppler-shift channel estimation. That is, channel coefficients may be calculated using the estimated per-tap frequency offset and then a tap-dependent time-domain channel interpolation.

In the following description, the functionality of the TRPs described in the various HST-FSN scenarios and methods may be provided by the example base station depicted in FIG. 2, and that functionality of the UEs described in the various HST-FSN scenarios and methods may be provided by the example UE depicted in FIG. 3.

Precompensation with TRP-Specific TRS Transmission

A first embodiment disclosed herein provides a collaboration of network and a UE for precompensation of frequency offsets that may be used to reduce UE complexity. That is, the network may precompensate different frequency offsets for a UE to use to estimate different Doppler shifts. To do so, a UE may either explicitly report estimated Doppler shifts using a CSI framework. Alternatively, a UE may implicitly (implicit UE indication) allow each TRP to estimate Doppler shifts based on a UL signal transmitted by the UE.

Doppler-shift precompensation may be provided by network using a reference TRP for precompensation for different Doppler shifts for both explicit reporting and implicit UE indication. The reference TRP may be preconfigured or semi-statically indicated to a UE. In a first aspect of the first embodiment, a particular (predetermined) TRP may be the TRP that transmits the PDSCH in dynamic switching between TRPs, as depicted in FIGS. 10A-10C for the three dynamic-switching scenarios of FIGS. 9A-9C. Alternatively, a second aspect of the first embodiment may use a non-predetermined TRP for precompensation for different Doppler shifts. A non-predetermined TRP that transmits a PDSCH may become the reference TRP for a UE, as depicted in FIGS. 11A-11C for the three dynamic-switching scenarios of FIGS. 9A-9C.

For the first aspect of the first embodiment depicted in FIG. 10A-10C, a predetermined TRP (e.g., TRP 1) that is known to the UE (e.g., may be indicated by a certain TCI state) is always the reference for frequency-offset precompensation on the gNB side for all dynamic-switching transmission cases.

In each of FIGS. 10A-10C, a TRP 1 is the predetermined reference TRP. In FIG. 10A, TRP 1 sends a TRS to a UE. In FIG. 10B, TRP 2 sends a TRS to the UE. In FIG. 5C, both TRP 1 and TRP 2 send a TRS to the UE.

The UE experiences a doppler shift of $\Delta f_1$ with respect to TRP 1 and a doppler shift of $\Delta f_2$ with respect to TRP 2. Based on the TRS received from the referenced TRP, the UE determines a $f_{UE} = f_c + \Delta f$, and sends a UL RS (UL RS($f_c + \Delta f$)) to both TRP 1 and TRP 2 that conveys $f_{UE}$. In response, TRP 1 determines a $f_{TRP1} = f_{UE} + \Delta f_1 = f_c + \Delta f + \Delta f_1$, and sends a DL on $f_c$. TRP 2 determines a $f_{TRP2} = f_{UE} + \Delta f_2 = f_c + \Delta f + f_2$, and a $\Delta f_{pre2} = f_{TRP1} - f_{TRP2} = \Delta f_1 - \Delta f_2$, and sends a DL that conveys $f_c + \Delta f_{pre2}$. In response to the DL received from the TRP 1, the carrier frequency for the UE becomes $f_{UE} = f_c + \Delta f_1$.

For the second aspect of the embodiment depicted in FIGS. 11A-11C, the TRP transmitting PDSCH in each of the three dynamic-switching cases may be the reference TRP for frequency-offset compensation provided on the network side. Note that for case FIGS. 11C(1) and 11C(2), in which both TRP 1 and TRP 2 transmit PDSCH, either of TRPs may be considered as the reference TRP. FIG. 11C(1) depicts when the TRP 1 is the reference TRP. FIG. 11C(2) depicts when the TRP 2 is the reference TRP.

The carrier frequency $f_c$ of received signal may dynamically vary when handling dynamic switching among cases depicted in FIG. 11A-11C. With a TRP-specific TRS transmission, a multiple QCL assumption may be considered for the same DMRS ports and a UE may be activated with a TCI codepoint having up to two TCI states. Thus, with an assignment of one TCI state per TRP, a UE may accordingly determine which transmission-dynamic case is being used and address the case-specific Doppler shift for channel estimation as long as the QCL source of Doppler shift is appropriately indicated in the DCI. In the frequency-offset precompensation depicted in FIGS. 10A-10C, however, the carrier frequency $f_c$ of the received signal remains the same in the dynamic-switching cases of FIGS. 9A-9C. Also, because the network should preconfigure or semi-statically indicate the reference TRP to a UE, signaling overhead for the frequency-offset-compensation depicted in FIGS. 10A-10C may be less than the signaling overhead for the frequency-offset precompensation depicted in FIGS. 11A-11C. Based on the lower signaling overhead, the embodiment depicted in FIGS. 10A-10C in which a predetermined TRP may be considered to be the reference TRP for frequency-offset compensation at the gNB side may tend to be preferred to the approaches of FIGS. 11A-11C.

In a third aspect of the first embodiment, the network may provide precompensation for different frequency offsets per TRP without an assignment of a reference TRP. Each TRP may be responsible for precompensation of the frequency offset corresponding to the path between that TRP and a UE. FIGS. 12A-12C respectively show frequency-offset-compensation schemes for the three dynamic-switching cases in which each TRP is responsible for its own corresponding frequency-offset precompensation. It should be noted that similar to the embodiment of FIGS. 10A-10C, the carrier frequency $f_c$ of the received signal remains the same in dynamic switching for each of the three dynamic-switching cases.

In the current specification for a NZP-CSI-RS-Resource-Set configured with the higher layer parameter trs-Info, a UE shall assume the antenna port is the same as the same port index of the configured NZP CSI-RS resources in the NZP-CSI-RS-ResourceSet. Thus, all of the different TRS resources in a set may be represented as one resource.

The subject matter disclosed herein provides that TRP-specific TRS reference signals may be transmitted from two TRPs configured as one set because this aspect is applicable to all scenarios described in connection with FIGS. 10A-10C, 11A-11C and 12-12C because QCL information of NZP CSI-RS is configured at the resource level, which may reduce the overhead of a TRS set configuration. It should be noted that the antenna port with the same port index of the configured TRS resources in the set may be the same only if the resources have the same TCI state.

Each NZP-CSI-Resource may be configured with a frequency domain allocation bit string in resource mapping in the 3GPP Specification 38.331, as shown below. Among all possible mappings, only row 1 may be used for TRS reference signal as row 1 has a high density of three REs per an RB that provides for measurement accuracy to track time and frequency offsets. The four-bit string of row 1 that may have only a single bit set to "1" may be used to indicate the first RE in frequency-domain allocation.

| CSI-RS-ResourceMapping Information Element | |
|---|---|
| CSI-RS-ResourceMapping ::= | SEQUENCE { |
| frequencyDomainAllocation | CHOICE { |
| row1 | BIT STRING (SIZE (4)), |
| row2 | BIT STRING (BIZE (12)), |
| row4 | BIT STRING (SIZE (3)), |
| other | BIT STRING (SIZE (6)) |
| }, | |
| ... | |
| firstOFDMSymbolInTimeDomain | INTEGER (0..13), |
| firstOFDMSymbolInTimeDomain2 | INTEGER (2..12) |
| OPTIONAL, -- Need R | |
| ... | |

The TRS resource set may be configured so that CSI-RS-ResourceMapping of TRS reference signals (i.e., NZP CSI-RS Resources) transmitted from two TRPs use different bit strings to have non-overlapping frequency-domain RE allocation. The TRS transmission from two TRPs may be simultaneous (i.e., with same firstOFDMSymbolInTimeDomain configuration) or with same symbol offset (i.e., with different firstOFDMSymbolInTimeDomain configuration). It should be noted that for aperiodic TRS reference signals, transmission from two TRPs are at the same slot because the aperiodicTriggeringOffset parameter is configured per set and not for each resource separately. The aperiodicTriggeringOffset parameter indicates a time offset between the slot in which a UE receives the aperiodic trigger and the slot during which the resource set is transmitted.

Performance in an HST scenario might be particularly sensitive to Doppler measurement errors based on the high mobilities and corresponding high Doppler shifts. In order to have an accurate estimate of a Doppler shift in the vicinity of TRPs, a frequent rate of transmission of TRS may be used. A lower rate of TRS may, however, be sufficient in areas relatively far from TRPs. Thus, a MAC CE may dynamically update the TRS transmission period for an HST deployment scenario to avoid RRC reconfiguration overhead.

Similarly, when a network precompensates frequency offset, accuracy of Doppler shift estimation at a gNB may be affected by rate of UL RS transmission. A frequent rate of a Sounding Reference Signal (SRS) transmission may be used in the vicinity of TRPs while a lower rate of SRS transmission may be sufficient in areas relatively far from TRPs. A MAC CE may be used to dynamically update the UL RS transmission period for HST deployment scenario.

Network Frequency Offset Precompensation with Explicit UE Reporting

One embodiment of network frequency-offset precompensation provides explicit UE reporting. For this embodiment, a UE may explicitly report the different Doppler shifts measured for each TRP as part of a CSI reporting to a gNB. With a TPR-manner TRS/CSI RS transmission, large-scale profile measurement, including Doppler shift and Doppler spread, may be performed independently for each TRP. It is, however, noted that this additional reporting of Doppler shift may increase reporting overhead and may also include a UE estimation error and/or feedback latency.

The current specification framework for CSI report triggering and transmission may be used for explicit UE reporting. One approach may be to have the network utilize channel measurement variable to calculate Doppler shift. Another solution may be introduction of a new report quantity for Doppler shift in CSI-ReportConfig. Note that TRS is a CSI reference-signal resource set with a specific configuration to maximize tracking performance. The trs-info flag within the NZP-CSI-RS-ResourceSet parameter structure indicates that the CSI RS resource set is being used as a TRS. An example of specification modification to address explicit UE reporting of Doppler shift(s) per TRP (trs-dopplershift) may be as follows.

| CSI-ReportConfig information element | |
|---|---|
| CSI-ReportConfig ::= | SEQUENCE { |
| ... | |
| reportQuantity | CHOICE { |
| none | NULL, |
| cri-RI-PMI-CQI | NULL, |
| cri-RI-i1 | NULL, |
| cri-RI-i1-CQI | SEQUENCE { |
| pdsch-BundleSizeForCSI | ENUMERATED {n2, n4} |
| OPTIONAL -- Need S | |
| }, | |
| cri-RI-CQI | NULL, |
| cri-RSRP | NULL, |
| ssb-Index-RSRP | NULL, |
| cri-RI-LI-PMI-CQI | NULL, |
| trs-dopplershift | NULL |
| , ... | |
| ... | |

As the current specification explicitly prevents TRS to be included in CSI reporting, introduction of a new report quantity for Doppler shift in CSI-ReportConfig may involve removing such a restriction. That is, a UE may be configured with a CSI-ReportConfig that is linked to a CSI-ResourceConfig containing an NZP-CSI-RS-ResourceSet configured with trs-Info. Also, a UE may be configured with a CSI-ReportConfig with the higher layer parameter reportQuantity set to other than 'none' for NZP CSI-RS resource set configured with trs-Info.

Network Frequency Offset Precompensation with Implicit UE Indication

Another embodiment of network frequency-offset precompensation provides implicit UE indication. Note that TRS transmission in these schemes are TRP-specific (i.e., $TRS_{TRP}$ as shown in FIGS. 13-15).

Figure 13:
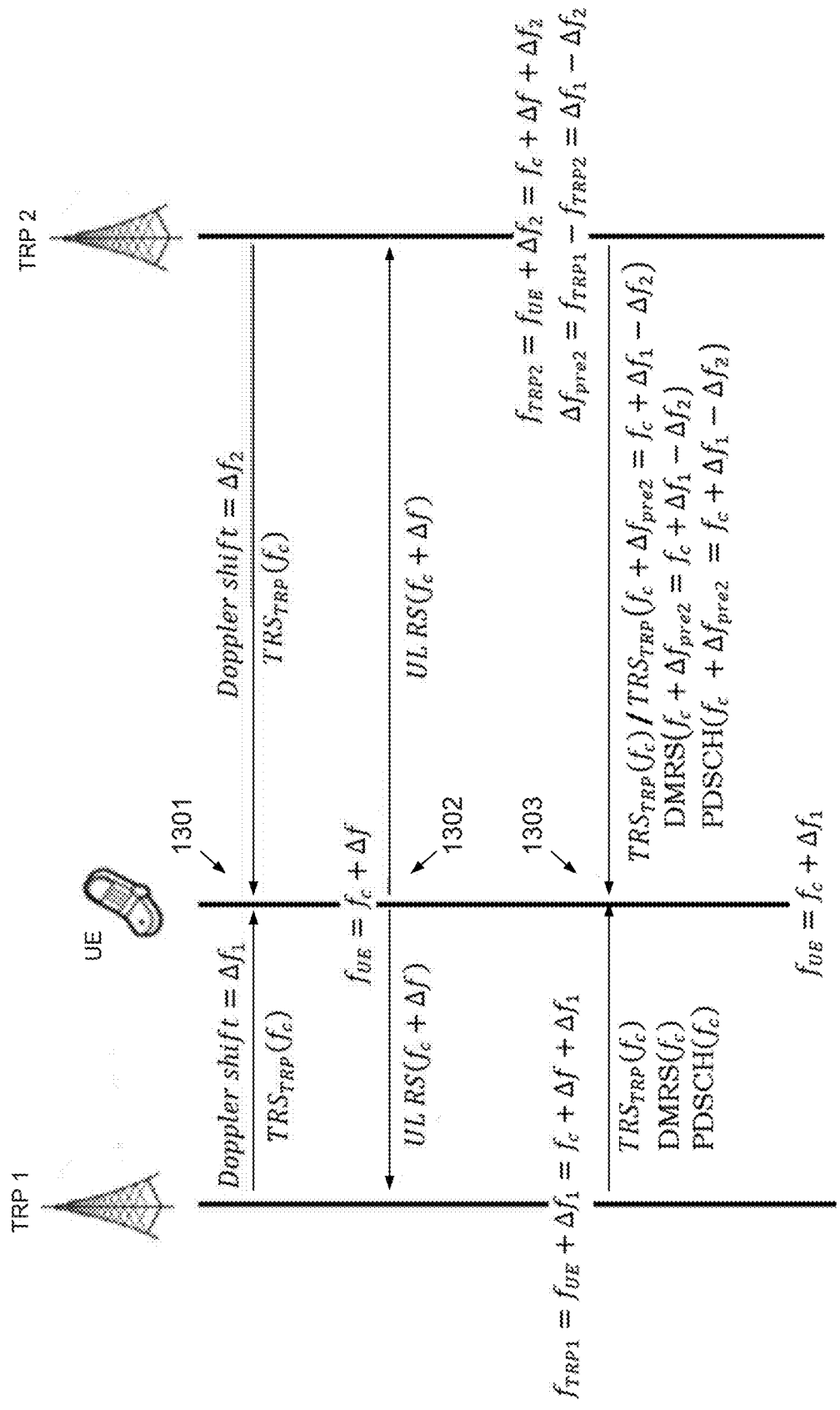
FIG. 13 depicts a fourth aspect of the first embodiment for network frequency-offset precompensation that uses a three-step process with implicit UE indication according to the subject matter disclosed herein.

FIG. 13 depicts a fourth aspect of the first embodiment for network frequency-offset precompensation that uses a three-step process with implicit UE indication according to the subject matter disclosed herein. The process starts at 1301 with a TRS transmission. A set of TRP-specific TRS (i.e., with independent QCL assumption) may be transmitted from two TRPs 1 and 2. A UE estimates the carrier frequency and two Doppler shifts based on the received TRS set. At 1302, the UE transmits the uplink reference signal (e.g., SRS) to the two TRPs modulated with the estimated carrier frequency based on the received TRS set. At 1303, the network estimates frequency offset difference of received UL RS (i.e., SRS) at the two TRPs and precompensate the frequency offset difference $\Delta f_{pre}$ for downlink transmission (i.e., TRS, DMRS, PDSCH) from the non-reference TRP.

The initial set of TRS transmission at 1301 in FIG. 13 may be transmitted for the purpose of a frequency offset estimation at a UE. It may also be for the purpose of a QCL RS for the UL RS (e.g., SRS) transmission at 1302. The TRS transmission may only happen once as an aperiodic transmission for this aspect of the first embodiment and may not be used for every DMRS and PDSCH transmission. Additionally, in the current specification, there may be no obligation for a UE to use TRS for carrier-frequency estimation and the UE may use any other DL RS to maintain a frequency loop. That is, the main process for precompensation of the different Doppler shifts by the network for downlink transmission may include periodic transmission of UL RS (at 1302) and TRS (at 1303) in FIG. 13.

Figure 14:
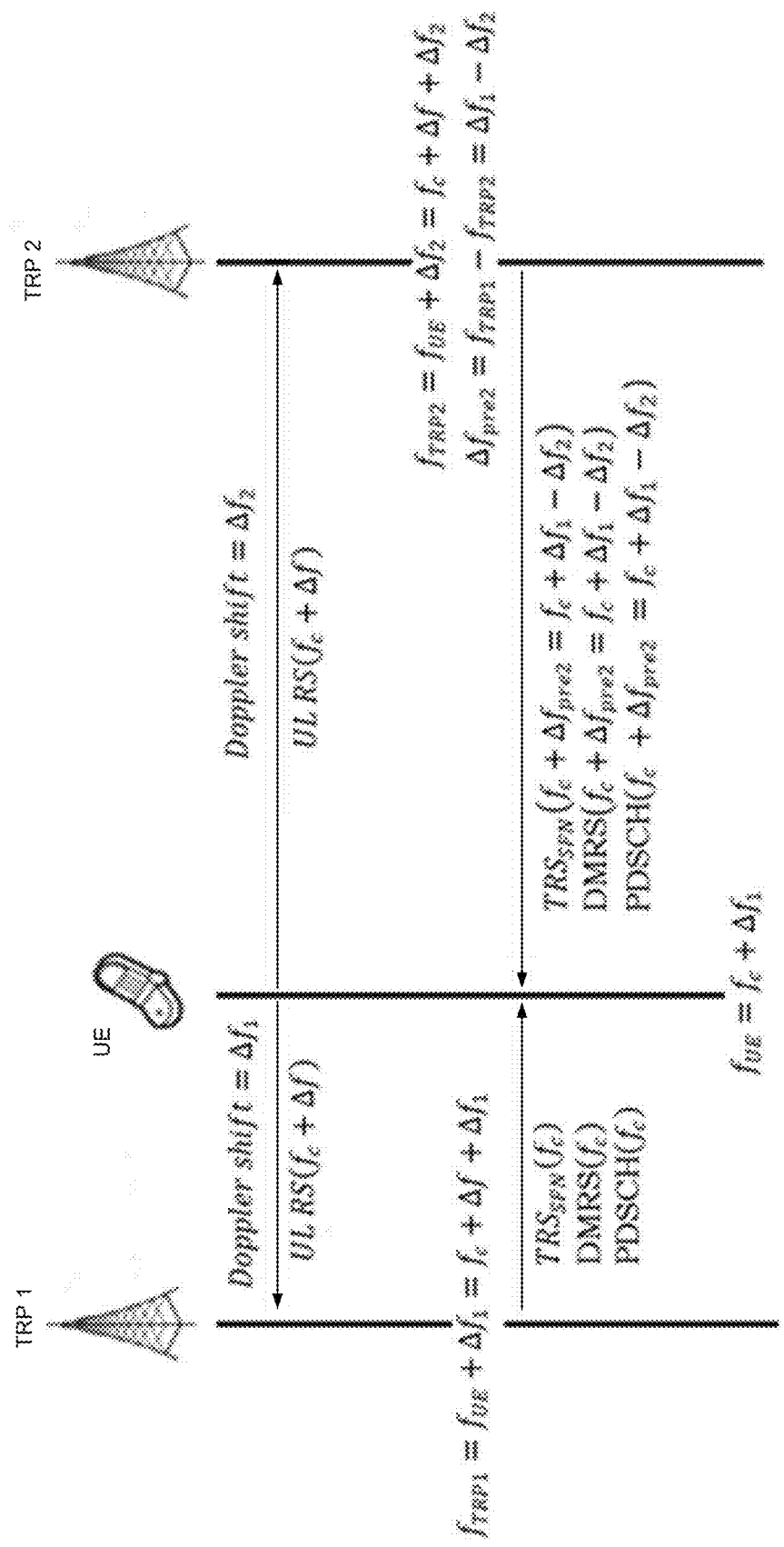
FIG. 14 depicts a fifth aspect of the first embodiment for network frequency-offset precompensation that uses a two-step process starting with a UL RS transmission according to the subject matter disclosed herein.

FIG. 14 depicts a fifth aspect of the first embodiment for network frequency-offset precompensation that uses a two-step process starting with a UL RS transmission according to the subject matter disclosed herein. The two-step process is similar to 1302 and 1303 in FIG. 13.

It should be noted that a frequency-offset difference (i.e., $\Delta f_{pre}$) precompensation at a gNB for downlink transmission may be used for either for the fourth aspect of the first embodiment depicted in FIG. 13 for all TRS, DMRS and PDSCH, or the fifth aspect of the first embodiment depicted in FIG. 14 for only DMRS and PDSCH, but not for TRS transmission.

In the fourth and fifth aspects of the first embodiment, TRS overhead for dynamic-switching transmission may be reduced. A traditional QCL rule for delay-related large-scale profile, however, may not be held because TRSs may be transmitted in TRP-specific while DMRS and PDSCH may be transmitted in a SFN manner. To address this, it may be noted that a Rel-17 UE may be activated using a TCI codepoint having two TCI states. In the current specification, the two activated TCI states correspond to different DMRS ports. Herein, a UE may associate the PDSCH DMRS port(s) with both TCIs simultaneously (i.e., one TCI state per each TRP). That is, multiple-QCL assumptions may be considered for the same DMRS port(s). The DMRS antenna port(s) associated with each TRP may be configured to be QCLed with the TRS transmitted from that TRP.

For a Doppler-shift-related large-scale profile, if frequency offset is precompensated for by the TRS as well as DMRS and PDSCH (i.e., the fourth aspect), there would not be any issue for a QCL rule or UE-side frequency offset tracking based on the received TRS. There is no QCL rule break for Doppler shift information because the QCL RS for the DMRS and PDSCH is the TRS on the second TRS transmission. Additionally, for a second TRS transmission precompensated for frequency offset, there would not be any issue for a UE to estimate and compensate the frequency offset of DMRS and PDSCH according to received TRS.

If frequency offset is not precompensated for a TRS, but for DMRS and PDSCH (i.e., the fifth aspect), the QCL rule for Doppler shift breaks for the DMRS and PDSCH transmission from the non-reference TRP. A UE may estimate and precompensate the frequency offset based on the received TRS. Not having the TRS precompensated, but having DMRS and PDSCH precompensated for frequency offset, a UE may estimate the frequency offset based on the TRS, and may apply the estimate for received DMRS and PDSCH that are already compensated by the network. To address a QCL break issue in the first embodiment, a new QCL type may be used for TRS transmitted from the non-reference TRP that only includes a delay-related large-scale profile (i.e., delay spread and average delay). That is, the QCL RS for the PDSCH DMRS may be the TRS transmitted from the reference TRP with QCL type B and the second TRS transmission from the non-reference TRP may only be used to extract the delay-spread and average-delay information for the path from a non-reference TRP to a UE. Also, to solve the frequency-offset tracking issue based on TRS on the UE side, if the TRS transmission is TRP-specific, a gNB may indicate to the UE to track the frequency offset only based on received TRS from the reference TRP (e.g., pre-configured or semi-statically indicated with a certain TCI state). In the fourth and fifth aspects of the first embodiment respectively depicted in FIGS. 13 and 14, the network precompensates the difference of frequency Doppler shifts based on one TRP as the reference TRP. As previously described, the network may precompensate Doppler shifts separately for each TRP. The approaches and explanations of FIGS. 13 and 14 may be extended and applied to a situation in which Doppler frequency shift is precompensated for each TRP independently by network.

Figure 15A:
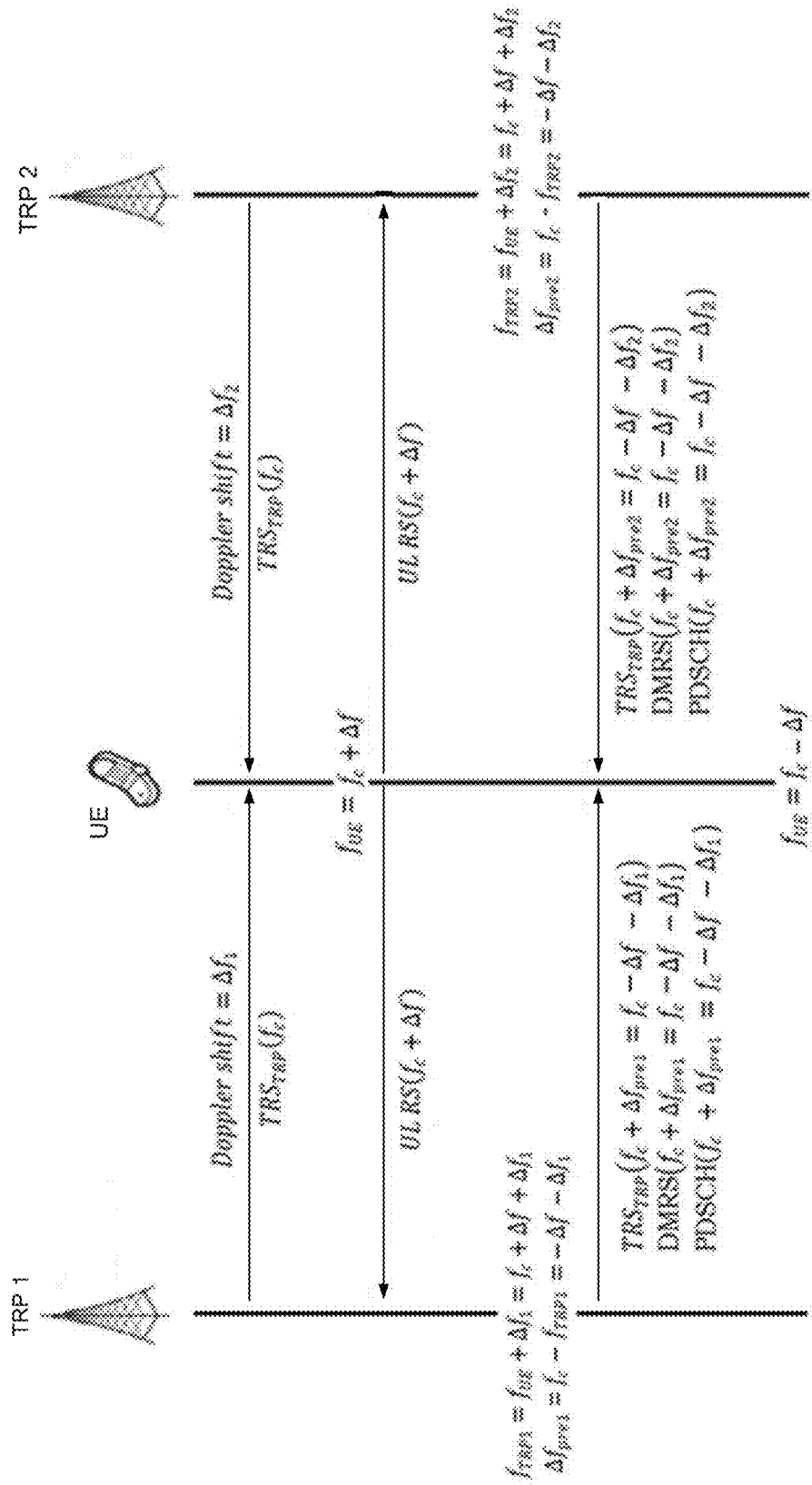
FIGS. 15A and 15B respectively depict example embodiments for a three-step process and a two-step process for network frequency-offset precompensation that provides TRP-specific frequency offset precompensation independently for each TRP according to the subject matter disclosed herein.
Figure 15B:
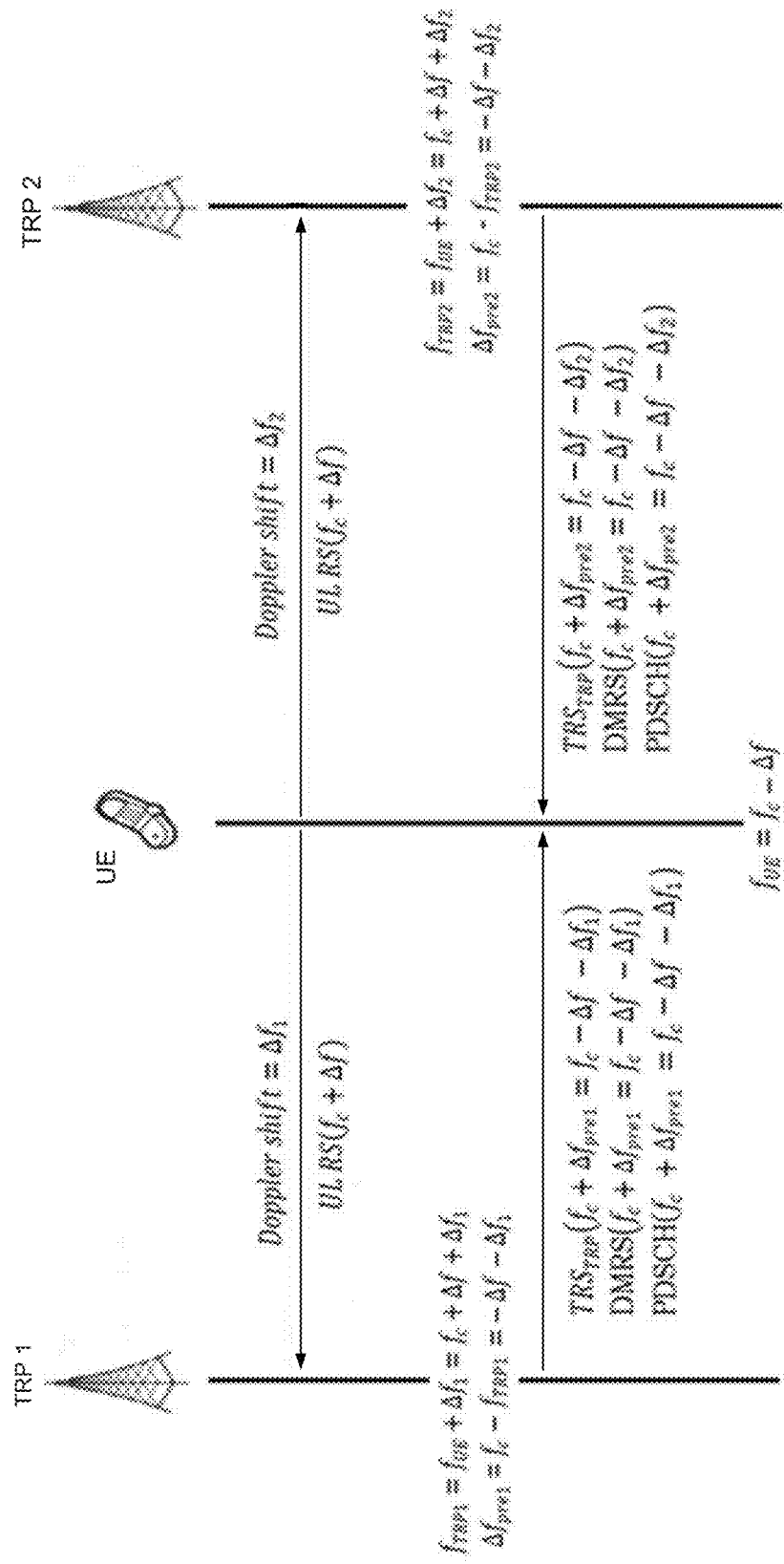

FIGS. 15A and 15B respectively depict example embodiments for a three-step process and a two-step process for network frequency-offset precompensation that provides TRP-specific frequency offset precompensation independently for each TRP according to the subject matter disclosed herein. It should however be noted that only the three-step-process embodiment of FIG. 15A may be considered for a situation in which frequency offset is precompensated for all downlink transmission (i.e., TRS, DMRS and PDSCH). With the two-step process, an uncompensated TRS may not be considered as the QCL RS of PDSCH DMRS due to a QCL rule break while channel estimation still involves a QCL RS of PDSCH DMRS to extract a Doppler-shift-related large-scale profile.

SFN-Manner TRS Transmission

A SFN-manner TRS transmission may involve a high-complexity UE to accurately estimate significantly different Doppler shifts based on a composited TRS. If the network precompensates the different Doppler shifts from two TRPs, a high-complexity UE may not be needed for channel estimation and PDSCH demodulation.

In the embodiments disclosed herein using a three-step or a two-step process for network frequency offset precompensation with TRP-specific TRS transmission, the value of estimated carrier frequency at a UE may not need to be accurate because the estimated carrier frequency is only used for an uplink RS transmission to two TRPs and the network may precompensate the Doppler shift difference of the two TRPs.

A second embodiment disclosed herein involves a UE and network collaboration with a SFN-manner TRS transmission (i.e., TRSsFN). It may be noted that using a SFN-manner TRS transmission with network frequency-offset precompensation may reduce UE complexity with backward compatibility with a traditional HST-SFN deployment scenario, however, a high TRS overhead may still be involved.

Network Frequency Offset Precompensation with Implicit UE Indication

Figure 16A:
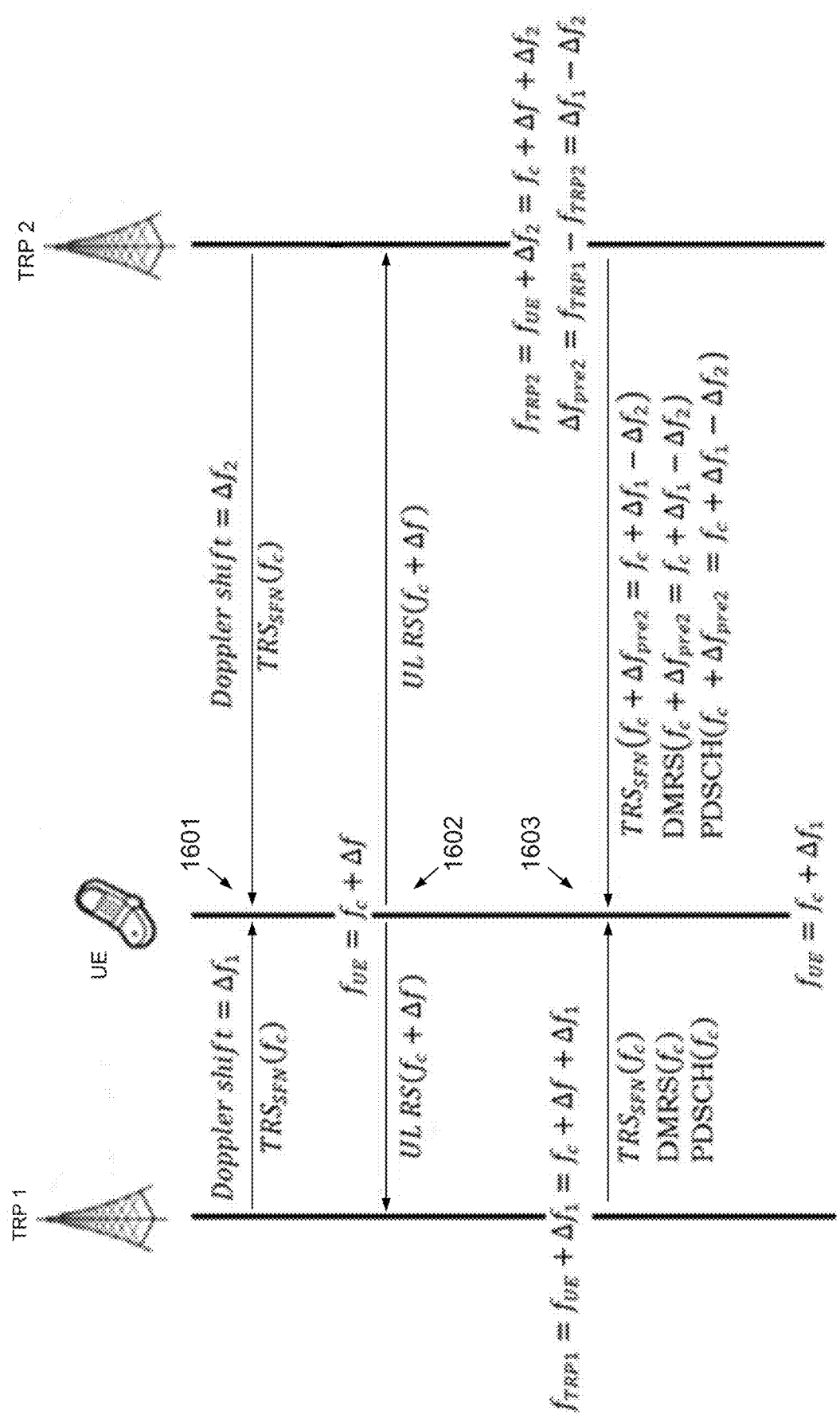
FIGS. 16A and 16B respectively depict a second embodiment for a three-step process and a two-step process for network frequency-offset precompensation that uses a SFN-manner TRS transmission with implicit UE indication according to the subject matter disclosed herein.
Figure 16B:
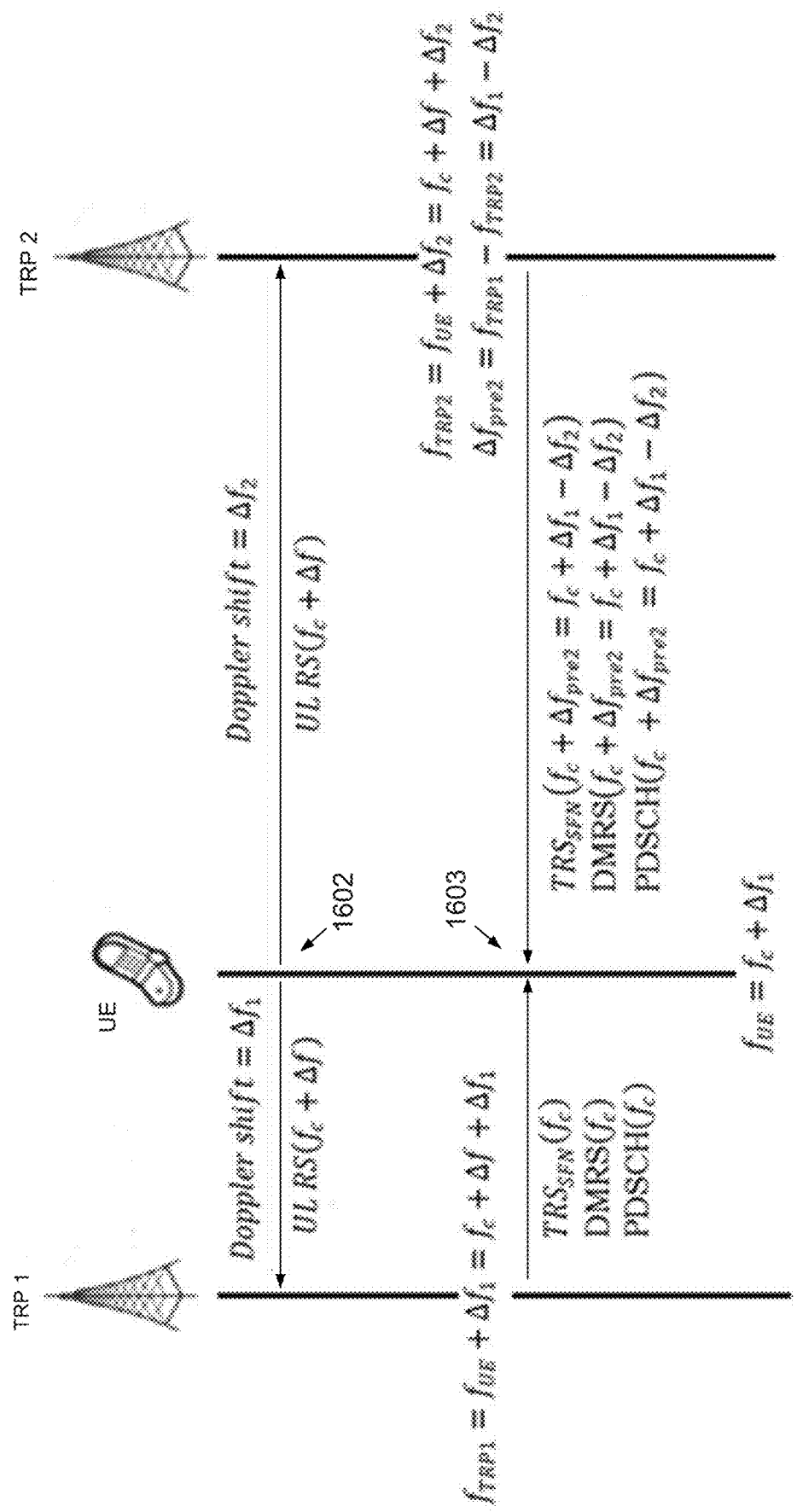

FIGS. 16A and 16B respectively depict a second embodiment for a three-step process and a two-step process for network frequency-offset precompensation that uses a SFN-manner TRS transmission with implicit UE indication according to the subject matter disclosed herein. In the embodiment depicted in FIG. 16A, a set of TRS may be transmitted from two TRPs at 1601. At 1602, a UE transmits an uplink reference signal to the two TRPs. At 1603, the network estimates a frequency offset difference at the two TRPs and precompensates the Doppler shift difference for downlink transmission for the non-reference TRP. For this embodiment, the TRS transmission at both 1601 and 1603 may be based on a SFN-manner. The embodiment depicted in FIG. 16B is similar to the embodiment of FIG. 16A, but starts at 1602 because the first step at 1601 is not used for a two-step process. It may be noted that only the embodiment of FIG. 16A involves a frequency offset may be precompensated for the TRS as well as DMRS and PDSCH because channel estimation involves the QCL source of PDSCH DMRS for Doppler shift and a SFN-manner TRS may not be QCL RS in the embodiment of FIG. 16B because of a QCL rule break unless an additional resource is provided for that a QCL rule break, which may not be practical.

For a SFN-manner TRS transmission in FIG. 16A, a UE estimates the UL carrier frequency for a SRS transmission based on a received composited TRS. A high-complexity UE may track multiple Doppler shifts from a single composited TRS and there may be a high likelihood that the UE may estimate an incorrect frequency offset at 1602. However, the value of estimated carrier frequency at the UE does not involve any significant operational error because the estimated carrier frequency is only used for an uplink RS transmission to two TRPs so that the network may estimate and compensate frequency offset difference of the two TRPs.

For delay-related large-scale profile using the embodiments of FIGS. 16A and 16B, there is no QCL rule break considering the QCL RS for the DMRS and PDSCH is the TRS on the second TRS transmission in which both TRS and the corresponding DMRS port(s) experience a composite channel considering a major path for each TRP. The SFN-manner transmission may, however, involve a high TRS overhead in order to derive the QCL properties of dynamic switching among TRPs.

Frequency offset is always compensated for the TRS as well as DMRS and PDSCH for Doppler-shift related large-scale profile in the embodiments of FIGS. 16A and 16B, so there would not be any issue for QCL rule on Doppler shift information and also for UE-side frequency offset tracking and compensation based on received TRS.

Figure 17A:
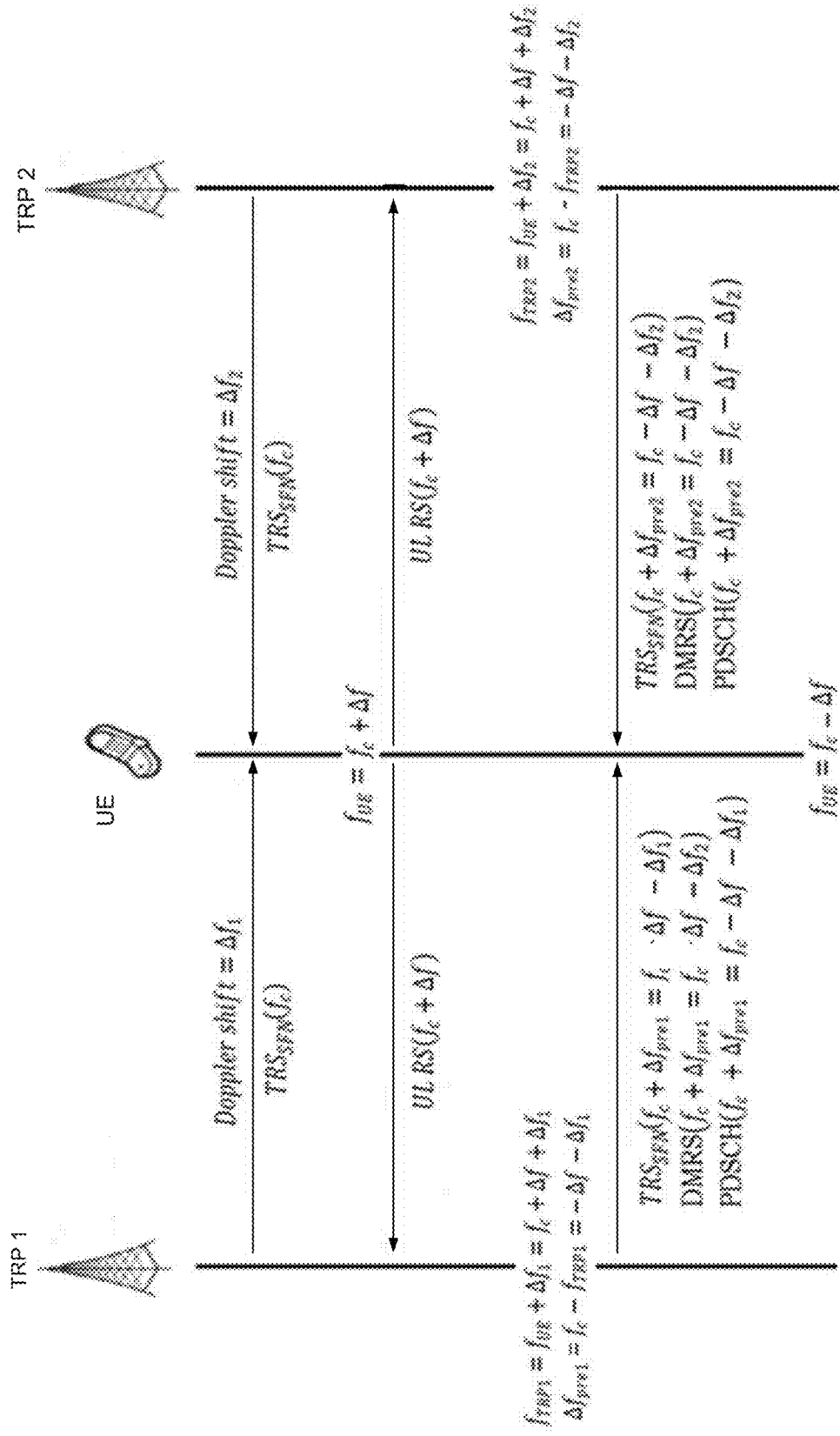
FIGS. 17A and 17B respectively depict example embodiments for a three-step process and a two-step process that use a SFN-manner TRS transmission with network precompensation provided independently for each TRP according to the subject matter disclosed herein.
Figure 17B:
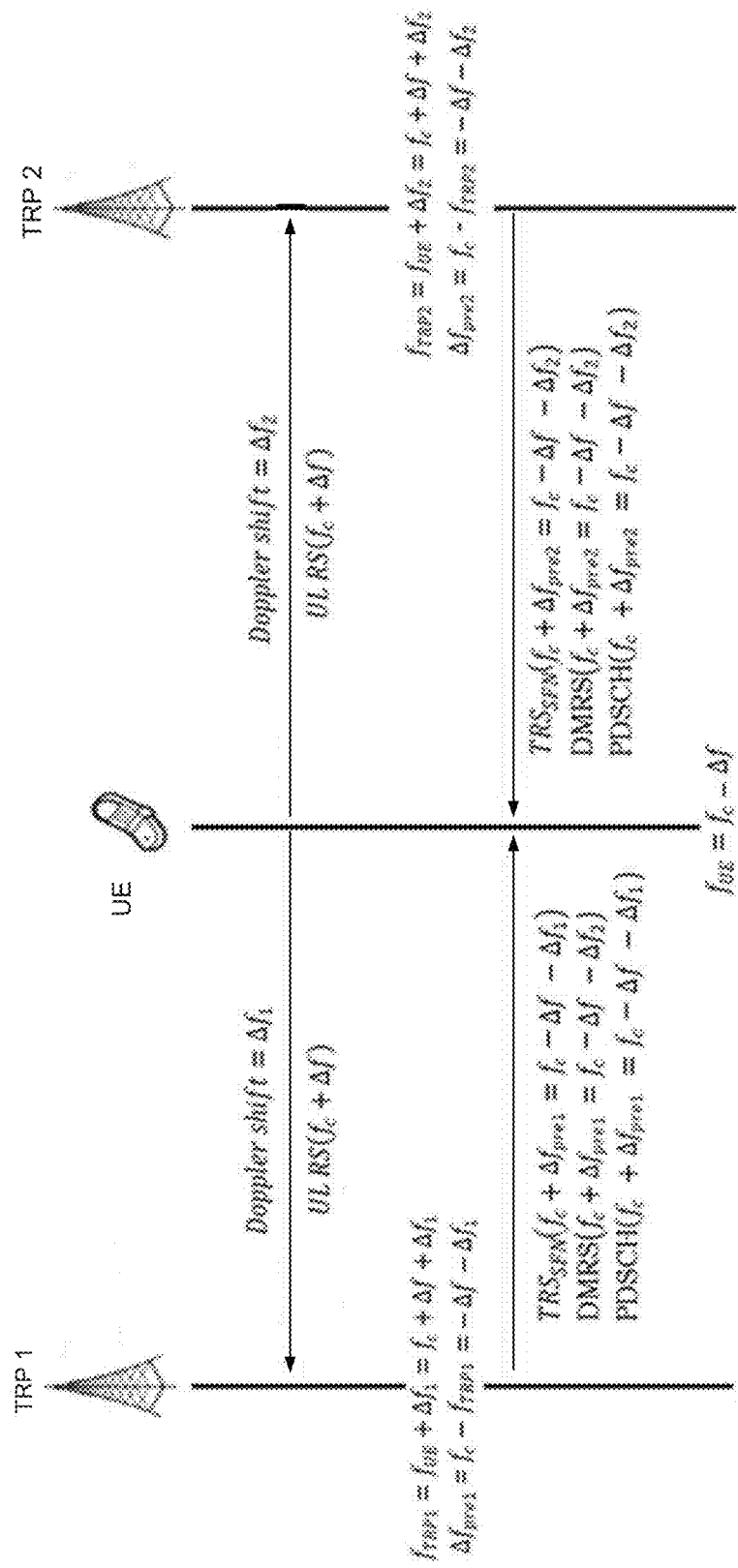

FIGS. 17A and 17B respectively depict example embodiments for a three-step process and a two-step process that use a SFN-manner TRS transmission with network precompensation provided independently for each TRP according to the subject matter disclosed herein. The explanations provided for FIGS. 16A and 16B are applicable to the embodiments of FIGS. 17A and 17B.

Figure 18:
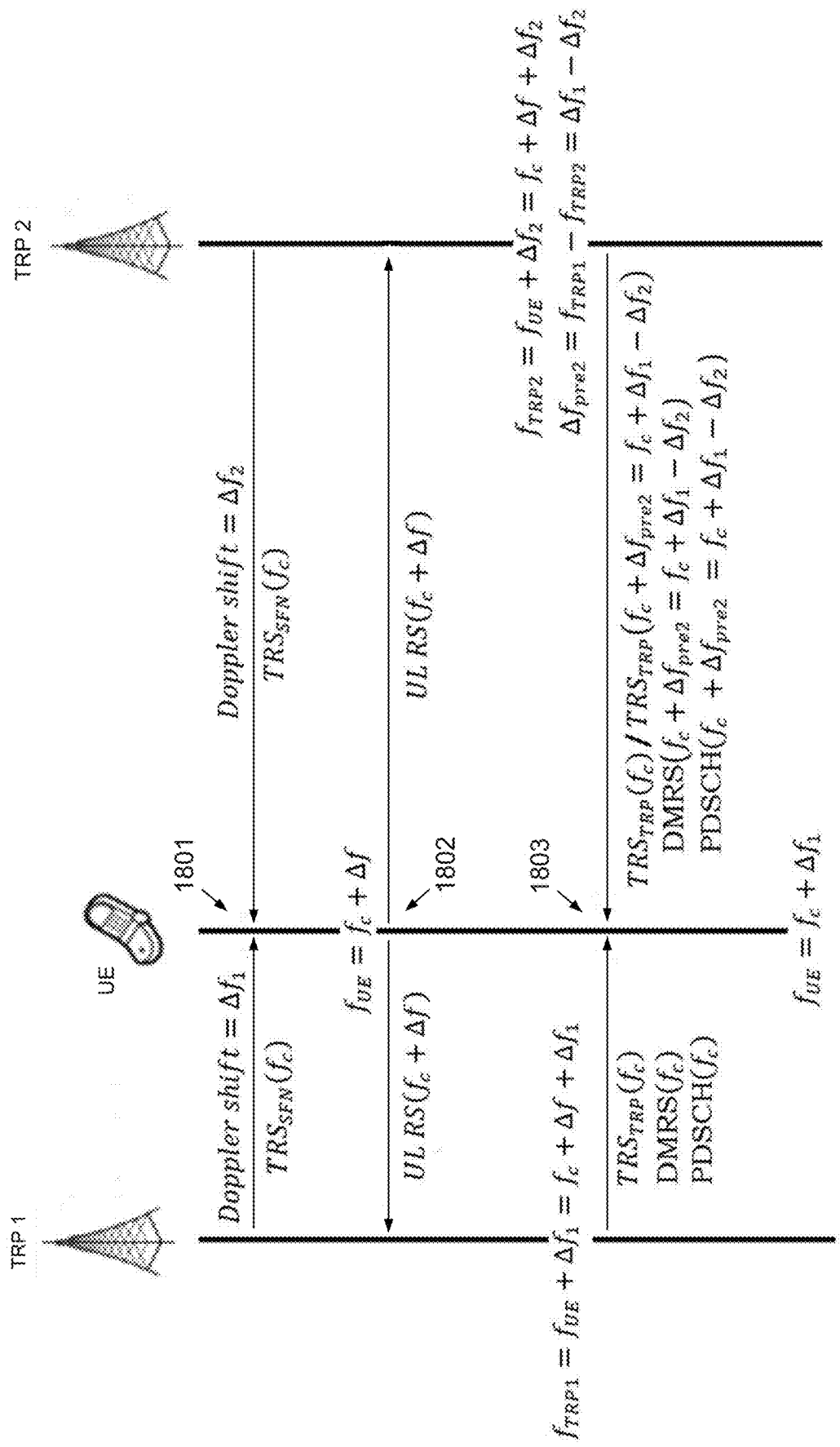
FIG. 18 depicts another aspect of the second embodiment combines SFN and TRP-specific TRS transmission for a three-step process according to the subject matter disclosed herein.

Another aspect of the second embodiment combines SFN and TRP-specific TRS transmission for a three-step process, as shown in FIG. 18. At 1801, a TRS transmission is made in a SFN manner. At 1802, the UE sends an UL RS. At 1803, a second TRS transmission is sent that is TRP-specific. The TRP-specific transmission provides an independent delay-spread information estimation and TRS overhead reduction for dynamic switching. Also, similar to a TRP-specific TRS transmission, frequency-offset difference precompensation at a gNB for downlink transmission may be used either for all TRS, DMRS and PDSCH, or only for DMRS and PDSCH and not TRS transmission.

The second set of TRS may be considered as the QCL RS for the DMRS and PDSCH. With TRP-specific TRS, a traditional QCL rule for delay-related large-scale profile may not hold because TRSs are transmitted as TRP-specific while DMRS and PDSCH are transmitted in an SFN manner. To address this issue, it is noted that a Rel-17 UE may be activated with a TCI codepoint having two TCIs. In the current specification, the two activated TCI states correspond to different DMRS ports. Here, the approach is that a UE may associate the PDSCH DMRS port(s) with both TCIs simultaneously (i.e., one TCI state per each TRP). That is, multiple-QCL assumptions may be considered for the same DMRS ports. The DMRS antenna port associated with each TRP may be configured to be QCL with the TRS transmitted from that TRP.

In a dynamic-switching scenario of FIG. 9A for a Doppler-shift related large-scale profile using the approach of FIG. 18, there would not be any issue for QCL rule on Doppler-shift information and also for a UE-side frequency offset tracking and compensation based on received TRS. The QCL RS of the PDSCH DMRS is, however, the second TRS transmitted from the reference TRP with QCL type B and a new QCL type may be introduced for TRS of a non-reference TRP that only contains a delay-related large-scale profile. Also, a gNB should indicate to a UE that only TRS of the reference TRP may be considered as the QCL RS for Doppler shift-related large-scale profile.

Figure 19:
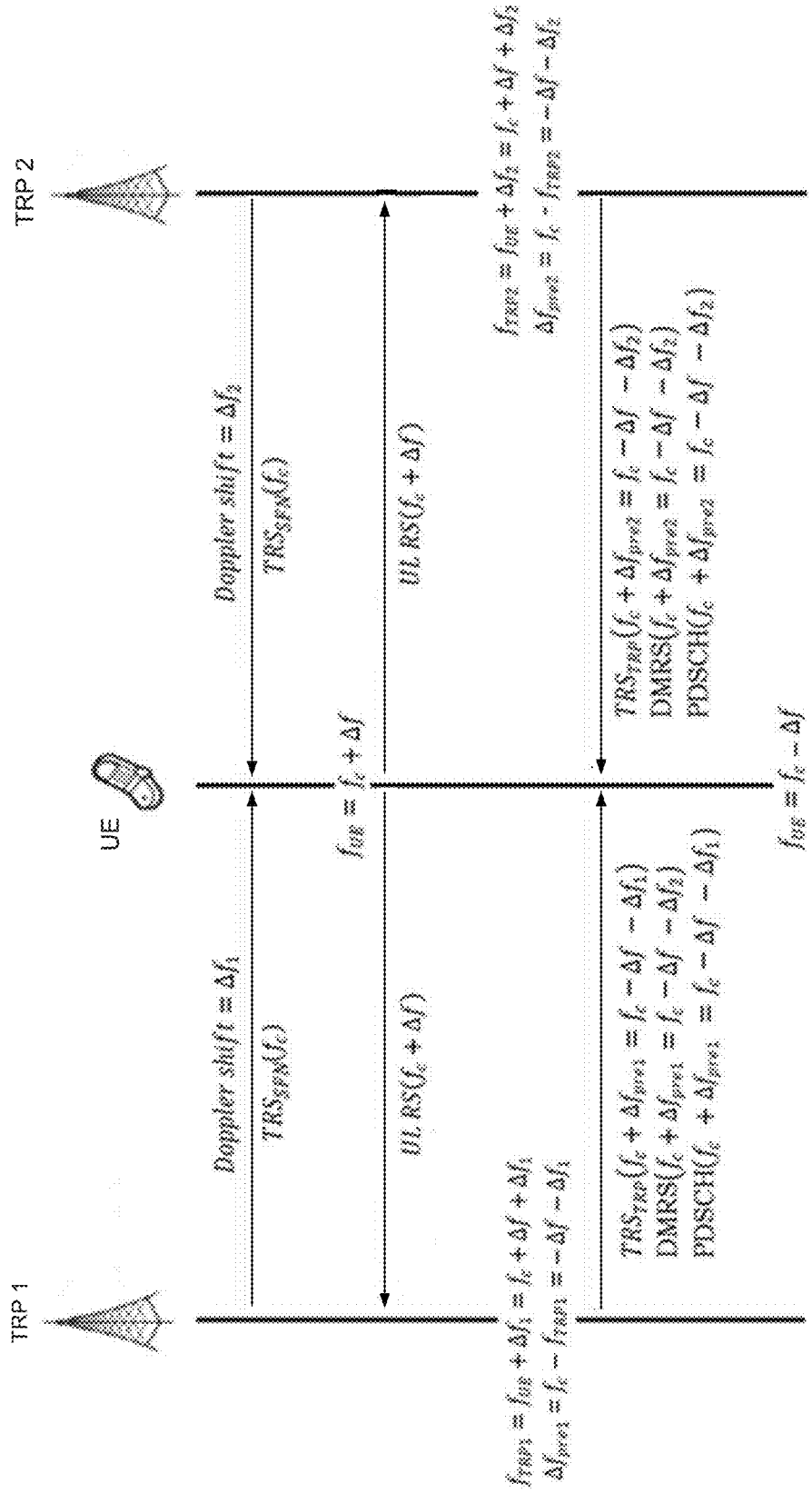
FIG. 19 shows yet another aspect of the second embodiment that combines SFN and TRP-specific TRS transmission with network precompensation of Doppler shift provided independently for each TRP according to the subject matter disclosed herein.

FIG. 19 shows another aspect of the second embodiment that combines SFN and TRP-specific TRS transmission with network precompensation of Doppler shift provided independently for each TRP according to the subject matter disclosed herein. The explanation of aspect of the second embodiment depicted in FIG. 18 is applicable to the aspect of the second embodiment depicted in FIG. 19, except that aspect depicted in FIG. 19 may only be considered for a situation in which frequency offset is precompensated for all downlink transmissions (i.e., TRS, DMRS and PDSCH) based on a QCL rule-breaking issue.

Table 1 sets forth a summary of some features and characteristics associated with the first and second embodiments.

TABLE 1

| TRP-specific | SFN-manner | Combined SFN-TRP specific |
|---|---|---|
| QCL rule break for delay, spread and average delay information. | TRS overhead, UE complexity. | QCL rule break for delay, spread and average delay information. |
| TRS overhead reduction, less UE complexity. | No QCL rule break, backward compatibility. | backward compatibility, TRS overhead reduction, less UE complexity. |

QCL Assumption of TRS as Target RS

Figures 20, 21:
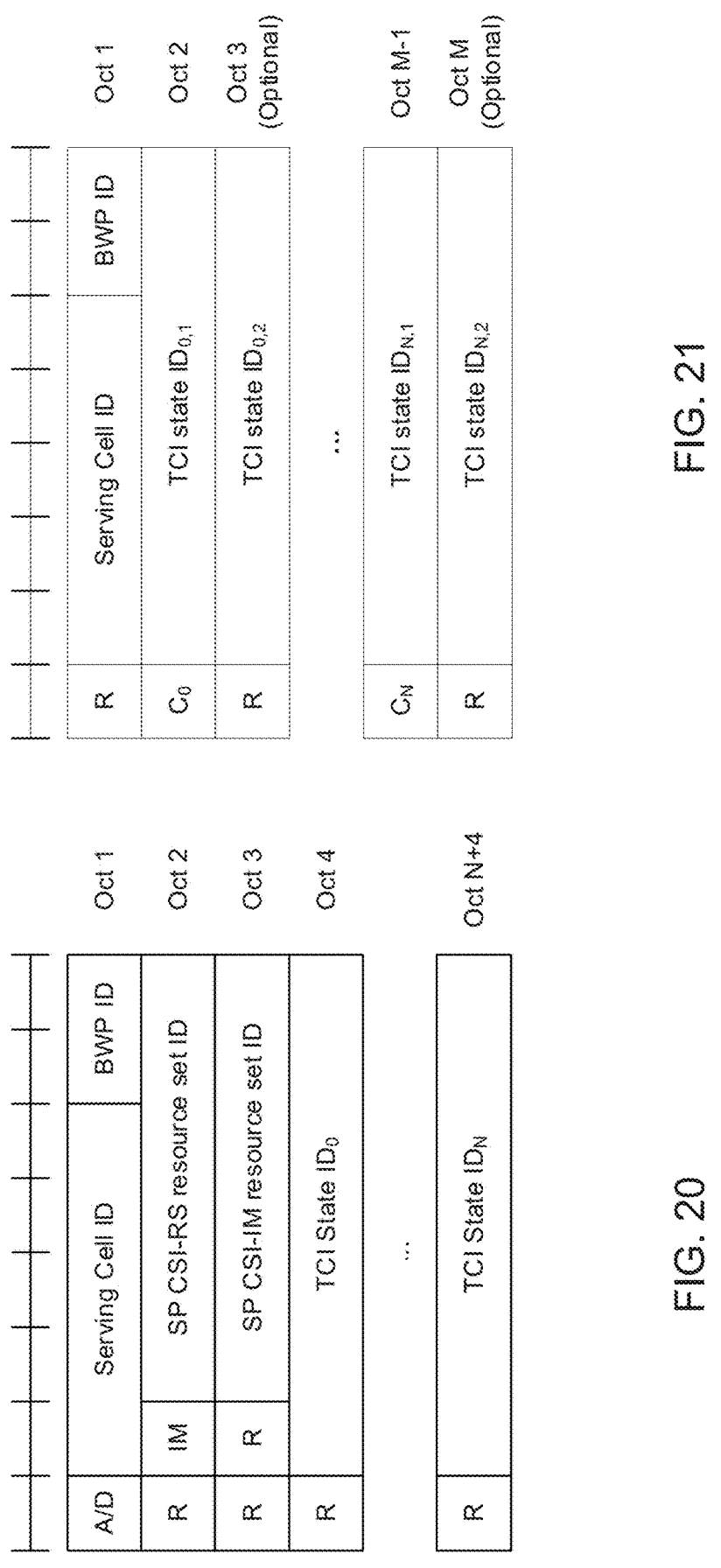

QCL relationship information may help a UE with channel estimation, frequency offset estimation and synchronization processes. The QCL relationship of a TRS reference signal may be configured per resource through NZP-CSI-RS-Resource for periodic resources, as shown below. For semi-persistent resources, the QCL relationship of a TRS reference signal may be configured through a Medium Access Control (MAC) Control Element (CE) triggering process, as shown in FIG. 20. For aperiodic resources, the QCL relationship of a TRS reference signal may be configured through a DCI triggering process for aperiodic resources, as shown below.

NZP-CSI-RS-Resource Information Element a) Periodic

```
NZP-CSI-RE-Resource ::=      SEQUENCE {
    ...
    qcl-InfoPeriodicCSI-RS        TCI-StateId    OPTIONAL,  -- Cond Periodic
    ...
}
``` b) Aperiodic

```
CSI-AperiodicTriggerStateList information element

CSI-AperiodicTriggerStateList ::=    SEQUENCE (SIZE (1..maxNrOfCSI-AperiodicTriggers) ) OF CSI-
AperiodicTriggerState
CSI-AperiodicTriggerState ::=        SEQUENCE {
    associatedReportConfigInfoList        SEQUENCE
(SIZE(1..maxNrofReportConfigPerAperiodicTrigger)) OF CSI-AssociatedReportConfigInfo,
    ...
}
```

-continued

| CSI-AperiodicTriggerStateList information element |
|---|
| ```
CSI-AssociatedReportConfigInfo ::=   SEQUENCE {
    reportConfigId                   CSI-ReportConfigId,
    resourcesForChannel              CHOICE {
      nzp-CSI-RS                       SEQUENCE {
        resourceSet                      INTEGER (1..maxNrofNZP-CSI-RS-ResourceSetsPerConfig),
        qcl-info                         SEQUENCE (SIZE(1..maxNrofAP-CSI-RS-ResourcesPerSet)) OF
TCI-StateId       OPTIONAL    -- Cond Aperiodic
    },
    ...
}
``` |

For a semi-persistent CSI-RS resource set activation/deactivation by MAC CE (FIG. 20), a MAC CE structure indicates the index of NZP-CSI-RS-ResourceSet contains semi-persistent NZP CSI-RS resources as well as TCI-StateIds that may be used as a QCL source for the resources within the indicated resource set. For aperiodic CSI-RS, CSI request field in DCI format 0_1 may take up to 6 bits (determined by a higher layer parameter reportTriggerSize within CSI-MeasConfig) that selects one among all trigger states. The TCI state and QCL information may be configured inside CSI-AssociatedReportConfigInfo for each nzp-CSI-RS.

The large-scale radio-channel characteristics, such as Doppler shift, Doppler spread, average delay and delay spread, may be common across different antenna ports. A QCL-type relationship may be introduced to support a UE for channel estimation, frequency-offset estimation and synchronization processes in reception of PDCCH and PDSCH. In the current specification, four different types of QCL relationship are defined to indicate channel large-scale characteristics across a set of QCL antenna ports, as below:

QCL type A: {Doppler shift, Doppler spread, average delay, delay spread},
QCL type B: {Doppler shift, Doppler spread},
QCL Type C: {Doppler shift, average delay}, and
QCL Type D: {spatial receiver parameters}.

For all of the embodiments disclosed herein, a QCL reference signal for TRS transmission at a first step (applicable to a three-step process) may be a specific Synchronization Signal/Physical Broadcast Channel (SS/PBCH) block or any other CSI reference signal with QCL type A covering QCL relation for both delay and Doppler-shift related large-scale profile. A QCL type D reference signal for TRS transmission at the first step may used as a corresponding TRP-specific SS/PBCH block.

For a second TRS transmission (at the third step for a three-step process or at the second step for a two-step process), however, the situation for TCI state and QCL information configuration may be different. The QCL reference signal of the second transmitted TRS may be defined differently depending on the fact that that the network precompensates frequency offset for all TRS, DMRS and PDSCH, or that the network precompensates frequency offset only for DMRS and PDSCH and not TRS. A QCL type D reference signal for the second TRS transmission, in both types of cases (a three-step or a two-step processes) may be a corresponding TRP-specific SS/PBCH block or a first TRS transmitted from the corresponding TRP.

With a three-step process, the QCL RS of the second TRS transmitted from the reference TRP may be the first TRS transmitted from the reference TRP. Alternatively, the QCL RS of the first TRS transmitted from the reference TRP with QCL type A (i.e., all Doppler shift, Doppler spread, average delay and delay-spread information) may be the first TRS transmitted from the reference TRP. Also, for a delay-related large-scale profile, the QCL RS for the second TRS transmitted from a non-reference TRP may be the first TRS transmitted from that TRP or the QCL RS of the first TRS transmitted from that TRP with a new QCL type definition that only includes average delay and delay-spread information. For a Doppler-shift-related large-scale profile, the QCL RS for the second TRS transmitted from a non-reference TRP may be the first/second TRS transmitted from the reference TRP or the QCL RS of the first/second TRS transmitted from the reference TRP with QCL type B.

As there may be no TRS transmission at the first step with two-step process, the QCL RS of the TRS transmitted from the reference TRP may be a specific SS/PBCH block or any other CSI reference signal with QCL type A, while the QCL RS of the TRS transmitted from the non-reference TRP may be a specific SS/PBCH block or any other CSI reference signal with new QCL type for delay spread and average delay information and for Doppler shift and Doppler-spread information. The QCL RS of the TRS may be TRS transmitted from the reference TRP or the QCL RS of the TRS transmitted from the reference TRP with QCL type B.

In the current specification, each TCI-State contains a QCL relationship for one or two downlink reference signals with two different QCL types. For the second TRS transmission from a non-reference TRP in a three-step process and the TRS transmission in a two-step process, in addition to QCL type D, another two different QCL types may be used (i.e., a new QCL type for delay-related large-scale profile and a QCL type B for Doppler shift-related large-scale profile). To address this issue, the specification may be modified to allow up to three different QCL types as well as DL reference signals configuration in each TCI state.

With a three-step process, the QCL RS of the second TRS transmitted from each TRP may be the first TRS transmitted from that TRP, or may be the QCL RS of the first TRS transmitted from that TRP with QCL type A. With a two-step process, the QCL RS of the TRS transmitted from each TRP may be a specific SS/PBCH block or any other CSI reference signal with QCL type A.

Additionally, with a three-step network precompensation, there may be two different situations to consider. First, both TRS transmissions are from the same resource set, and second, two different TRS resource sets may be configured for first and second TRS transmission.

A first situation involves a QCL information update for the second TRS transmission as the network precompensation of frequency offset breaks the previously configured QCL relation information of TRS resources. In this situation, a MAC CE may be used to update the QCL information of the TRS resources in the set similar to the current MAC CE structure for activation/deactivation of semi-persistent CSI- RS as shown in FIG. 20. Alternatively, the network may only configure QCL type D, a new QCL type that only includes delay-related large-scale profile information, and the corresponding reference signals in TCI state of TRS as the source RS. The RS of QCL type B for TRS as source RS may be the TRS itself.

Additionally, the first scenario assumption may be compatible with no further impact because the second TRS transmission is not precompensated by the network. It may be noted that in this scenario, the QCL type D reference signal may be the corresponding TRP-specific SS/PBCH block.

For the second scenario assumption, the QCL RS of the second TRS transmitted from the reference TRP may be the first TRS transmitted from that TRP or the QCL RS of the first TRS transmitted from that TRP with QCL type A. The QCL RS for the second TRS transmitted from the non-reference TRP may be the first TRS transmitted from that TRP or the QCL RS of the first TRS transmitted from that TRP with QCL type A. While for a delay-related large-scale profile, the QCL RS for the second TRS transmitted from the non-reference TRP may be the first TRS transmitted from that TRP. Alternatively, the QCL RS of the first TRS transmitted from that TRP may include a new QCL type that only includes average delay and delay-spread information. For a Doppler-shift related large-scale profile, the QCL RS for the second TRS transmitted from the non-reference TRP may be the first/second TRS transmitted from the reference TRP. Alternatively, the QCL RS of the first/second TRS may be transmitted from the reference TRP with QCL type B. It is noted that in the second scenario, the QCL type D reference signal may be the corresponding TRP-specific SS/PBCH block, or may be the first TRS transmitted from the corresponding TRP.

With a frequency-offset precompensated TRS, the second TRS transmitted from non-reference TRP should be configured with a dynamic carrier frequency as the Doppler frequency shift changes over time as a UE moves or changes speed. As different TRS transmission occasions would have different precompensation status, a frequency tracking mechanism at a UE may suffer from an averaging/accumulation issue. This issue may be addressed with a dynamic QCL information update for the second TRS transmission. The dynamic update, as previously mentioned, may be used based on the fact that the network precompensation of frequency offset breaks the previously configured QCL relation info of TRS resources. With a dynamic update of QCL source RS, TCI state changes for precompensated TRS may provide an indication to a UE not to do averaging/accumulation for the TRS transmission occasions.

An alternative solution may be that a gNB may indicate to a UE to only use transmitted TRS from reference TRP for carrier frequency estimation to maintain averaging/accumulation structure of frequency loop. The reference TRP may be realized either by QCL indication in DCI scheduling PDSCH or pre-configured/semi-statically indicated to a UE.

TRP-Specific TRS and DMRS Transmission

With a TRP-specific TRS transmission, a UE may be able to estimate two significantly different large-scale profiles especially for Doppler-shift based on the two separate TRSs. A UE, however, may still include a high complexity for per-tap Doppler shifts channel estimation. That is, the channel coefficients may be calculated using the estimated per tap frequency offset and then a tap-dependent time-domain channel interpolation may be performed to improve the channel-estimation performance and throughput. An alternative solution to improve DMRS channel estimation performance with a less complex UE may be that each TRP may use an independent DMRS port in PDSCH.

With a TRP-specific TRS and DMRS transmission, a UE may estimate the propagation channel for each TRP orthogonally based on each DMRS antenna port mapped to each TRP. The UE then may reconstruct a composite SFN channel by combining of the estimated channels from different TRPs. This may reduce complexity of a UE channel estimation algorithm having improved performance. Hence, network collaboration for precompensation of frequency Doppler shifts may no longer be used and a UE may take care of significantly different frequency offsets from two TRPs with low complexity.

An enhanced Rel-17 MAC-CE may activate two TCI states per a TCI code point. That may enable a UE to associate DMRS with both TCIs simultaneously. To address this, one solution may be using a comb-like TCI state allocation in which even-comb REs may be assigned to the first TCI state and odd-comb REs may be assigned to the second TCI state. For a DMRS type 1, this may mean that each TCI state may be allocated to one CDM group. Hence, generalizing this solution, each CDM group may be assigned to one TCI state at least for DMRS type 1.

Another solution may be to allocate the TCI state in TD-OCC manner in which two orthogonal DMRS ports in one CDM group may be assigned to two different TCI states. All of the embodiments disclosed herein may allow a UE to use an orthogonal channel estimation algorithm.

Rel-16 and Rel-17 Schemes Dynamic Switching

For a TRP-based precompensation, the same DMRS port(s) may associate with up to two TCI states. This may be interpreted as an implicit indication/switching between a Rel-17 SFN-based frequency-offset precompensation technique and a single TRP or Rel-15 SFN frequency-offset precompensation technique. With reuse of a Rel-17 enhanced TCI states activation/deactivation MAC CE structure, as shown in FIG. 21, each codepoint of TCI field in DCI for UE-specific PDSCH may be mapped to up to two TCI states. With this structure, if Ci=0 (i.e., TCI codepoint in DCI indicates a TCI state ID that only has one mapped TCI state), a PDSCH transmission may be a single TRP and if Ci=1 (i.e., TCI codepoint in DCI indicate a TCI state ID that has two mapped TCI states), a PDSCH transmission may be a Rel-17 SFN scheme.

Both Rel-17 SFN schemes and Rel-16 non-SFN schemes (i.e., SDM, FDM and TDM schemes) may be beneficial for HST deployment scenarios. The Rel-17 SFN schemes may provide high reliability/coverage for a cell edge or high speed UEs while Rel-16 non-SFN schemes may provide high throughput for a cell center or low speed UEs. Hence, the network should support dynamic switching/indication of the scheduled PDSCH between Rel-16 non-SFN and Rel-17 SFN schemes.

TRP-specific TRS transmission with precompensated frequency offset may involve two separate QCL types, one for delay-related large-scale profile (i.e., a new QCL type) and one for a Doppler-shift related large-scale profile (i.e., QCL type B) in addition to QCL type D. That means that up to three different QCL types may be introduced in one TCI state to handle TRS transmission with precompensated frequency offset. This enhanced TCI state may be an indication of a Rel-17 SFN scheme. A UE may determine that PDSCH is transmitted in a Rel-17 SFN scheme or in Rel-16 non-SFN schemes based on a number of different QCL types defined inside the indicated TCI state.

PTRS Enhancement and CPE Compensation

In Rel-17, PDCCH and PDSCH in HST-SFN scenarios may be transmitted in SFN manner with two TCI-states. The PDSCH transmission with two TCI states may involve two Phase Tracking Reference Signal (PTRS) ports (each TCI state corresponding to one TCI state), for accurate phase tracking at a UE particularly when different panels are used to receive PDSCHs transmitted from different TRPs simultaneously.

The current specification supports two PTRS ports for SDM scheme in multi-TRP in which two TCI states may be indicated by one TCI code point. The first PTRS port may be associated with the lowest indexed DMRS port within the DMRS ports corresponding to the first indicated TCI state and second PTRS port may be associated with the lowest indexed DMRS port within the DMRS ports corresponding to the second indicated TCI state. To expand the current specification for multi-TRP situations in HST-SFN scenarios, two port PTRS may be supported to provide accurate phase tracking at a UE in which each PTRS port corresponds to one TCI state.

Two scenarios may be considered for DMRS transmission in HST-SFN scenarios, TRP-specific DMRS transmission (SFN TRP-specific) and SFN manner DMRS transmission (SFN manner). For both of these transmission types, support of two-port PTRS may result in more accurate phase tracking at a UE.

In the current specification, the frequency density, time density, resource-element offset and Energy Per Resource Element (EPRE) ratio of PTRS are RRC configured through a higher layer parameter PTRS-DownlinkConfig. With a two-port PTRS approach for HST-SFN downlink transmission and following the current specification, these parameters may be RRC configured for each of PTRS ports. The number of PTRS ports may be RRC configured similar to PTRS configuration for an uplink transmission in the current specification. With dynamic switching between a Rel-17 SFN scheme and a single TRP or Rel-15 SFN scheme, a maximum number of PTRS ports may be semi-statically configured and a UE may ignore a certain PTRS port when processing an unrelated PDSCH. Alternatively, the number of PTRS ports may be dynamically updated/activated. This may be done with an explicit RRC configuration of two PTRS ports for Rel-17 SFN scheme that may be activated through DCI. The number of PTRS ports may be implicitly indicated by TCI codepoint in DCI. With enhanced TCI states activation/deactivation MAC CE structure, each codepoint of a TCI field in DCI for a UE-specific PDSCH may be mapped to up to two TCI states. With this structure, if Ci=0 (i.e., a TCI codepoint in DCI indicates a TCI state ID that only has one mapped TCI state), a PDSCH transmission may be a single TRP with one port PTRS, and if Ci=1 (i.e., a TCI codepoint in DCI indicates a TCI state ID that has two mapped TCI states), a PDSCH transmission may be a Rel-17 SFN scheme with two PTRS ports. Alternatively, the signaling of two PTRS ports may be done through a MAC CE activation.

Two Port PTRS in TRP-Specific DMRS Transmission

Channel estimation may be performed orthogonally for each TRP based on the corresponding DMRS antenna port for a TRP-specific DMRS transmission scheme so the phase noise may be estimated and compensated for each TRP orthogonally with two PTRS ports assumption in which each PTRS port corresponds to one TRP (i.e., TCI state). The association of two TCI states and DMRS may be either through a comb-like allocation in which even-comb REs may be assigned to the first TCI state (i.e., the first TRP) and odd-comb REs may be assigned to the second TCI state (i.e., the second TRP). Alternatively, a TD-OCC manner allocation may be used in which two orthogonal DMRS ports in one CDM group may be assigned to two different TCI states. In both these scenarios, the first PTRS port may be associated with the lowest indexed DMRS port within the DMRS ports corresponding to the first TRP (i.e., the first indicated TCI state) and second PTRS port may be associated with the lowest indexed DMRS port within the DMRS ports corresponding to the second TRP (i.e., the second indicated TCI state).

Two Port PTRS in SFN-Manner DMRS Transmission

For a SFN-manner DMRS transmission, the same REs may correspond to two different TCI states. That is, the same DMRS ports may be used by both TRPs simultaneously and DMRS experiences a composite channel. In such a situation, consideration of two PTRS ports transmitted in an SFN manner may not provide much benefit to a UE because channel estimation may be based on composite channel and the same REs may be associated to two PTRS ports with two different indicated TCI state. To avoid two PTRS ports being associated with the same REs having two different TCI states, a PTRS may be transmitted in TRP-specific manner while DMRS and PDSCH may be transmitted in a SFN manner. In this type of situation, the first PTRS port may be associated with the lowest indexed DMRS port within the DMRS ports corresponding to the first TRP (i.e., the first indicated TCI state) and second PTRS port may be associated with a predetermined/preconfigured indexed DMRS port within the DMRS ports corresponding to the second TRP (i.e., the second indicated TCI state). The RE association information for the second PTRS port may be RRC configured or dynamically indicated to the UE, or it may be the second lowest indexed DMRS port. The association of two TCI states and PTRS transmitted from two TRPs may be either comb-like or TD-OCC. This may allow a UE to estimate the corresponding phase noise of each TRP independently. It is, however, noted that because DMRS is transmitted in a SFN manner and channel estimation may be based on the composite channel, separate phase tracking for each TRP may involve a high complexity for a UE implementation. One possible UE implementation may be a tap-based phase-noise compensation in which the phase noise of each TRP may be estimated and compensated for the corresponding channel tap. That is, due to the fact that the channel modeling in HST-SFN scenarios may be based on a line of sight (LOS) propagation path of each TRP.

The transmitted signal from $TRP_i$ in HST-SFN scenarios in the time domain may be written as:

$$x_i(n) = \sum_{k=0}^{N-1} S(k) e^{j\frac{2\pi n}{N}k} e^{j\varphi_i(n)} = \sum_{k=0}^{N-1} S(k)(1 + j\varphi_i(n)) e^{j\frac{2\pi n}{N}k} \quad i = 1,2 \quad (1)$$

The transmitted signal from $TRP_i$ may be written in the frequency domain as:

$$X_i(k) = \frac{1}{N}\sum_{n=0}^{fv-1} x(n) e^{j\frac{-2\pi n}{N}k} \quad (2)$$

$$= \frac{1}{N}\sum_{n=0}^{N-1}\sum_{l=0}^{N-1} S(l)(1 + j\varphi_i(n)) e^{j\frac{-2\pi n}{N}(l-k)}$$

-continued $$= S(k)\left(1 + j\frac{1}{N}\sum_{n=0}^{N-1}\varphi_i(n)\right) + \frac{j}{N}\sum_{n=0}^{N-1}\sum_{l=0,\neq k}^{N-1} S(l)\varphi_i(n)e^{j\frac{2\pi n}{N}(l-k)} \quad i = 1,2$$

in which $\varphi_i(n)$ is the phase noise of $TRP_i$ and $S(k)$ is transmitted data on subcarrier k. Note that $S(k)$ may be the same for both TRPs in HST-SFN scenarios. Equation (2) may be summarized as below:

$$X_i(l) = S(k)(1 + j\overline{\varphi}_i(n)) + \frac{j}{N}\sum_{n=0}^{N-1}\sum_{l=0,\neq k}^{N-1} S(l)\varphi_i(n)e^{j\frac{2\pi n}{N}(l-k)} \quad i = 1,2 \quad (3)$$

in which $\overline{\varphi}_i(n)$ is the Common Phase noise Error (CPE) of $TRP_i$ and may be derived as:

$$\overline{\varphi}_i(n) = \frac{1}{N}\sum_{n=0}^{N-1}\varphi_i(n) \quad i = 1,2 \quad (4)$$

The second sum component in Eqs. (2) and (3) is the ICI part due to channel variation within an OFDM symbol, which may be caused by the phase noise error. The received signal at a UE may be derived as follow in frequency domain as:

$$Y(k) = \sum_{i=1}^{2} H_i(k)X_i(k) \quad (5)$$

$$= S(k)\sum_{i=1}^{2} H_i(k)(1 + j\overline{\varphi}_i) +$$

$$\frac{j}{N}\sum_{i=1}^{2} H_i(k)\sum_{n=0}^{N-1}\sum_{l=0,\neq k}^{N-1} S(l)\varphi_i(n)e^{j\frac{2\pi n}{N}(l-k)} + W(k)$$

in which w(n) is the additive white Gaussian noise. If the ICI part is treated as additive noise and is included in W(k), the received signal may be simplified and rewritten as:

$$Y(k) = \sum_{i=1}^{2} H_i(k)X_i(k) = S(k)\sum_{i=1}^{2} H_i(k)(1 + j\overline{\varphi}_i) + W(k) \quad (6)$$

Figure 22:
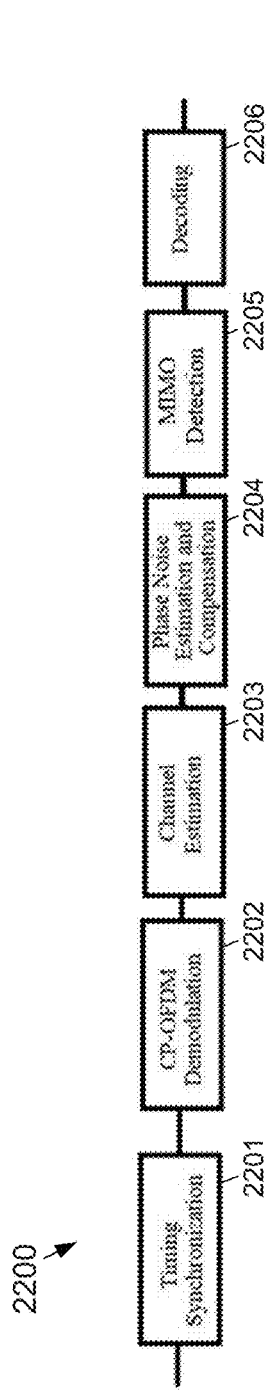
FIG. 22 shows a block diagram of an example embodiment of a UE receiver for demodulating and decoding the received data.

FIG. 22 shows a block diagram of an example embodiment of a UE receiver 2200 for demodulating and decoding the received data. The UE receiver 2200 may include a timing synchronization unit 2201, a CP-OFDM demodulation block 2202, a channel estimation block 2203, a phase noise estimation and compensation block 2204, a MIMO detection block 2205 and a decoding block 2206 connected as shown. The different functional blocks of the UE receiver 2200 may be provided by modules and/or circuits. The channel estimation block 2203 may estimate the channel based on the received DMRS and because DMRS may be transmitted in SFN manner, the channel estimation may be based on a composite channel. That is, the estimated channel in frequency domain is $H_{est}(k)=H_1(k)+H_2(k)$ with which a received signal is equalized. However, as shown in Eqs. (5) and (6), the phase-noise compensation involves a TRP-specific channel estimation. To address this issue, an implementation of a UE receiver may include a tap-based phase-noise compensation technique.

Modeling of the propagation channel in HST-SFN scenarios may be based on LOS propagation path of TRPs. In HST-SFN scenarios having two TRPs, a channel may be represented by a two-tap model in the time domain in which each tap corresponds to the LOS path from one TRP. That is, the time domain channel model is:

$$h(n) = \sum_{i=1}^{2} h_i\delta(n - \tilde{\tau}_i) \quad (7)$$

in which $h_i$ is the complex channel gain (i.e., $h_i=a_i e^{j\theta_i}$) corresponding to the Line of Sight (LOS) propagation path from $TRP_i$, $$\tilde{\tau}_i = \left\lfloor \frac{\tau_i}{T_s/N} \right\rfloor$$

is tap delay quantized to the time-domain resolution and $T_s$ is the symbol duration including CP. In other words, although the channel estimation block in FIG. 22 estimates the composite channel because the channel structure in the time domain may be tap-based per TRP. The estimated channel for each TRP (i.e., $H_i(k)$) may possibly be derived from the estimated composite channel (i.e., $H_{est}(k)$)

This may be provided by an extra functional block to perform TRP-specific channel estimation by taking the estimated channel $H_{est}(k)$ into the time domain and then separately taking each tap of the time-domain channel (i.e., $h_i$ in Eq. (7)) back into frequency domain. This enables TRP-specific equalization for PTRS and TRP-specific CPE estimation at a UE. This more accurate phase tracking may enable higher throughput at the expense of a higher complexity.

Figure 23:
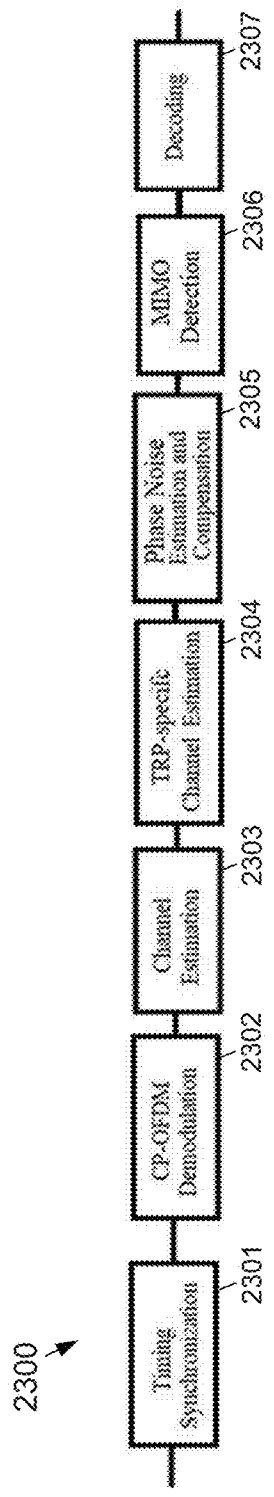
FIG. 23 shows an example block diagram of a UE receiver according to the subject matter disclosed herein.

FIG. 23 shows an example block diagram of a UE receiver 2300 according to the subject matter disclosed herein. The UE receiver 2300 may include a timing synchronization unit 2301, a CP-OFDM demodulation block 2302, a channel estimation block 2303, a TRP-specific channel estimation block 2304, a phase noise estimation and compensation block 2305, a MIMO detection block 2306 and a decoding block 2307 connected as shown. The different functional blocks of the UE receiver 2300 may be provided by modules and/or circuits.

For FR2 applications (i.e., frequency bands from 24.25 GHz to 52.6 GHz), an example UE implementation may be that a UE would use two different panels to control the corresponding beam of each TRP independently. That is, separate transmitter/receiver chains may be implemented for multi-TRP transmission in a HST-SFN scenario.

Figure 24:
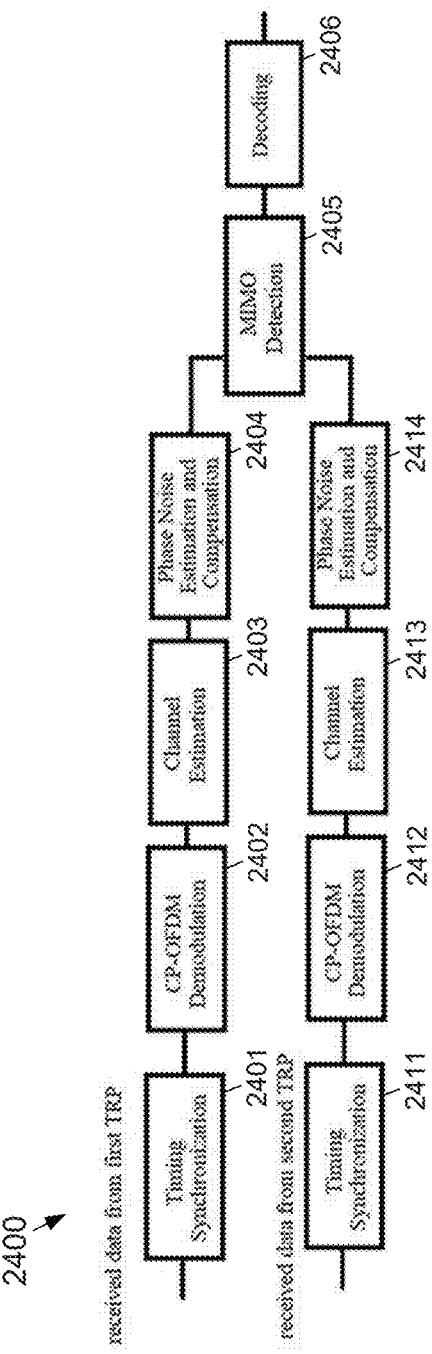
FIG. 24 shows a block diagram of an example embodiment of a UE receiver having separate receiver chains according to the subject matter disclosed herein.

FIG. 24 shows a block diagram of an example embodiment of a UE receiver 2400 having separate receiver chains according to the subject matter disclosed herein. The UE receiver 2400 may include a first receiver chain that may include a timing synchronization unit 2401, a CP-OFDM demodulation block 2402, a channel estimation block 2403, and a phase noise estimation and compensation block 2404 connected as shown, and a second receiver chain that may include a timing synchronization unit 2411, a CP-OFDM demodulation block 2212, a channel estimation block 2213, and a phase noise estimation and compensation block 2214 connected as shown. The outputs of the blocks 2404 and 2414 are coupled into a MIMO detection block 2405 and a decoding block 2406, which are connected as shown.

With the UE receiver 2400, although the DMRS may be transmitted in a SFN manner, the received signal from each TRP may be processed independently, which allows channel estimation and phase-noise compensation to be performed separately for each TRP communication. The demodulated data corresponding to each TRP may then be combined, equalized and decoded.

Default Beam Determination in Multi-TRP Transmission

Figure 25:
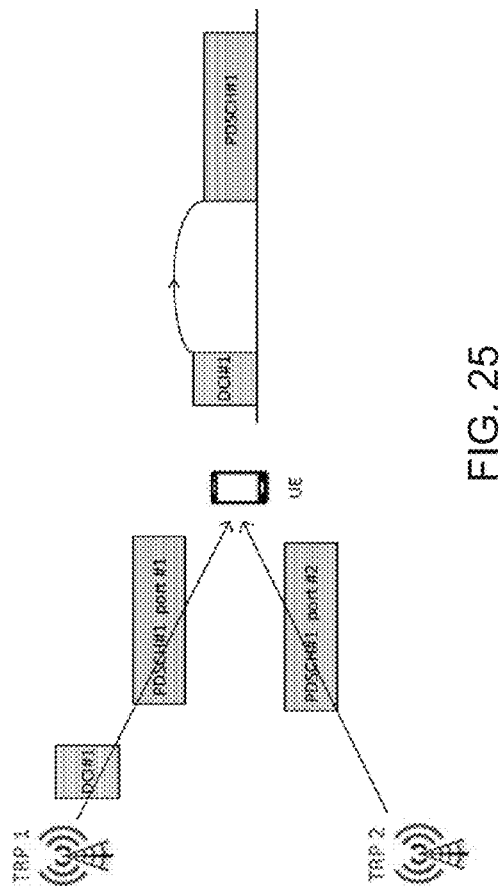
FIGS. 25 and 26 respectively depict a single-DCI and Multi-DCI M-TRP transmission schemes according to the subject matter disclosed herein.
Figure 26:
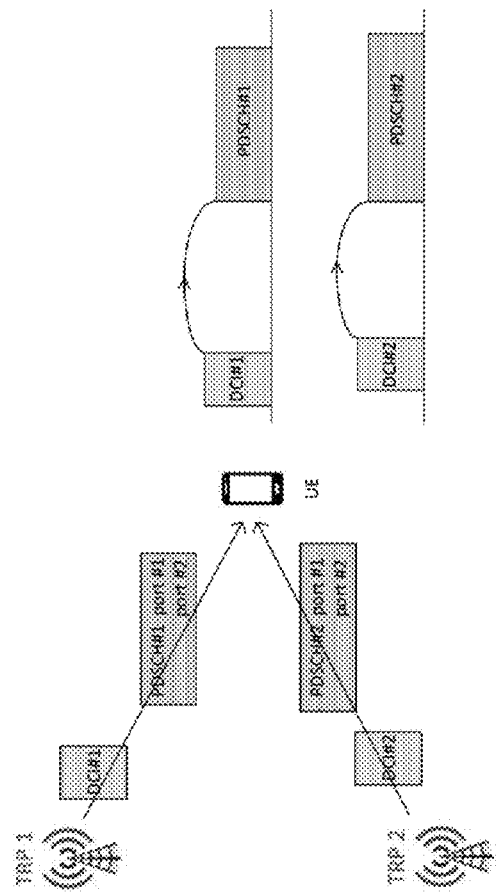

FIGS. 25 and 26 respectively depict a single-DCI and Multi-DCI M-TRP transmission schemes according to the subject matter disclosed herein. Multiple Transmit and Receive Points (M-TRP) were originally introduced in Rel-15 as a solution to improve cell-edge performance. In a M-TRP transmission scheme, different antenna ports of one or different channels may be within multiple TRPs that are typically non-co-located. M-TRP transmissions may be categorized into a single-DCI category and a multi-DCI M-TRP category. With a single-DCI M-TRP, a single PDCCH is transmitted to schedule one or multiple PDSCHs. The PDSCH may be transmitted from different TRPs so that different layers may be transmitted from different TRPs. Alternatively, all the layers of a PDSCH may be transmitted from one TRP while multiple of PDSCHs may be multiplexed in time or frequency domain within the same transport block (TB). In multi-DCI M-TRP transmission, each TRP transmits their own PDCCH and DCIs. Each DCI schedules one PDSCH with two-layer transmission. All of the layers of a given PDSCH may be transmitted from the antenna ports within the same TRP.

Different multiplexing schemes may be applied to PDCCH transmission. With TDM multiplexing, two sets of symbols of the transmitted PDCCH/two non-overlapping (in time) transmitted PDCCH repetitions/non-overlapping (in time) multi-chance transmitted PDCCH may be associated with different TCI states. With FDM multiplexing, two sets of resource element group (REG) bundles/control channel elements (CCEs) of the transmitted PDCCH/two non-overlapping (in frequency) transmitted PDCCH repetitions/non-overlapping (in frequency) multi-chance transmitted PDCCH may be associated with different TCI states. With SDM (non-transparent SFN), two different DMRS ports are each associated with one different TCI state. Rel-17 does not support SDM PDCCH schemes. With SFN, PDCCH DMRS may be associated with two TCI states in all REGs/CCEs of the PDCCH.

For a non SFN M-TRP PDCCH transmission the following possibilities of no-repetition, repetition and multi-chance may be considered. For no repetition, one encoding/rate matching may be used for a PDCCH with two TCI states. With this scheme, a single PDCCH candidate may be with two different TCI states. That is, some specific CCE/REGs of the candidate may be associated with the first TCI state and the rest of the CCE/REGs are associated with the second TCI state. For repetition, encoding/rate matching may be based on one repetition, and the same coded bits may be repeated for the other repetition. Each repetition has the same number of CCEs and coded bits, and corresponds to the same DCI payload. For multi-chance, separate DCIs may schedule the same PDSCH/PUSCH/RS/TB/etc. or result in the same outcome.

Figure 27A:
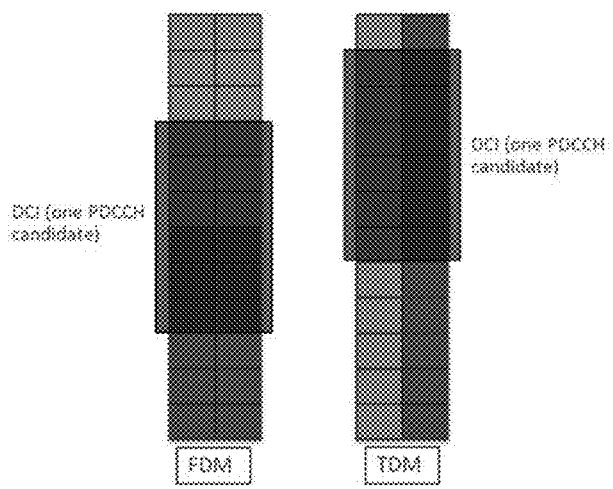
FIG. 27A depicts a scheme in which one PDCCH candidate (in a given SS set) may be associated with both TCI states of the CORESET according to the subject matter disclosed herein.

With any of the aforementioned transmission schemes, to enable a PDCCH transmission with two different TCI states one approach may be to associate one control resource set (CORESET) with two different TCI states. Following different multiplexing schemes for PDCCH transmission, the Schemes A-C below may be used with one CORESET with two active TCI states:

FIG. 27A depicts a Scheme A in which one PDCCH candidate (in a given SS set) may be associated with both TCI states of the CORESET according to the subject matter disclosed herein.

Figure 27B:
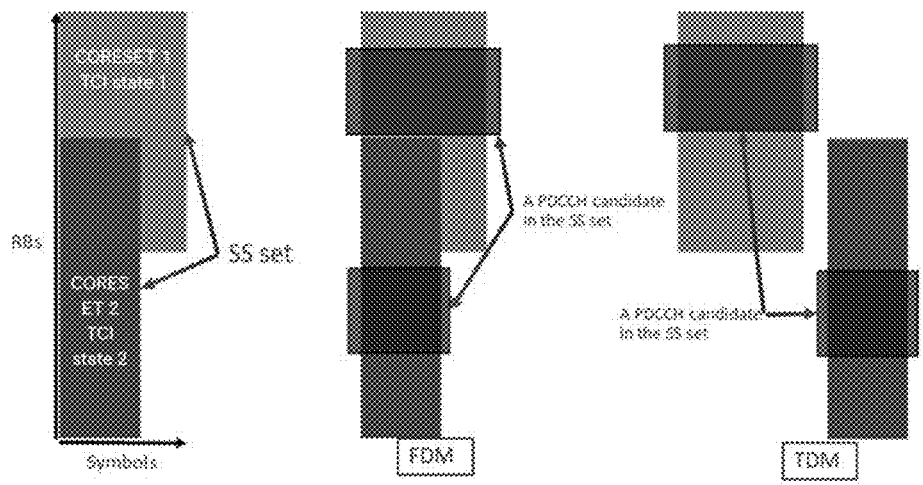
FIG. 27B depicts a scheme in which two sets of PDCCH candidates (in a given SS set) may be respectively associated with the two TCI states of the CORESET according to the subject matter disclosed herein.

FIG. 27B depicts a Scheme B in which two sets of PDCCH candidates (in a given SS set) may be respectively associated with the two TCI states of the CORESET according to the subject matter disclosed herein.

Figure 27C:
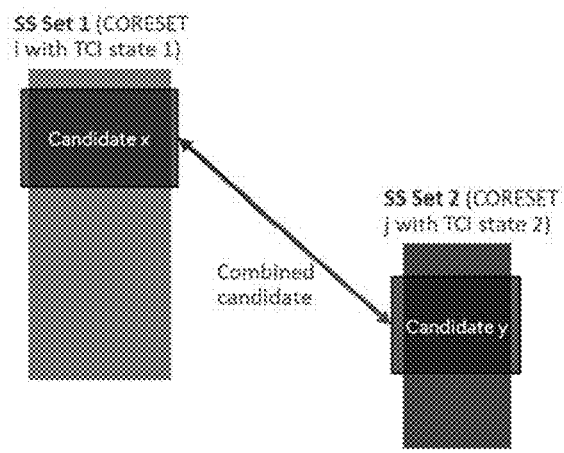
FIG. 27C depicts a scheme in which two sets of PDCCH candidates may be associated with two corresponding SS sets in which both SS sets may be associated with the CORESET and each SS set may be associated with only one TCI state of the CORESET according to the subject matter disclosed herein.

FIG. 27C depicts a Scheme C in which two sets of PDCCH candidates may be associated with two corresponding SS sets in which both SS sets may be associated with the CORESET and each SS set may be associated with only one TCI state of the CORESET according to the subject matter disclosed herein.

For Schemes B and C, the following two cases may be considered for mapping between different PDCCH candidates with different TCI states.

Case 1: Two (or more) PDCCH candidates may be explicitly linked together (UE knows the linking before decoding).

Case 2: Two (or more) PDCCH candidates may not be explicitly linked together (UE does not know the linking before decoding).

As a different alternative to associate PDCCH candidates to two different TCI states, one SS set may be associated with two different CORESETs in which each CORESET is associated with a TCI state. A different SS and CORESET multiplexing scheme may also be possible to allow multiple TCI state for PDCCH candidates. With this scheme, two SS sets are associated with two CORESETs in which each CORESET may be configured with a different TCI state.

Default Beam and RS Specification

For a single DCI-based NCJT in Rel-16, a UE may be configured with up to three CORESETs and ten search space sets on each of up to four Bandwidth Parts (BWP) on a serving cell. A search space set may be associated with only one CORESET and one TCI state. Having a PDCCH with two TCI states in multi-TRP scenario affects the default beam and RS specification because in the current specification they are specified with consideration of one TCI state for the CORESET. To illustrate, a default beam for PDSCH is derived based on TCI state of the CORESET with lowest ID. Also, a default spatial relation and a pathloss RS if not configured may be derived based on a TCI state of the CORESET having lowest ID or the TCI state having the lowest ID for PDSCH. In a beam-failure recovery, beam-failure detection RS, if not explicitly configured, is derived based on a TCI state for a responsive CORESET used for monitoring PDCCH.

The default TCI state of the PDSCH may be determined to be as a single TCI state or a pair of TCI states. While the single TCI state may be applicable to PDSCH transmission schemes with single or multiple TCI states, the pair of TCI states may only be applicable to the PDSCH transmission schemes having two different TCI states.

Single TCI State Default Beam

To determine the default beams for PDSCH receptions, the following three methods may be possible.

Method 1 (Ignore CORESETs with two TCI states): In general, for a multi-TRP scenario, one solution to prevent any ambiguity on the default beam and RS determination at a UE may be that the default beam and RS specification may be determined only based on CORESETs with a single TCI states. That is, a default beam for PDSCH, a default spatial relation and a pathloss RS may be derived based on TCI state of the CORESET having a lowest ID among the CORESETs with a single TCI states. With Method 1, Rel-15 behavior may be reused with an exception that this method may only consider CORESETs that are associated with one TCI state.

Method 2 (CORESET having the lowest ID with two TCI states is an error case): An alternative solution may be that the specification does not allow the lowest CORESET index to be configured with two TCI states. With this solution, a UE may not be expected to be configured with CORESETs and the associated one or two TCI states so that the CORESET having the lowest ID in the latest slot that UE monitors PDCCHs may be associated with two different TCI states. This may be a reuse of Rel-15 behavior.

Method 3 (reference TCI-state/TRP): Still another approach may be that one of the TRPs and/or its corresponding TCI state may be configured as the reference TRP and/or reference TCI state in which a default beam and RS specification may be derived based on that specific TCI state. Method 3 may be described as follows.

Each TCI state may additionally be associated with a TRP through a TRP index 1 or 2. Each CORESET may be associated with one or two TCI states. In particular, a MAC-CE activates either a single TCI state or a pair of TCI states (TCI state #1, TCI state #2). A gNB may configure a UE via a RRC with a reference TRP index $t_{ref} \in \{1,2\}$ for default beam determination. A UE determines the default TCI state from CORESETs having a TCI state associated to the reference TRP index $t_{ref}$. Among the CORESETs that include a TCI states associated with the reference TRP index, a CORSET having the lowest ID is selected. An example is shown below in the Table 2 in which the UE may be assumed to be configured with a reference TRP index $t_{ref}=2$. The default TCI state may be TCI-State 3 in CORSET ID #2.

TABLE 2

Example default TCI state determination for Method 3

| CORSET ID | Activated TCI states |
| --- | --- |
| #0 | TCI-State 1 with $t_{ref} = 1$ |
| #1 | TCI-State 2 with $t_{ref} = 1$ |
| #2 | (TCI-State 1 with $t_{ref} = 1$, TCI-State 3 with $t_{ref} = 2$) |
| #3 | (TCI-State 2 with $t_{ref} = 1$, TCI-State 5 with $t_{ref} = 2$) |
| #4 | TCI-State 5 with $t_{ref} = 2$ |
| #5 | TCI-State 4 with $t_{ref} = 2$ |

Method 4 (A CORESET-independent reference TCI state entry index): Method 4 may include the concept of a reference TRP that is not defined. With this method, a UE may be configured with TCI states in which there is no explicit association between the TCI states and the TRPs. A MAC-CE may activate a one or more TCI states for each CORESET. The activated TCI states may be in the form of a P-tuple having P entries (TCI—State #$i_1$, TCI—State #$i_2$ ..., TCI—State #$i_P$). P can be the same or different for different CORESETs, P=1, 2, 3 .... A gNB may configure a UE with a reference TCI state index $i_{ref}$. Among CORESETs having a TCI state tuple that includes an index $i_{ref}$, a CORSET having the lowest ID is selected. The default TCI state may then be $i_{ref}$-entry of the tuple associated with the selected CORSET.

As an alternative, the reference TCI state entry index $i_{ref}$ may be predetermined by being specified to always consider a predetermined TCI state (e.g., the first or the second) in each CORSET as the reference TCI state.

As an example, a gNB may configure UE with $i_{ref}=2$. The UE may determine the default TCI state from the CORESET that has at least two TCI states, i.e., the activated tuple may be of length 2 or more. The second entry may be selected as the default TCI states among those CORESETs.

The default beam may also always be determined from the CORESET having the lowest CORESET ID regardless of the number of active TCI states of a CORESET, configuration of reference TRP, or reference TCI-state index. etc. This may be realized by Method 4 when a gNB configures the reference TCI state index as $i_{ref}=1$. Method 4 may alternatively described as below.

Method 4-0 (a special case of Method 4): The default TCI state may always be determined from the CORESET having the lowest COREET ID. If the CORESET has a single TCI state, the TCI state may be determined as the default TCI state. If the CORESET has multiple TCI states, the default TCI state may be determined to be the $i_{ref}$-th TCI state. The $i_{ref}$ may be configured to the UE via RRC as the reference TCI state index or may be pre-determined. It may be specified to always consider a predetermined TCI state (e.g., the first or the second state) in each CORSET as the reference TCI state. Alternatively, the reference index may be configured for each CORSET separately.

Method 5 (a CORESET-dependent reference TCI state entry index): With this method, a UE may be configured with TCI states in which there may be no explicit association between the TCI states and the TRPs. A MAC-CE may activate one or more TCI states for each CORESET. The activated TCI states may be in a form of a P-tuple with P entries (TCI—State #$i_1$, TCI—State #$i_2$ ..., TCI—State #$i_P$). P may be the same or may be different for different CORESETs, P=1, 2, 3 .... A gNB may configure a UE with a reference TCI state index $i_{ref}$ for each CORSET. The default TCI state may then be selected from the TCI states of the CORESET having lowest CORESET ID. The default TCI state may be the $i_{ref}$-entry of the tuple associated with the selected CORESET in which $i_{ref}$ may be the reference TCI state index of the selected CORSET.

An HST-SFN transmission may be a coherent joint transmission that employs only one PDCCH to allocate one set of PDSCH resources. That is, the same PDCCH may be transmitted from multiple TRPs simultaneously. From a UE perspective, an extra downlink transmission may be interpreted as an additional downlink delay-spread component originated from a single TRP. Having PDCCH with two TCI states in an HST scenario may mean that a CORESET in Rel-17 may be configured with two TCI states. The default beam and RS specification in HST scenario may follow Rel-16 behavior using the TCI state of PDCCH transmitted from the reference TRP. The reference TRP may be the TRP that is being used by a gNB as the reference for frequency offset compensation in TRP-based frequency offset precompensation scheme. This may make the reference TRP as the primary TRP especially in the case of beam-failure events. The reference TRP may be semi-statically indicated with a certain TCI state to UE and the default TCI state may be selected from the CORESET having the lowest ID that has a TCI state associated to the reference TRP. Another approach may be that one of the TCI states in the CORESET may be semi-statically indicated to the UE as a reference TCI state or it may be specified to always consider a predetermined TCI state (i.e., the first or the second) in each CORSET as the reference TCI state. That reference TCI state may then be used as the default TCI state to determine default beam and RS. Another solution is that the default beam and RS specification may be determined only based on CORESETs having a single TCI states or the specification may make the lowest CORESET index in HST scenario always have a single TCI state.

A TCI state format may include two different pairs of QCL info and reference signals as shown below in bold:

```
TCI-State-r17 ::=     SEQUENCE {
    tci-StateId       TCI-StateId,
    qcl-Type1         QCL-Info,
    qcl-Type2         QCL-Info     OPTIONAL,    -- Need R
    qcl-Type1-r17     QCL-Info,
    qcl-Type2-r17     QCL-Info     OPTIONAL,    -- Need R
    ...
```

With this new enhanced Rel-17 TCI format, a PDCCH having two TCI states in a HST scenario may be associated with a CORESET having one TCI state. The default beam and RS specification may thus follow Rel-16 behavior and may be derived based on the TCI state of the CORESET having the lowest ID. The TCI state of the CORESET having the lowest ID, however, may contain two pairs of QCL RS and may cause ambiguity for the default beam and RS determination at a UE. To address this issue, one solution may be that the default beam and RS specification may only be determined based on CORESETs having TCI states that only contain one pair of QCL information (i.e., a legacy TCI). Alternatively, the specification may restrict the lowest CORESET index in an HST scenario to always have a legacy TCI state and not the enhanced Rel-17 format. Another approach may be that one of the QCL information pairs or one of the QCL RS in the TCI state of the CORESET having lowest ID may be semi-statically indicated to the UE as a reference QCL info pair or the reference QCL RS. It may also be specified to always consider a predetermined (i.e., the first or the second) QCL info pair/QCL RS in each TCI state as the reference to be used as the default beam and RS. Another approach may be that a reference TRP may be semi-statically indicated with a QCL information pair to a UE, and a default beam and RS may be selected from the CORESET having the lowest ID that has a TCI state associated to the reference TRP.

To provide increased reliability of PDCCH transmission in multi-TRP cells, especially in a scenario in which a TRP is likely to be blocked, different PDCCH schemes may be considered. Different PDCCH schemes have been presented and with these schemes, a PDCCH may be repeated within or across different SS sets. It may also be transmitted with a scheme referred to as multi-chance in which the multiple PDCCHs schedule the same PDSCH/PUSCH or uplink/downlink channel/signal. From a different point of view, a repeated PDCCH may be associated with one or two CORESETs. As an example, a PDCCH may be repeated across or within a Synchronization Signal (SS) set. As a different example, a PDCCH may be transmitted so that its first repetition is transmitted in a first SS associated with CORESET #1 and the second repetition may be transmitted in a second SS set associated with CORESET #2. FIGS. 28A-28D depict examples of repetition schemes disclosed herein.

With one CORESET and two TCI states, the default PDCSH beam may be determined based on the TCI state of the CORESET that is associated with the latest repetition of the PDCCH in the slot.

Method 6 (Latest TCI state associated with the repeated PDCCHs within the same CORESET): With this method, each CORESET may be associated with one or two TCI states. In particular, a MAC-CE either actives a single TCI state for a CORESET, in which case it also indicates which TRP number the activated TCI state may be associated with, or the MAC-CE activates a pair of TCI states (TCI state #1, TCI state #2) in which the TCI states #1 and #2 correspond to the first and second TRPs, respectively. The default TCI state is selected from the CORESET having the lowest ID that are associated with two different TCI states. Among the two TCI states of the CORESET having the lowest ID, the TCI state associated with the latest SS set is selected as the default TCI state.

Method 7 (Latest TCI state associated with the repeated PDCCHs with different CORESETs): With this method, each CORESET may be associated with one or two TCI states. In particular, a MAC-CE either actives a single TCI state for a CORESET, in which case the MAC-CE also activates the TRP number that this TCI state may be associated with, or the MAC-CE activates a pair of TCI states (TCI state #1, TCI state #2) in which the TCI states #1 and #2 correspond to the first and second TRPs, respectively. The default TCI state may be selected from the CORESET with the lowest ID.

If the CORSET is associated with two different TCI states. The TCI state associated with the latest SS set is selected as the default TCI state from among the two TCI states of the CORESET having with lowest ID.

If the CORSET is associated with single TCI state and it is linked to a linked CORESET, the default TCI state may be selected to be that of the COERSET or the linked CORSET, whichever ends later in the slot.

Alternatively, either of the Methods 6 and 7 may be used with the modification that the earliest SS set is selected among the linked sets.

Two TCI State Default Beam

As previously mentioned, the default beam may also be determined as a pair of TCI states.

The default pair of TCI state may be determined from the configured CORESETs having two different TCI states.

Method 8 (Default TCI states as a pair and CORESET-dependent): If a UE is configured with one or more CORESETs in which at least one CORESET may be associated with two TCI states, the default TCI state of the PDSCH may be determined as follows. The UE determines the CORESET having the lowest ID among the CORESETs that are associated with two TCI states. The default TCI states may then be determined as the pair of TCI states associated with the CORESET having lowest CORESET ID.

Method 8 may be applicable when there is at least one CORESET having two different TCI states. If there is no CORESET with two TCI states, the default beam may be determined as the TCI state of the CORESET with lowest CORESET ID.

Alternatively, the default TCI state may be determined to be selected from the set single or pair of TCI states activated by MAC-CE for PDSCH reception.

Method 9 (Default TCI states as a pair and lowest PDSCH codepoint): When a MAC CE activates the set of TCI states for the PDSCH reception so that there may be at least one TCI codepoint with two different TCI states, the default TCI states of the PDSCH may be determined as the TCI states corresponding to the lowest TCI codepoint among the TCI codepoints containing two different TCI states.

TCI State Application to PDSCH

Once a UE has determined the default TCI state pair as (A, B), if the PDSCH follows the default TCI state, the UE should apply the TCI states (A, B) according to the mapping. Prior to DCI decoding, however, the UE may not know which resources have been used for each TCI states in the PDSCH transmission. In the following, a solution is provided that addresses this issue.

SDM, SFN and HST PDSCH

With SDM PDSCH schemes, a certain number of ports of PDSCH may be associated with the first TCI state and certain others may be associated with the second TCI states. Therefore, regardless of the time/frequency domain resource allocation, a UE may be expected to receive the OFDM symbols with both TCI states without requiring the DCI decoding. Similarly with SFN and HST PDSCHs, a DMRS port may be associated with two TCI states and a UE does not need the resource allocation to apply the TCI states.

TDM PDSCH

With TDM PDSCH, a UE may need to know the resource allocation to apply the default TCI states. With one solution, a DCI decoding delay time may be defined to acknowledge the DCI decoding delay. The UE receives the symbols before the DCI decoding delay with the first TCI state and receives the next symbols according to the indicated resource allocation in the DCI. The following methods may define the UE behavior. In the following methods, "default TCI state threshold time" may be defined according to the UE capability and may be measured from the end of the PDCCH scheduling the PDSCH.

Method 10 (One state until DCI decoding delay and two states until threshold): If a UE is configured with an RRC parameter indicating the reception of PDSCH with two default TCI states, and at least one TCI codepoint indicates two TCI states, and UE is configured to receive a single-DCI M-TRP TDM PDSCH, UE may be configured via RRC or may be given a predefined DCI decoding delay $T_{DCI\ decoding}$. The UE may determine the default TCI states as (A, B) and receives the symbols as follows.

From the first symbol of the CORESET in which a UE monitors the PDCCH until $T_{DCI,decoding}$ after the end of the CORSET, the UE receives the symbols assuming the first TCI state A. From $T_{DCI,decoding}$ after the end of the CORSET until the default TCI state threshold time, the UE receives the symbols according to the time domain resource allocation indicated by the DCI with both TCI states A and B.

Figure 29:
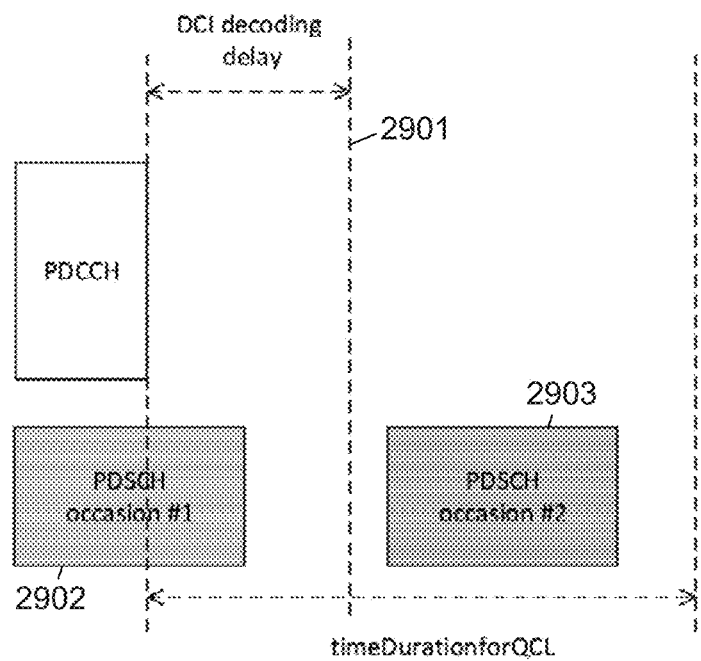
FIG. 29 depicts an example of PDSCH scheduling and UE behavior according to a Method 10 disclosed herein.

FIG. 29 depicts an example of PDSCH scheduling and UE behavior according to Method 10. From the start of the PDCCH to the second vertical dashed line 2901, the UE receives symbols with the first TCI state 2902 from the second vertical dashed line 2901, the UE receives the symbols according to the indicated time-domain resource in the DCI. The time domain resource may indicate for the UE to receive the PDSCH occasions as shown in FIG. 29, so the UE will know to receive the second PDSCH occasion with the second TCI state 2903.

In Method 10, a UE receives the symbols before the DCI decoding delay with a single TCI state. This may prevent a gNB from scheduling two TCI states before the DCI decoding delay. This issue is address in Method 11.

Figure 30:
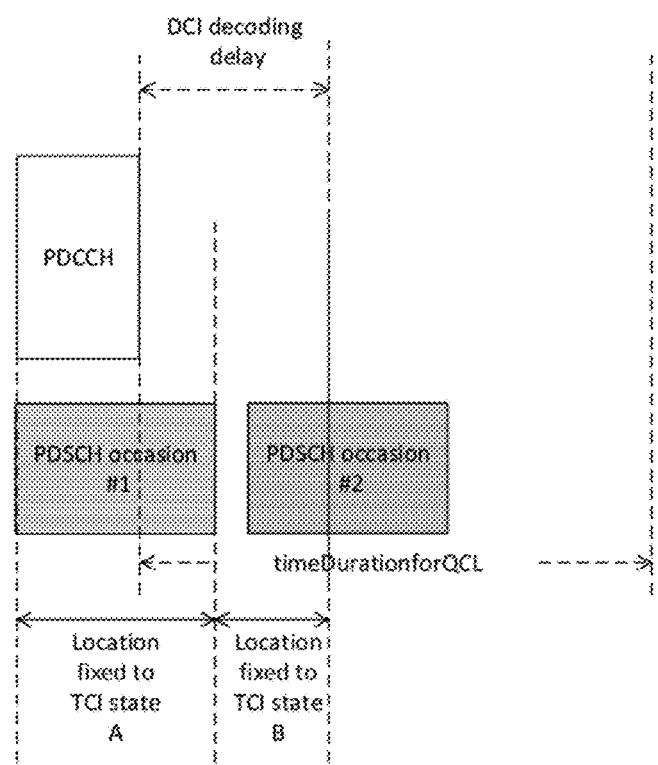
FIG. 30 depicts an example of a method 11 according to the subject matter disclosed herein.

Method 11 (Two states until DCI decoding delay and two states until threshold): FIG. 30 depicts an example of method 11 according to the subject matter disclosed herein. If a UE is configured with an RRC parameter indicating the reception of PDSCH with two default TCI states, and at least one TCI codepoint indicates two TCI states, and the UE is configured to receive a single-DCI M-TRP TDM PDSCH, the UE may be configured via RRC or may be given a predefined DCI decoding delay $T_{DCI\ decoding}$. The UE may determine the default TCI states as (A, B) and receives the symbols as follows.

From the first symbol of the CORESET in which the UE monitors the PDCCH until $T_{DCI,decoding}$ after the end of the CORSET, the UE may receive the symbols assuming the first TCI state A and second TCI state B according to a fixed time locations in which the symbols are mapped to the first and second TCI states. From $T_{DCI,decoding}$ after the end of the CORSET until the default TCI state threshold time, the UE receives the symbols according to the time domain resource allocation indicated by the DCI with both TCI states A and B.

Alternatively. a UE may only receive one TCI state before the threshold or two TCI states on fixed time locations.

Method 12 (One state until threshold): If a UE is configured with an RRC parameter indicating the reception of PDSCH with two default TCI states, and at least one TCI codepoint indicates two TCI states, and UE is configured to receive single-DCI M-TRP TDM PDSCH, the UE may determine the default TCI states as (A, B) and receive the symbols with TCI states as follows.

Figure 31:
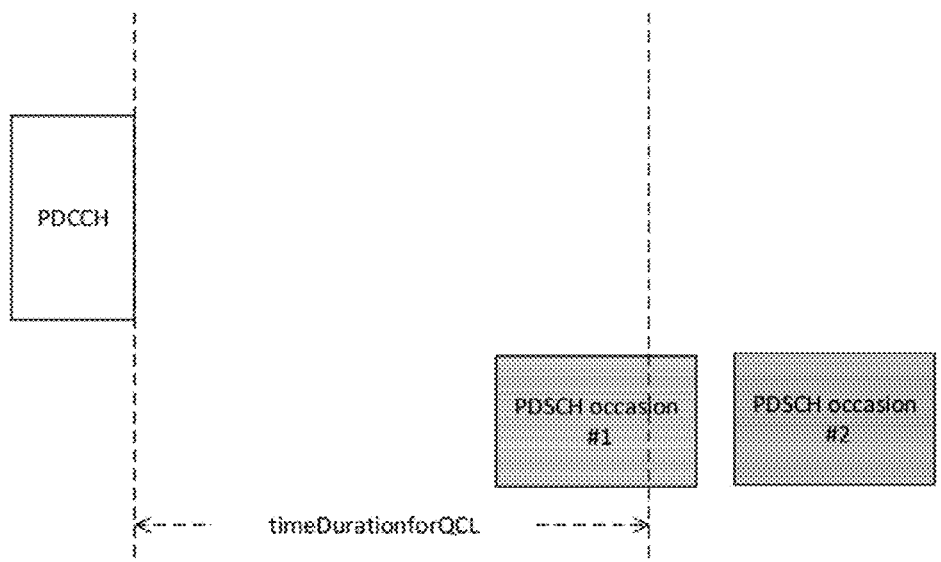
FIG. 31 depicts an example of a method 12 according to the subject matter disclosed herein.

FIG. 31 depicts an example of method 12 according to the subject matter disclosed herein. From the first symbol of the CORESET until the default TCI state threshold time, the UE receives the symbols with TCI state A.

Figure 32:
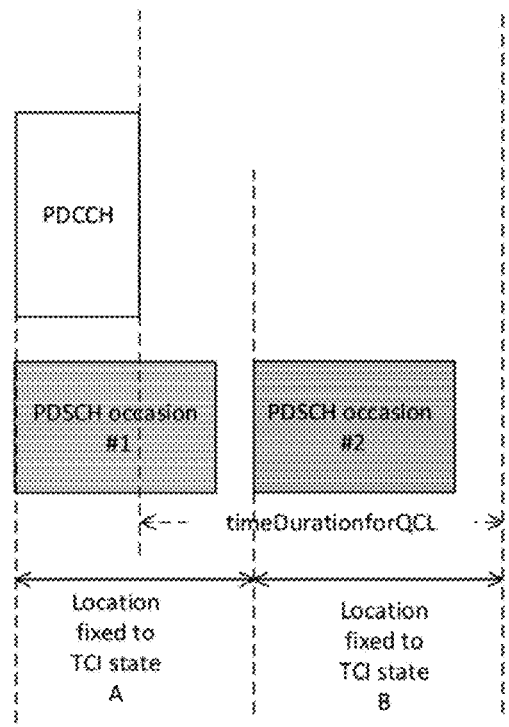
FIG. 32 depicts an example of a method 13 according to the subject matter disclosed herein.

Method 13 (two states until threshold): FIG. 32 depicts an example of method 13 according to the subject matter disclosed herein. If a UE is configured with an RRC parameter indicating the reception of PDSCH with two default TCI states, and at least one TCI codepoint indicates two TCI states, and UE is configured to receive single-DCI M-TRP TDM PDSCH, the UE may determine the default TCI states as (A, B) and receive the symbols with TCI states as follows.

From the first symbol of the CORESET until the default TCI state threshold time, the UE receives the symbols with both TCI state A and B according to fixed time locations in which the symbols are mapped to the first and second TCI states.

How to Determine the Fixed Time Locations

The fixed time locations in Methods 11 and 13 are symbols that a UE receives using a specific TCI states among the two default states. To determine the time locations for each TCI state, "fixed window" is first determined. The symbols inside the "fixed window" may be assigned to one of the two TCI states. The window starts at the first symbol of the CORESET and may end at the threshold time or the time indicated by the DCI decoding delay or the time indicated by the default TCI state threshold, the start of the next earliest CORESET in which the UE monitors PDCCH.

Case 1: Intra-Slot TDM

In the case of an intra-slot TDM, the "fixed window" starts at the starting symbol of the CORESET and ends either at the start of the earliest next CORESET or the time indicated by DCI decoding delay, whichever is earlier. Once the fixed window has been determined, the set symbols in the window are mapped to the first and second TCI states as follows.

Two chunk in each slot: If a slot has N symbols in the fixed window, the first $N_1$ symbols are mapped to the first TCI states and the second $N-N_1$ symbols are mapped to the second TCI states in which $N_1$ may be RRC configured, or fixed predetermined, or $N_1=\lfloor N/2 \rfloor$. A typical choice for a slot with N symbols in the window is $N_1=\lfloor N/2 \rfloor$.

Figure 33:
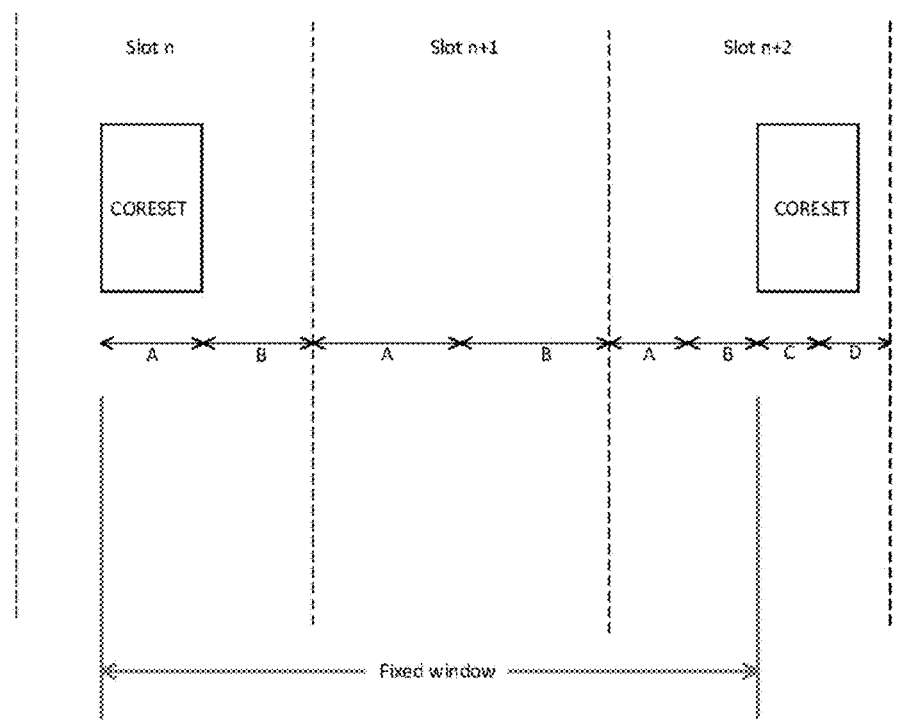
FIG. 33 depicts an example of an intra-slot TDM according to the subject matter disclosed herein.

FIG. 33 depicts an example of an intra-slot TDM according to the subject matter disclosed herein.

Figure 34:
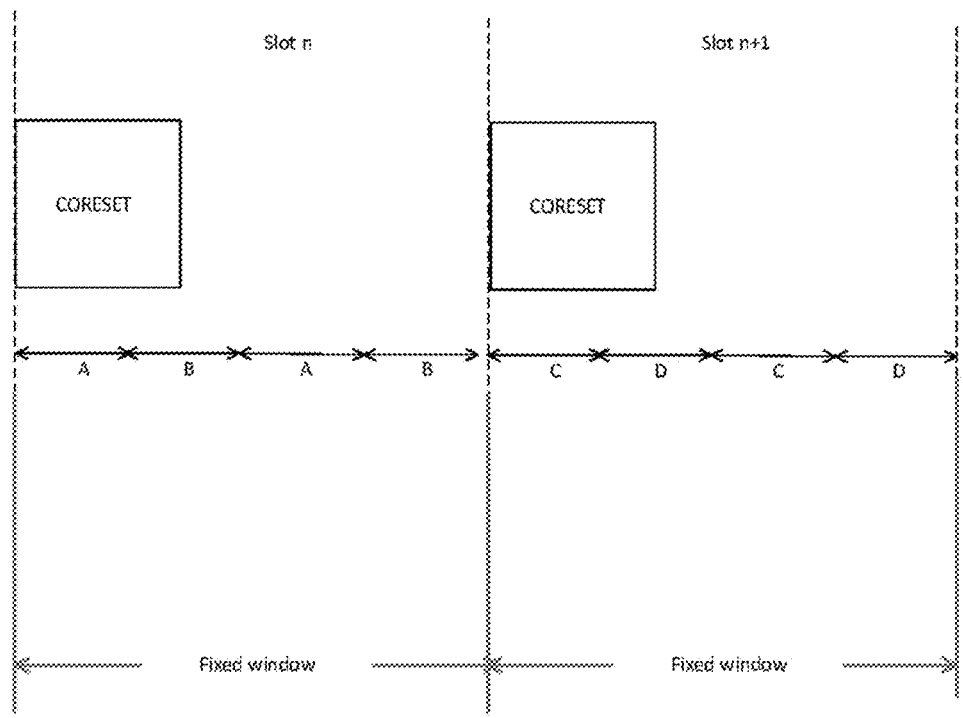
FIG. 34 depict an example of multiple consecutive chunks with alternating TCI states with L=2 according to the subject matter disclosed herein.

Multiple consecutive chunks with alternating TCI states: As a different approach, if a slot has N symbols in the fixed window, the N symbols are grouped in L groups in which group 1 includes the first $N_1$ symbols, group 2 includes the next $N_2$ symbols, group 3 includes the next $N_3$ symbols, and so on, in which each group includes an even number of symbols except possibly the first group or the last group. For group with an even number of symbols, the first half of symbols may be mapped to the first TCI state and the second half may be mapped to the second TCI state. For a group with odd number 2K+1 symbols, the first K symbols may be mapped to the first TCI state and the next K+1 may be mapped to the second TCI state. FIG. 34 depict an example of multiple consecutive chunks with alternating TCI states with L=2 according to the subject matter disclosed herein.

Case 2: Inter-Slot TDM

Schemes similar to an intra-slot may be considered for inter-slot TDM with the modification that the TCI state alternates in two consecutive slots. In case of inter-slot TDM, the "fixed window" starts at the starting symbol of the CORESET and ends either at the start of the earliest next CORESET or the time indicated by DCI decoding delay, whichever is earlier. Once the fixed window has been determined, the set of symbols in the window may be mapped to the first and second TCI states as follows.

Figure 35:
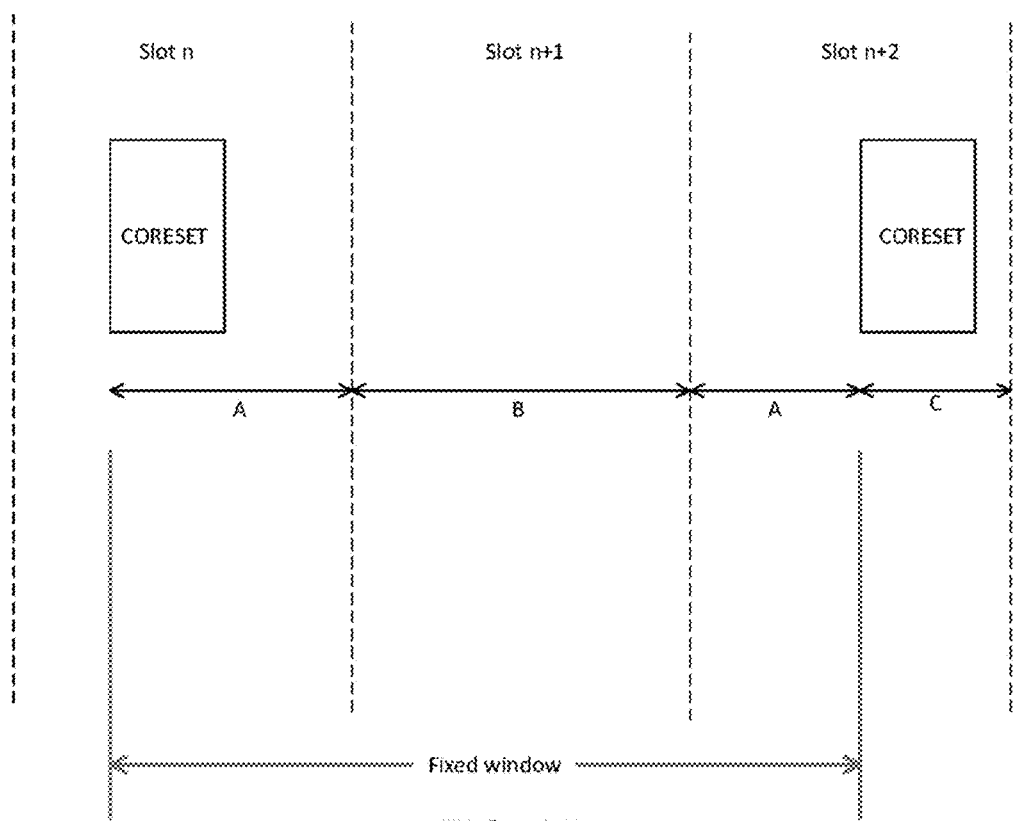
FIG. 35 depicts an example of multiple consecutive slots with alternating TCI states based on an Inter-slot TDM case 2 according to the subject matter disclosed herein.

Multiple consecutive slots with alternating TCI states: If N consecutive slots overlap with the fixed window, the symbols of the first, third, fifth and . . . slots may be mapped to the first TCI states, and the symbols of the second, fourth, sixth and . . . slots may be mapped to the second TCI state. FIG. 35 depicts an example of multiple consecutive slots with alternating TCI states based on an Inter-slot TDM case 2 according to the subject matter disclosed herein.

FDM PDSCH

With a FDM PDSCH scheme, a first half of resource blocks may be associated with the first TCI state and a second half may be associated with the second TCI state. In principle, the default TCI state and UE behavior for FDM PDSCH scheme may also be determined with any of the methods 10 to 11 in which the fixed time locations may be replaced by fixed frequency locations and the frequency locations (RBs) may be mapped to the first and second TCI states. A fixed window may be determined that includes a starting RB and a length in terms of number of RB. A fixed window may alternatively be defined by a set of bitmap that indicates which RB s are included in the window. Once the window has been determined to include N RBs, the first $N_1$ RBs may be mapped to the first TCI state and the second $N-N_1$ RBs may be mapped to the second TCI state.

Figure 36:
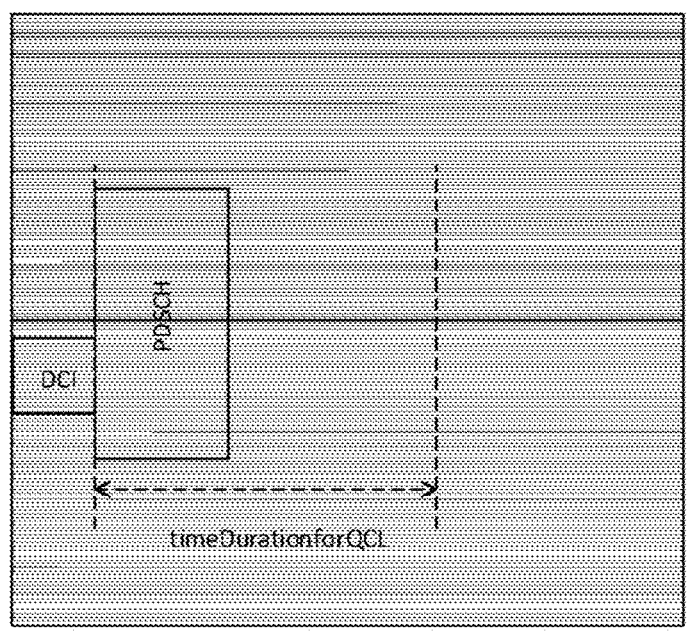
FIG. 36 depicts an example of an FDM PDSCH scheme according to the subject matter disclosed herein.

An example of such schemes is as follows. The fixed window may be chosen to be the entire active BWP. The active BWP may be divided in half into two sets of equal number of RBs. A UE receives the first sets of RBs with the first TCI state and the second set with the second TCI state until the UE has decoded the DCI. After the UE decodes the DCI, the UE receives the set of allocated PDSCH RBs according to the frequency-domain allocation. To accommodate with this behavior, a gNB may be expected to transmit the FDM PDCSH so that a first half of scheduled RBs are in the first half of BWP and the second half of scheduled RBs are in the second half of BWP. FIG. 36 depicts an example of an FDM PDSCH scheme according to the subject matter disclosed herein.

A Sample TP for TS 38.214
Antenna Ports Quasi Co-Location
<Unchanged Parts have been Omitted>

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCIStatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCl-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. The UE may further assume that the DM-RS ports of PDSCH or PDSCH transmission occasions on the set of symbols starting from the first symbol of a CORESET in which the scheduling PDCCH is transmitted to $N_3$ symbols after the end of the CORESET are quasi co-located with the RS with respect to the QCL parameter associated with the first TCI state corresponding to the lowest codepoint among the TCI codepoints containing two different TCI states, where $N_3$ is determined according to clause 9.2.3 of TS 38.213. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

In all cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

<Unchanged Parts are Omitted>

Beam Failure

To address beam-failure recovery in HST scenario with TRP-based frequency offset precompensation, two different scenarios may be considered. First, beam failure happens for a reference TRP, and second, beam failure happens for a non-reference TRP. For both these scenarios, each TRP may be configured with up to two periodic 1-port CSI-RS for per BWP explicitly by RRC or implicitly by TCI state for beam failure detection. Downlink RS for new beam identification set may be based on SSB and CSI-RS and may be configured explicitly and separately for each TRP. Besides, since two TCIs are activated for PDCCH, each TCI state may implicitly correspond to a beam failure detection RS for the corresponding TRP, if not configured. When a beam failure happens for one of the TRPs, the reception at UE may fall back to single TRP scenario. That is, a UE should switch channel estimation and other signal processing algorithm to a channel estimation and signal processing algorithm that are used for single TRP transmission when the UE detects a beam failure.

In HST-SFN scenarios with TRP-based frequency offset precompensation, if a beam failure occurs for the reference TRP, there would be some QCL information relation (i.e., Doppler-shift related properties) breakage on non-reference TRP transmissions due to beam failure of the reference TRP. To illustrate, when network precompensates frequency offset for TRS and all other downlink transmissions (including PDCCH, DMRS and PDSCH), the QCL RS of the TRS transmitted from non-reference TRP may be the TRS transmitted from the reference TRP or the QCL RS of the TRS transmitted from the reference TRP with QCL type B. Similarly, when network precompensates frequency offset for all downlink transmissions, but not TRS, QCL RS for the PDCCH, PDSCH DMRS of non-reference TRP may be the TRS transmitted from the reference TRP with QCL type B. That means beam failure on a reference TRP transmission may also disrupt the PDCCH and PDSCH reception at non-reference TRP. In this case, one solution may be for the QCL information of the latest TRS received from the reference TRP before beam failure has been identified may be used for continuation of DL transmission from non-reference TRP. That is, a UE only monitors the PDCCH using the TCI state associated with the non-reference TRP and reuses the associated TCI states of the reference TRP in the last received CORESET for the latest slot before beam failure was identified by the UE. The PDSCH reception may also be accordingly with reuse of the associated TCI states of the reference TRP in the latest slot before beam failure was identified by the UE.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may include many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and

What is claimed is:

1. A device, comprising:
   a receiver configured to:
   receive a first reference signal and a second reference signal sent over a wireless network, the first reference signal corresponding to a quasi-colocation reference signal (QCL RS) of the second reference signal,
   determine delay-spread and average-delay information associated with the device based on the first reference signal;
   receive a third reference signal and a fourth reference signal sent over the wireless network, the third reference signal corresponding to a QCL RS of the fourth reference signal; and
   determine Doppler-shift and Doppler-spread information associated with the device based on the third reference signal.

2. The device of claim 1, wherein:
   the second reference signal is received from a first transmit and receive point (TRP),
   the fourth reference signal is received from a second TRP,
   the second reference signal and the fourth reference signal use a same set of allocated resources and are transmitted in a Single Frequency Network (SFN) manner.

3. The device of claim 1, wherein the receiver is further configured to:
   determine delay-spread and average-delay information associated with the device based on the third reference signal.

4. The device of claim 2, wherein the receiver is further configured to receive a control message sent over the wireless network from the first TRP to dynamically update a configuration of one of the first reference signal and the second reference signal.

5. The device of claim 4, wherein the receiver determines information based on the control message for at least a periodicity of one of the first reference signal and the second reference signal based on a change of movement of the device with respect to the first TRP.

6. The device of claim 1, wherein the first reference signal comprises a Tracking Reference Signal (TRS), and the second reference signal comprises a Physical Downlink Shared Channel (PDSCH) Demodulation Reference Signal (DMRS).

7. The device of claim 1, wherein the first reference signal comprises one of a Tracking Reference Signal (TRS) and a Synchronization Signal Block (SSB).

8. The device of claim 1, wherein the second reference signal is associated with two Transmission Configuration Indicator (TCI) states.

9. The device of claim 2, wherein the receiver is further configured to receive a Physical Downlink Control Channel (PDCCH) DMRS associated with two Transmission Configuration Indicator (TCI) states from the first TRP and the second TRP.

10. The device of claim 9, wherein the receiver determines a TCI state of a PDSCH DMRS scheduled by the PDCCH as one of the two TCI states.

11. A method, comprising:
    receiving a first reference signal and a second reference signal, at a receiver on a device, sent over a wireless network, the first reference signal corresponding to a quasi-colocation reference signal (QCL RS) of the second reference signal,
    determining, by the receiver, delay-spread and average-delay information associated with the device based on the first reference signal;
    receiving, by the receiver, a third reference signal and a fourth reference signal sent over the wireless network, the third reference signal corresponding to a QCL RS of the fourth reference signal; and
    determining, by the receiver, Doppler-shift and Doppler-spread information associated with the device based on the third reference signal.

12. The method of claim 11, wherein the second reference signal is received from a first transmit and receive point (TRP), the fourth reference signal is received from a second TRP, and the second reference signal and the fourth reference signal use a same set of allocated resources and are transmitted in a Single Frequency Network (SFN) manner.

13. The method of claim 11, further comprising:
    determining, by the receiver, delay-spread and average-delay information associated with the device based on the third reference signal.

14. The method of claim 12, further comprising:
    receiving, by the receiver, a control message sent over the wireless network from the first TRP to dynamically update a configuration of one of the first reference signal and the second reference signal.

15. The method of claim 14, wherein the receiver determines information based on the control message for at least a periodicity of one of the first reference signal and the second reference signal based on a change of movement of the device with respect to the first TRP.

16. The method of claim 11, wherein the first reference signal comprises a Tracking Reference Signal (TRS), and the second reference signal comprises a Physical Downlink Shared Channel (PDSCH) Demodulation Reference Signal (DMRS).

17. The method of claim 11, wherein the first reference signal comprises one of a Tracking Reference Signal (TRS) and a Synchronization Signal Block (SSB).

18. The method of claim 11, wherein the second reference signal is associated with two Transmission Configuration Indicator (TCI) states.

19. The method of claim 12, further comprising:
    receiving, by the receiver, a Physical Downlink Control Channel (PDCCH) DMRS associated with two Transmission Configuration Indicator (TCI) states from the first TRP and the second TRP.

20. The method of claim 19, wherein the receiver determines a TCI state of a PDSCH DMRS scheduled by the PDCCH as one of the two TCI states.

* * * * *